United States Patent
Krizhanovsky et al.

(10) Patent No.: US 12,435,159 B2
(45) Date of Patent: Oct. 7, 2025

(54) ANTI-HUMAN GRP94 ANTIBODIES AND USES

(71) Applicant: YEDA RESEARCH AND DEVELOPMENT CO. LTD., Rehovot (IL)

(72) Inventors: Valery Krizhanovsky, Rehovot (IL); Yossi Ovadya, Rehovot (IL)

(73) Assignee: YEDA RESEARCH AND DEVELOPMENT CO. LTD., Rehovot (IL)

(*) Notice: Subject to any disclaimer, the term of this patent is extended or adjusted under 35 U.S.C. 154(b) by 539 days.

(21) Appl. No.: 18/062,601

(22) Filed: Dec. 7, 2022

(65) Prior Publication Data
US 2023/0094083 A1 Mar. 30, 2023

Related U.S. Application Data

(63) Continuation-in-part of application No. PCT/IL2021/050678, filed on Jun. 7, 2021.

(30) Foreign Application Priority Data

Jun. 7, 2020 (IL) .......................................... 275186

(51) Int. Cl.
C07K 16/44 (2006.01)
A61K 39/00 (2006.01)
A61P 43/00 (2006.01)

(52) U.S. Cl.
CPC .............. *C07K 16/44* (2013.01); *A61P 43/00* (2018.01); *A61K 2039/505* (2013.01); *C07K 2317/24* (2013.01); *C07K 2317/52* (2013.01); *C07K 2317/565* (2013.01); *C07K 2317/732* (2013.01)

(58) Field of Classification Search
None
See application file for complete search history.

(56) References Cited

U.S. PATENT DOCUMENTS

| | | | |
|---|---|---|---|
| 8,158,347 B2 | 4/2012 | Sharpless et al. | |
| 9,476,031 B2 | 10/2016 | Priur et al. | |
| 10,100,095 B2 | 10/2018 | Yoshimura et al. | |
| 2004/0152651 A1 | 8/2004 | Rana | |
| 2010/0122358 A1 | 5/2010 | Bruggemann et al. | |
| 2017/0056421 A1 | 3/2017 | Zhou et al. | |
| 2018/0117173 A1 | 5/2018 | Krizhanovsky et al. | |

FOREIGN PATENT DOCUMENTS

| | | |
|---|---|---|
| EP | 3297680 A2 | 3/2018 |
| WO | WO 1996/013610 A2 | 5/1996 |
| WO | WO 2009/059425 A1 | 5/2009 |
| WO | WO 2009/085216 A2 | 7/2009 |
| WO | WO 2010/122358 A2 | 10/2010 |
| WO | WO 2013/152038 A1 | 10/2013 |
| WO | WO 2014/089124 A1 | 6/2014 |
| WO | WO 2014/174511 A1 | 10/2014 |
| WO | WO 2016/185481 A2 | 11/2016 |

OTHER PUBLICATIONS

Biran et al. "Quantitative identification of senescent cells in aging and disease" Aging cell. Aug. 2017; 16(4):661-71.
Cabreiro et al. "Identification of proteins undergoing expression level modifications in WI-38 SV40 fibroblasts overexpressing methionine sulfoxide reductase A" Biochimie. Nov. 1, 2007;89(11):1388-95.
Chan et al. "A novel Hsp90 inhibitor AT13387 induces senescence in EBV-positive nasopharyngeal carcinoma cells and suppresses tumor formation" Molecular cancer. Dec. 2013;12(1):1-5.
Childs et al. "Senescent cells: an emerging target for diseases of ageing" Nature reviews Drug discovery. Oct. 2017;16(10):718-35.
Chothia et al. "Canonical structures for the hypervariable regions of immunoglobulins" Journal of molecular biology. Aug. 20, 1987;196(4):901-17.
Doran et al. "Aging skeletal muscle shows a drastic increase in the small heat shock proteins αB-crystallin/HspB5 and cvHsp/HspB7" European journal of cell biology. Oct. 19, 2007;86(10):629-40.
Garnacho et al. "A fibrinogen-derived peptide provides intercellular adhesion molecule-1-specific targeting and intraendothelial transport of polymer nanocarriers in human cell cultures and mice" Journal of Pharmacology and Experimental Therapeutics. Mar. 1, 2012;340(3):638-47.
Hoter et al. "The HSP90 family: structure, regulation, function, and implications in health and disease" International journal of molecular sciences. Aug. 29, 2018;19(9):2560.
Hudson et al. "Engineered antibodies" Nature medicine. Jan. 2003;9(1):129-34.
International Search Report for PCT Application No. PCT/IL2021/050678 dated Aug. 30, 2021.
Ishigaki et al. "Transplantation of IPS-derived tumor cells with a homozygous MHC haplotype induces GRP94 antibody production in MHC-matched macaques" Cancer Research. Nov. 1, 2017;77(21):6001-10.
Jeoung et al. "Antibody-Based Targeting of Cell Surface GRP94 Specifically Inhibits Cetuximab-Resistant Colorectal Cancer Growth" Biomolecules. Nov. 1, 2019;9(11):681.
Krizhanovsky et al. "Senescence of activated stellate cells limits liver fibrosis" Cell. Aug. 22, 2008;134(4):657-67.
Lee et al. "The dynamic nature of senescence in cancer" Nature cell biology. Jan. 2019;21(1):94-101.

(Continued)

*Primary Examiner* — Amy E Juedes
(74) *Attorney, Agent, or Firm* — Mark S. Cohen; PEARL COHEN ZEDEK LATZER BARATZ LLP

(57) ABSTRACT

Described herein are anti-human Grp94 antibodies. The antibodies may be used to target senescent cells. Thus, the anti-Grp94 antibodies would be useful in treating diseases and conditions associated with cellular senescence. The anti-Grp94 antibodies could target senescent cells in vivo. Therefore, the anti-Grp94 antibodies could be used to target senescent cells associated with age-related diseases in vivo.

13 Claims, 24 Drawing Sheets

Specification includes a Sequence Listing.

(56) References Cited

OTHER PUBLICATIONS

Li et al. "Cell membrane gp96 facilitates HER 2 dimerization and serves as a novel target in breast cancer" International Journal of Cancer. Aug. 1, 2015;137(3):512-24.

Moore et al. "Engineered Fc variant antibodies with enhanced ability to recruit complement and mediate effector functions" In MAbs Mar. 1, 2010 (vol. 2, No. 2, pp. 181-189). Taylor & Francis.

Naylor et al. "Senescent cells: a novel therapeutic target for aging and age-related diseases" Clinical Pharmacology & Therapeutics. Jan. 2013;93(1):105-16.

Niwa et al. "Enhanced natural killer cell binding and activation by low-fucose IgG1 antibody results in potent antibody-dependent cellular cytotoxicity induction at lower antigen density" Clinical Cancer Research. Mar. 15, 2005;11(6):2327-36.

Schosserer et al. "The dual role of cellular senescence in developing tumors and their response to cancer therapy" Frontiers in oncology. Nov. 23, 2017;7:278.

Spisek et al. "Bortezomib enhances dendritic cell (DC)-mediated induction of immunity to human myeloma via exposure of cell surface heat shock protein 90 on dying tumor cells: therapeutic implications" Blood, The Journal of the American Society of Hematology. Jun. 1, 2007;109(11):4839-45.

Sreedhar et al. "Hsp90 isoforms: functions, expression and clinical importance" FEBS letters. Mar. 26, 2004;562(1-3):11-5.

Stolzing et al. "Age-related changes in human bone marrow-derived mesenchymal stem cells: consequences for cell therapies" Mechanisms of ageing and development. Mar. 1, 2008;129(3):163-73.

Ullrich et al. "A mouse tumor-specific transplantation antigen is a heat shock-related protein" Proceedings of the National Academy of Sciences. May 1986;83(10):3121-5.

Weidle et al. "Intracellular proteins displayed on the surface of tumor cells as targets for therapeutic intervention with antibody-related agents" Cancer genomics & proteomics. Mar. 1, 2011;8(2):49-63.

Wu et al. "An analysis of the sequences of the variable regions of Bence Jones proteins and myeloma light chains and their implications for antibody complementarity" The Journal of experimental medicine. Aug. 1, 1970;132(2):211-50.

Yoo et al. "Expression profiles of subtracted mRNAs during cellular senescence in human mesenchymal stem cells derived from bone marrow" Experimental gerontology. May 1, 2013;48(5):464-71.

Hybridoma 4C2 Heavy Chain Sequence

```
          10         20         30         40         50         60         70         80         90        100
GAGGTGCAGCTTGTTGAGACTGGTGGAGGATTGGTGCAGCCTAAAGGGTCATTGAAACTCTCATGTGCAGCCTCGATTCACTTCAATACCAATGCCA
 E  V  Q  L  V  E  T  G  G  G  L  V  Q  P  K  G  S  L  K  L  S  C  A  A  S  G  F  T  F  N  T  N  A
                         10                          20                          30

110        120        130        140        150        160        170        180        190        200
TGAACTGGGTCCGCCAGGCTCCAGGAAAGGGTTTGGAATGGGTTGCTGGAATAAGAAGTAAAAGTAATAATTATGCAACATATTATGCGGATTCAGTGAA
 M  N  W  V  R  Q  A  P  G  K  G  L  E  W  V  A  R  I  R  S  K  S  N  N  Y  A  T  Y  Y  A  D  S  V  K
                  40                          50                          52 A B C             60

210        220        230        240        250        260        270        280        290        300
AGAACAGGTTCACCATCTCCAGAGATGATTCACAAAGCATGCTCTTTCTGCAAATGAACAACTTGAAACTGAGGACACAGCCATGTATTACTGTGTGAGA
 D  R  F  T  I  S  R  D  D  S  Q  S  M  L  F  L  Q  M  N  N  L  K  T  E  D  T  A  M  Y  Y  C  V  R
         70                          80                          82 A B C             90

310        320        330        340        350
GATACTCTTGCCTGGTTTGCTTACTGGGGCCAAGGGACTCTGGTCACTGTCTCTGCA
 D  T  L  A  W  F  A  Y  W  G  Q  G  T  L  V  T  V  S  A
         100                         110        113
```

Figure 7A

Hybridoma 4C2 Light Chain Sequence

```
         10        20        30        40        50        60        70        80        90       100
CAAATTGTTCTCACCCAGTCTCCAGCAATCATGTCTGCATCTCCAGGGGAGAAGGTCACCATAACCTGCAGTGCCAGCTCAAGTGTAAGTTACATGCACT
 Q  I  V  L  T  Q  S  P  A  I  M  S  A  S  P  G  E  K  V  T  I  T  C  S  A  S  S  S  V  S  Y  M  H
                        10                      20                              27 29 30

110       120       130       140       150       160       170       180       190       200
GGTTCCAGCAGAAGCCAGACTTCTCCAAACCTGGATTTATAGCACATCCAACATCCAAGCTGGCTTCTGGAGTCCCTGCTCGCTTCAGTGGCAGTGGATCTGGG
 W  F  Q  Q  K  P  D  T  S  P  K  L  W  I  Y  S  T  S  N  L  A  S  G  V  P  A  R  F  S  A  S  G  S  G
                40                      50                              60

210       220       230       240       250       260       270       280       290       300
GACCTCTTACTCTCTCACAATCAGCCGAATGGAGGCTGAAGATGCTGCCACTTATTACTGCCAGCAAAAGACTAGTTACCCACTCACGTTCGGTGCTGGG
 T  S  Y  S  L  T  I  S  R  M  E  A  E  D  A  A  T  Y  Y  C  Q  Q  K  T  S  Y  P  L  T  F  G  A  G
                70                      80                              90                      100

310
ACCAAGCTGGAGCTGAAA
 T  K  L  E  L  K
                106 A
```

Figure 7B

Hybridoma 5B2 Heavy Chain Sequence

```
         10        20        30        40        50        60        70        80        90       100
GAGGTGCAGCTTGTTGAGACTGGTGGAGGATTGGTGCAGCCTAAAGGGTCATTGAAACTCTCATGTGCAGCCTCTGGATTCACTTCAATACCAATGCCA
 E  V  Q  L  V  E  T  G  G  G  L  V  Q  P  K  G  S  L  K  L  S  C  A  A  S  G  F  T  F  N  T  N  A
                              10                      20                      30

110       120       130       140       150       160       170       180       190       200
TGAACTGGGTCCGCCAGGCTCCAGGAAAAGGGTTTGGAATGGGTTGCTCGGATAAGAAGTAAAAGTAATAATTATGCAACATATTATGCCGATTCAGTGAA
 M  N  W  V  R  Q  A  P  G  K  G  L  E  W  V  A  R  I  R  S  K  S  N  N  Y  A  T  Y  Y  A  D  S  V  K
                      40                      50  52 A B C                60

210       220       230       240       250       260       270       280       290       300
AGAGAGGTTCACCATCTCCAGAGATGATTCACAAAACATGTTCTATCTGCAAATGAACAACTTGAAGACTGAGGACACAGCCATGTATTACTGTGTGAGA
 D  R  F  T  I  S  R  D  D  S  Q  N  M  F  Y  L  Q  M  N  N  L  K  T  E  D  T  A  M  Y  Y  C  V  R
              70                      80  82 A B C              90

310       320       330       340       350
GATACGGCTACGTGGTTTGCTTACTGGGGCCAAGGGACTCTGGTCACTGTCTCTGCA
 D  T  A  T  W  F  A  Y  W  G  Q  G  T  L  V  T  V  S  A
      100                     110         113
```

Figure 10A

Hybridoma 5B2 Light Chain Sequence

```
           10         20         30         40         50         60         70         80         90        100
CAAATTGTTCTCACCCAGTCTCCAGCACTCATGTCTGCATCTCCAGGGGAGAAGGTCACCATAGCCTGCAGTGCCAGCTCAAGTGTAAGTTACATGCACT
 Q  I  V  L  T  Q  S  P  A  L  M  S  A  S  P  G  E  K  V  T  I  A  C  S  A  S  S  S  V  S  Y  M  H
                           10                         20                              27 29 30

110        120        130        140        150        160        170        180        190        200
GGTTCCAGCAGAAGCCAGGCACTTCTCCCAAACTCTGGATTTATAGCACATCCAACCTGGCTTCTGGAGTCCCTGCTCGCTTCAGTGGCAGTGGATCTGG
 W  F  Q  Q  K  P  G  T  S  P  K  L  W  I  Y  S  T  S  N  L  A  S  G  V  P  A  R  F  S  G  S  G
                        40                            50                            60

210        220        230        240        250        260        270        280        290        300
GACCTCTTACTCTCTCACAATCAGCCGAATGGAGGCTGAAGATGCTGCCACTTATTACTGCCAGCAAAAGACTAGTTACCCACCCACGTTCGGCTCGGGG
 T  S  Y  S  L  T  I  S  R  M  E  A  E  D  A  A  T  Y  Y  C  Q  Q  K  T  S  Y  P  P  T  F  G  S  G
                        80                            90                           100

310
ACAAAGTTGGAAATAAAA
 T  K  L  E  I  K
           106 A
```

Figure 10B

Hybridoma 9A3 Heavy Chain Sequence

```
          10        20        30        40        50        60        70        80        90       100
GAAGTGAAGCTGGTGGAGTCTGGGGGAGGCTTAGTGAAGCCTGGAGGGTCCCTGAAACTCTCCTGTGCAGCCTCTGGATTCACTTTCAGAACCTATGCCA
 E  V  K  L  V  E  S  G  G  G  L  V  K  P  G  G  S  L  K  L  S  C  A  A  S  G  F  T  F  R  T  Y  A
                         10                          20                          30

110       120       130       140       150       160       170       180       190       200
TGTCTTGGGTTCGCCAGACTCCAGAGAAGAGGCTGGAGTGGGTCGCAACCATTACTACTGGTGGTCCTACTATTATCCAGACAATGTGAAGGGCCGATT
 M  S  W  V  R  Q  T  P  E  K  R  L  E  W  V  A  T  I  T  T  G  G  P  T  Y  Y  P  D  N  V  K  G  R  F
             40                          50                          60

210       220       230       240       250       260       270       280       290       300
CACCATCTCCAGAGATAATGACAGGAACATCCTGCAAATGAACAGTCTGAGGTCTGAGGACACGGCCACCTATTACTGTTTAAGGGGTGGGACG
 T  I  S  R  D  N  D  R  N  I  L  Q  M  N  S  L  R  S  E  D  T  A  T  Y  Y  C  L  R  G  A
         70                 80  82 A  B  C          90

310       320       330       340
ACGGGTGACTACTGGGGCCAAGGCACCACTCTCATAGTCTCCTCA
 T  G  D  Y  W  G  Q  G  T  T  L  I  V  S  S
 99 101                    110          113
```

Figure 13A

Hybridoma 9A3 Light Chain Sequence

```
         10         20         30         40         50         60         70         80         90        100
GACATTGTGATGACCCAGTCTCACAAATTCATGTTTACATCAGTAGGAGACAGGGTCAGCATCACCTGCAAGGCCAGTCAGGATGTCAGTACTGCTGTAG
 D   I   V   M   T   Q   S   H   K   F   M   F   T   S   V   G   D   R   V   S   I   T   C   K   A   S   H   D   V   S   T   A   V
                         10                          20                          30

110        120        130        140        150        160        170        180        190        200
CCTGGTATCAACAGAAACCAGGACAAATATCCTAAACTACTGATTTACTGGGCATCCAATCGGTACACTGGAGTCCCTGATCGCTTCACTGGCAGTGGCTC
 A   W   Y   Q   Q   K   P   G   Q   Y   P   K   L   L   I   Y   W   A   S   N   R   Y   T   G   V   P   D   R   F   T   G   S   G   S
                 40                          50                          60

210        220        230        240        250        260        270        280        290        300
TGGGATGGATTTCACTTTCACCATCAGCAGTGTGCAGGCTGAAGACCTGGCAGTTTATTACTGTCAGCAACATAGTAGTACTCCGTACACGTTCGGAGGG
 G   M   D   F   T   F   T   I   S   S   V   Q   A   E   D   L   A   V   Y   Y   C   Q   Q   H   S   S   T   P   Y   T   F   G   G
         70                          80                          90                         100

310
GGGACCAGGCTGGAAATAAAAA
 G   T   R   L   E   I   K
                 106 A
```

Figure 13B

ANTI-HUMAN GRP94 ANTIBODIES AND USES

CROSS-REFERENCE TO RELATED APPLICATIONS

This application is a Continuation-in-Part of PCT International Application No. PCT/IL2021/050678, which claims the benefit of Israel Patent Application Serial Number 275186 filed Jun. 7, 2020. All of these applications are hereby incorporated by reference in their entirety herein.

SEQUENCE LISTING STATEMENT

The instant application contains a Sequence Listing which has been submitted electronically in XML format and is hereby incorporated by reference in its entirety. The XML format copy, created on Dec. 1, 2022, is named P-592926-US_01DEC22.XML and is 67.4 KB in size.

FIELD OF INTEREST

Disclosed here are isolated anti-Grp94 antibodies and compositions thereof. Further, disclosed herein are polynucleotide sequences encoding CDR, variable heavy, and variable light chain sequences of these anti-Grp94 antibodies. Methods of use of the anti-Grp94 antibodies and compositions thereof include for the treatment of a disease or condition associated with cellular senescence in a subject in need.

BACKGROUND

Cellular senescence is an essentially irreversible cell cycle arrest that occurs in normal proliferating cells in response to various forms of cellular stress. Replicative exhaustion, oncogene activation, direct DNA damage, cell-cell fusion, and other forms of stress that elicit activation of the DNA damage response pathway can lead to senescence. In certain instances, senescence acts as a bona fide tumor suppression mechanism, limits tissue damage, and aids wound healing. Despite the protective role of senescence as a cellular response to stress, studies in mouse models and humans have shown that the long-term presence of senescent cells that form as a result of this response may be detrimental to the organism.

At the late stages of life, senescent cells increasingly accumulate in tissues and contribute to the establishment of a chronic "sterile" inflammation that arises due to continuous secretion of proinflammatory cytokines (11, 26, 27). This condition, also known as "inflammaging" is a pervasive feature of the majority of age-related diseases. Indeed, senescent cells are especially abundant at sites of age-related pathologies, and a growing body of evidence from mouse models demonstrates a causal role for senescent cells in the pathogenesis of age-related diseases including atherosclerosis, idiopathic lung fibrosis, chronic obstructive pulmonary disease, osteoarthritis, bone loss, and hepatic steatosis. Furthermore, genetic approaches to promoting clearance of p16-expressing senescent cells in mice delay the onset of age-related deterioration of several organs and increase median survival of the mice. Hence, elimination of senescent cells might be a promising approach for treatment and prevention of many age-related diseases, hopefully leading to healthy longevity.

Organisms may have developed elaborate mechanisms to eliminate senescent cells in order to avoid their deleterious effects on the microenvironment. However, their fate in tissue is not well characterized. On one hand, benign melanocytic nevi (moles) are highly enriched for senescent cells, yet can exist in skin throughout a lifetime, implying that senescent cells can be stably incorporated into tissues. On the other hand, it has been previously shown that components of the innate immune system specifically recognize and eliminate senescent cells in vitro and target senescent cells in vivo leading to tumor regression and reversion of liver fibrosis. Therefore, senescent cells can turn over in vivo and the immune system contributes to this turnover. The effort that the immune system invests in recognition and elimination of senescent cells suggests, although not directly, that senescent cells are deleterious for the organism and their elimination is beneficial.

Thus, there is growing interest in the possibility of targeting senescent cells therapeutically. One of the most prominent features of these cells is their relative resistance to apoptosis. Unlike normal cells, senescent cells are protected from both intrinsic and extrinsic proapoptotic signals, a property that allows them to persist and promote diverse biological processes under stress conditions.

International PCT Application Publication No. WO 2016/185481 disclosed that Grp94 is upregulated on the surface of senescent cells. It was disclosed that glucose regulated protein 94 (Grp94), is an ER chaperone, which upon induction of senescence translocates to cell surface and accumulate in these cells in a time-dependent manner. Further, it was shown that extracellular Grp94 on senescent cells mediated cytotoxicity of innate components in-vitro.

There remains an unmet need for compositions and methods of treatment of diseases and conditions associated with cellular senescence and related to age-related conditions and diseases including but not limited to inflammatory diseases and fibrotic diseases. Use of an anti-human Grp94 antibody in methods of treatments associated with cellular senescence may present a novel for targeting and eliminating senescent cells.

SUMMARY

Described herein in one aspect is an isolated anti-Grp94 antibody, wherein the antibody comprises a heavy chain variable region having complementarity determining region 1 (HCDR1), HCDR2 and HCDR3, said HCDR1, HCDR2 and HCDR3 comprise amino acid sequences of SEQ ID NOs: 6-8, respectively; SEQ ID NOs: 6, 7, 20, respectively; or SEQ ID NOs: 29-31, respectively. In a related aspect, the antibody is an IgG, a Fv, a scFv, a Fab, or a F(ab')2 antibody. In a further related aspect, the amino acid sequence of said heavy chain variable region comprises a humanized framework (FR) sequence.

In another related aspect, disclosed herein is a composition comprising the isolated antibody comprising comprises a heavy chain variable region having complementarity determining region 1 (HCDR1), HCDR2 and HCDR3, said HCDR1, HCDR2 and HCDR3 comprise amino acid sequences of SEQ ID NOs: 6-8, respectively; SEQ ID NOs: 6, 7, 20, respectively; or SEQ ID NOs: 29-31, respectively, and a pharmaceutically acceptable carrier.

In one aspect, disclosed herein is an isolated anti-Grp94 antibody, wherein the antibody comprises a light chain variable region having complementarity determining region 1 (LCDR1), LCDR2 and LCDR3, said LCDR1, LCDR2 and LCDR3 comprise amino acid sequences of SEQ ID NOs: 14-16, respectively; or SEQ ID NOs: 37-39, respectively. In a related aspect, the antibody is an IgG, a Fv, a scFv, a Fab, or a F(ab')2 antibody. In a further related aspect, the amino acid sequence of said light chain variable region comprises a humanized framework (FR) sequence.

In another related aspect, disclosed herein is a composition comprising the isolated antibody comprising a light chain variable region having complementarity determining region 1 (LCDR1), LCDR2 and LCDR3, said LCDR1, LCDR2 and LCDR3 comprise amino acid sequences of SEQ ID NOs: 14-16, respectively; or SEQ ID NOs: 37-39, respectively, and a pharmaceutically acceptable carrier.

In another related aspect, disclosed herein is an isolated anti-Grp94 antibody, wherein the antibody comprises a heavy chain variable region comprising complementarity determining region 1 (HCDR1), HCDR2 and HCDR3, said HCDR1, HCDR2 and HCDR3 comprise amino acid sequences of SEQ ID NOs: 6-8, respectively; SEQ ID NOs: 6, 7, 20, respectively; or SEQ ID NOs: 29-31, respectively; and a light chain variable region having complementarity determining region 1 (LCDR1), LCDR2 and LCDR3, said LCDR1, LCDR2 and LCDR3 comprise amino acid sequences of SEQ ID NOs: 14-16, respectively; or SEQ ID NOs: 37-39, respectively. In a related aspect, the antibody is an IgG, a Fv, a scFv, a Fab, or a F(ab')2 antibody. In a further related aspect, the amino acid sequence of said heavy chain variable region comprises a humanized framework (FR) sequence and the amino acid sequence of said light chain variable region comprises a humanized FR sequence.

In another related aspect, disclosed herein is a composition comprising the isolated antibody, wherein the antibody comprises a heavy chain variable region comprising complementarity determining region 1 (HCDR1), HCDR2 and HCDR3, said HCDR1, HCDR2 and HCDR3 comprise amino acid sequences of SEQ ID NOs: 6-8, respectively; SEQ ID NOs: 6, 7, 20, respectively; or SEQ ID NOs: 29-31, respectively; and a light chain variable region having complementarity determining region 1 (LCDR1), LCDR2 and LCDR3, said LCDR1, LCDR2 and LCDR3 comprise amino acid sequences of SEQ ID NOs: 14-16, respectively; or SEQ ID NOs: 37-39, respectively, and a pharmaceutically acceptable carrier.

In another aspect, disclosed herein is an isolated anti-Grp94 antibody, wherein the antibody comprises a heavy chain variable region comprising the amino acid sequence of one of SEQ ID NOs:2, 18, 25, or 41. In a related aspect, the antibody is an IgG, a Fv, a scFv, a Fab, or a F(ab')2 antibody. In another related aspect, disclosed herein is a composition comprising the isolated antibody, wherein the antibody comprises a heavy chain variable region comprising the amino acid sequence of one of SEQ ID NOs:2, 18, 25, or 41, and a pharmaceutically acceptable carrier.

In another aspect, disclosed herein is an isolated anti-Grp94 antibody, wherein the antibody comprises a light chain variable region comprising the sequence of one of SEQ ID NOs:10, 22, 33, or 43. In a related aspect, the antibody is an IgG, a Fv, a scFv, a Fab, or a F(ab')2 antibody. In another related aspect, disclosed herein is a composition comprising the isolated antibody wherein the antibody comprises a light chain variable region comprising the sequence of one of SEQ ID NOs:10, 22, 33, or 43, and a pharmaceutically acceptable carrier.

In another aspect, disclosed herein is an isolated anti-Grp94 antibody, wherein the antibody comprises a heavy chain variable region and a light chain variable region having the sequences of one of: SEQ ID NOs: 2 and 10; SEQ ID NOs: 18 and 22; SEQ ID NOs: 25 and 33; or SEQ ID NOs: 41 and 43. In a related aspect, the antibody is an IgG, a Fv, a scFv, a Fab, or a F(ab')$_2$ antibody. In another related aspect, disclosed herein is a composition comprising the isolated antibody wherein the antibody comprises a heavy chain variable region and a light chain variable region having the sequences of one of: SEQ ID NOs: 2 and 10; SEQ ID NOs: 18 and 22; SEQ ID NOs: 25 and 33; or SEQ ID NOs: 41 and 43, and a pharmaceutically acceptable carrier.

In another aspect, disclosed herein is an isolated polynucleotide sequence encoding a heavy chain variable region of an anti-Grp94 antibody, wherein said polynucleotide sequence comprises one of SEQ ID NOs: 1, 17, 24, or 40. In a related aspect, the antibody is an IgG, a Fv, a scFv, a Fab, or a F(ab')2 antibody.

In another aspect, disclosed herein is an isolated polynucleotide sequence encoding a light chain variable region of an anti-Grp94 antibody, wherein said polynucleotide sequence comprises one of SEQ ID NOs: 9, 21, 32, or 42. In a related aspect, the antibody is an IgG, a Fv, a scFv, a Fab, or a F(ab')2 antibody.

In another aspect, disclosed herein is an isolated anti-Grp94 antibody, wherein said antibody comprises a heavy chain comprising a mutation that increases binding to Fcγ receptor. In a related aspect, described herein are isolated anti-Grp94 antibodies further comprising a heavy chain fragment crystallizable region (Fc region), wherein said Fc region comprises at least one amino acid residue substitution comprising S239D, I332E, A330L, G236A, H268F, S324T, S267E, or any combination thereof, wherein fucosylation of the Fc region is reduced in comparison to a Fc region of an anti-Grp94 antibody produced in the presence of fucose; (b) the anti-Grp94 antibody further comprises a Grp94 antibody-drug conjugate; or a combination thereof.

In another aspect, disclosed herein is an isolated polynucleotide sequence encoding a heavy chain variable region of an anti-Grp94 antibody and a light chain variable region of the anti-Grp94 antibody, wherein said polynucleotide sequence comprises SEQ ID NO: 1 and SEQ ID NO: 9, SEQ ID NO: 17 and SEQ ID NO: 21, SEQ ID NO: 24 and SEQ ID NO: 32, or SEQ ID NO: 40 and SEQ ID NO: 42. In a related aspect, the antibody is an IgG, a Fv, a scFv, a Fab, or a F(ab')2 antibody.

In a related aspect, disclosed herein is a vector comprising the polynucleotide sequence of any of the heavy chain variable regions or light chain variable regions, or combinations thereof, or CDRs as described herein. In a related aspect, disclosed herein is a host cell comprising a vector comprising the polynucleotide sequence of any of the heavy chain variable regions, light chain variable regions, or CDRs as described herein.

In another aspect, disclosed herein is a pharmaceutical composition comprising an anti-Grp94 antibody as described herein for the treatment of a disease or condition associated with cellular senescence in a subject in need. In a related aspect, the disease or condition associated with cellular senescence is an age-related disease or condition. In another related aspect, age-related disease comprises a fibrotic disease or condition, or an inflammatory disease or condition.

BRIEF DESCRIPTION OF THE DRAWINGS

The subject matter is particularly pointed out and distinctly claimed in the concluding portion of the specification. The anti-human Grp94 antibodies disclosed in detail herein, features thereof and uses thereof, however, both as to organization and method of operation, together with objects, features, and advantages thereof, may best be understood by reference to the following detailed description when read with the accompanying drawings in which:

FIGS. 4A and 4B show the binding of an isotype IgG1 isotype control to growing and senescent cells.

FIG. 5A shows isotype control staining of growing (non-senescent) and senescent IMR-90 cells. FIG. 5B shows significantly increased labeling of senescent IMR-90 (ATCC® CCL-186™) compared with control (non-senescent) cells when the supernatant from clone 4C2 was tested.

FIGS. 7A and 7B present the hybridoma variable domain sequences of the 4C2 clone. FIG. 7A presents the hybridoma 4C2 Heavy Chain Sequence (nucleotide sequence—SEQ ID NO: 1; amino acid sequence—SEQ ID NO: 2). FIG. 7B presents the hybridoma 4C2 Light Chain Sequence (nucleotide sequence—SEQ ID NO: 9; amino acid sequence—SEQ ID NO: 10). CDR definition and protein sequence numbering is according to Kabat, except VH CDR1, which is defined using Kabat and Chothia. CDR nucleotide and amino acid sequences are highlighted in red.

FIG. 8A presents the hybridoma 4C2 Heavy Chain chromatogram and FIG. 8B presents the hybridoma 4C2 Kappa Light Chain chromatogram.

FIGS. 10A and 10B present the hybridoma variable domain sequences of the 5B2 clone. FIG. 10A presents the hybridoma 5B2 Heavy Chain Sequence (nucleotide sequence—SEQ ID NO: 17; amino acid sequence—SEQ ID NO: 18). FIG. 10B presents the hybridoma 5B2 Light Chain Sequence (nucleotide sequence—SEQ ID NO: 21; amino acid sequence—SEQ ID NO: 22). CDR definition and protein sequence numbering is according to Kabat, except VH CDR1, which is defined using Kabat and Chothia. CDR nucleotide and amino acid sequences are highlighted in red.

FIG. 11A presents the hybridoma 5B2 Heavy Chain chromatogram and FIG. 11B presents the hybridoma 5B2 Kappa Light Chain chromatogram.

FIGS. 13A and 13B present the hybridoma variable domain sequences of the 9A3 clone. FIG. 13A presents the hybridoma 9A3 Heavy Chain Sequence (nucleotide sequence—SEQ ID NO: 24; amino acid sequence—SEQ ID NO: 25). FIG. 13B presents the hybridoma 9A3 Light Chain Sequence (nucleotide sequence—SEQ ID NO: 32; amino acid sequence—SEQ ID NO: 33). CDR definition and protein sequence numbering is according to Kabat, except VH CDR1, which is defined using Kabat and Chothia. CDR nucleotide and amino acid sequences are highlighted in red.

FIG. 14A presents the hybridoma 9A3 Heavy Chain chromatogram and FIG. 14B presents the hybridoma 9A3 Kappa Light Chain chromatogram.

(FIG. 17B) 4C2 binding to non-permeabilized IPF and normal lung fibroblasts as measured by FACS (average of 2 experiments), demonstrating preferential binding of 4C2 to IPF patient fibroblasts.

FIG. 18A shows that the optimized antibody maintains binding to cell surface Grp94 on senescent cells. FIG. 18B shows that the optimized antibody has ADCC activity. FIG. 18C presents ADCC Activity of the optimized antibody compared with an antibody with wild-type Fc.

DETAILED DESCRIPTION

Figure 1:
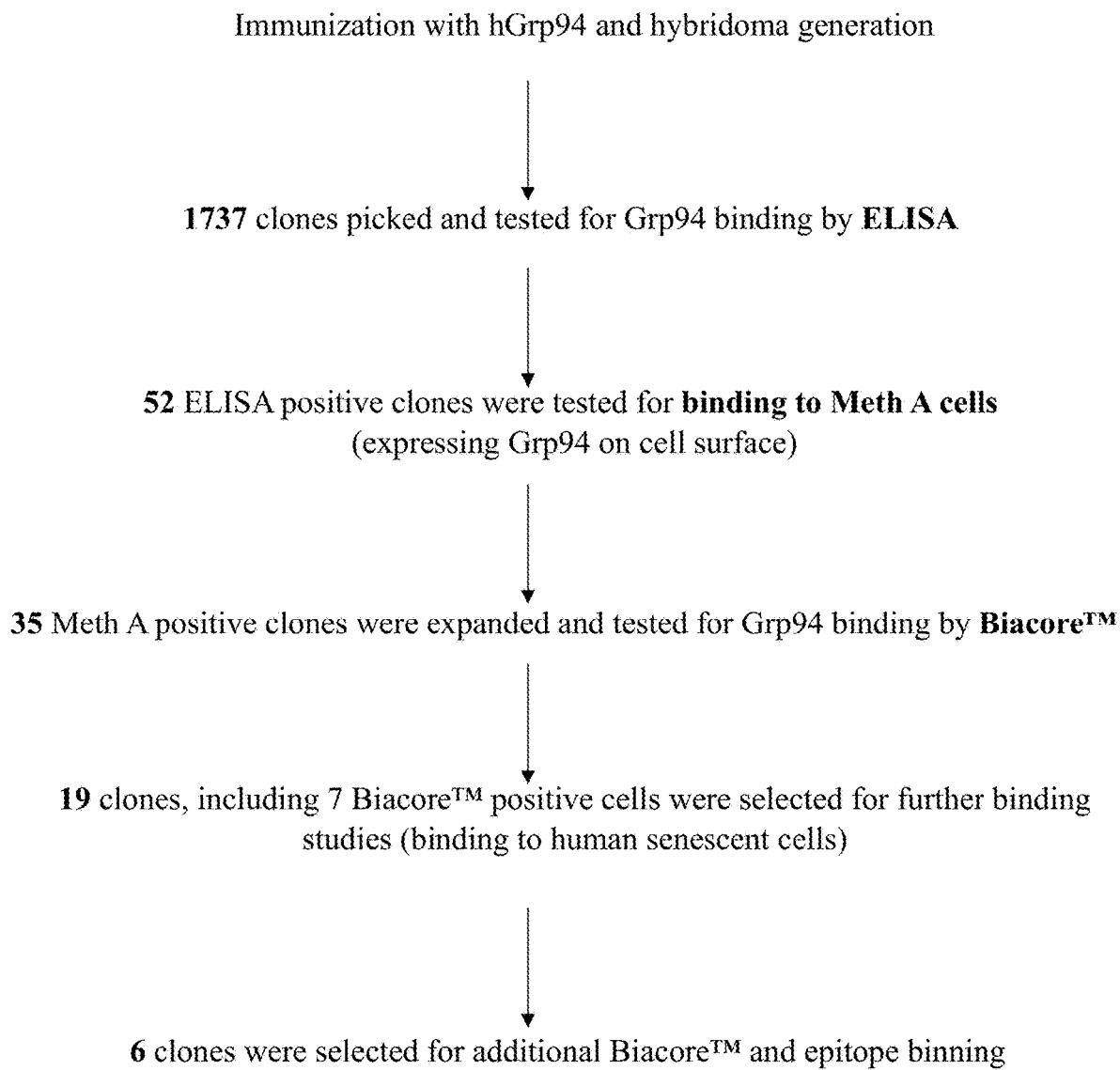
FIG. 1 presents a flow chart providing an overview of the steps performed to produce and analyze the anti-human Grp94 monoclonal antibody hybridomas.

In the following detailed description, numerous specific details are set forth in order to provide a thorough understanding of the anti-Grp94 antibodies disclosed herein. However, it will be understood by those skilled in the art that preparation and uses of antibodies disclosed herein may in certain cases be practiced without these specific details. In other instances, well-known methods, procedures, and components have not been described in detail so as not to obscure the disclosure presented herein.

Throughout this application, various references or publications are cited. Disclosures of these references or publications in their entireties are hereby incorporated by reference into this application in order to more fully describe the state of the art.

As used herein, the term "antibody" may be used interchangeably with the term "immunoglobulin", having all the same qualities and meanings. An antibody binding domain or an antigen binding site can be a fragment of an antibody or a genetically engineered product of one or more fragments of the antibody, which fragment is involved in specifically binding with a target antigen.

By "specifically binding" is meant that the binding is selective for the antigen of interest and can be discriminated from unwanted or nonspecific interactions. For example, an antibody is said to specifically bind a Grp94 epitope when the equilibrium dissociation constant is $\leq 10^{-5}$, $10^{-6}$, or $10^{-7}$ M. In some embodiments, the equilibrium dissociation constant may be $\leq 10^{-8}$ M or $10^{-9}$ M. In some further embodiments, the equilibrium dissociation constant may be $\leq 10^{-10}$ M, $10^{-11}$ M, or $10^{-12}$ M. In some embodiments, the equilibrium dissociation constant may be in the range of $\leq 10^{-5}$ M to $10^{-12}$ M.

As used herein, the term "antibody" encompasses an antibody fragment or fragments that retain binding specificity including, but not limited to, IgG, heavy chain variable region (VH), light chain variable region (VL), Fab fragments, F(ab')2 fragments, scFv fragments, Fv fragments, a nanobody, minibodies, diabodies, triabodies, tetrabodies, and single domain antibodies (see, e.g., Hudson and Souriau, Nature Med. 9: 129-134 (2003)).

A skilled artisan would appreciate that the term "antibody" encompasses not only intact polyclonal or monoclonal antibodies, but also humanized antibodies. In some embodiments, anti-Grp94 antibodies encompassed are humanized or primatized antibodies as these terms are generally understood in the art.

As used herein, the term "heavy chain variable region" may be used interchangeably with the term "VH domain" or the term "VH", having all the same meanings and qualities. As used herein, the term "light chain variable region" may be used interchangeably with the term "VL domain" or the term "VL", having all the same meanings and qualities. A skilled artisan would recognize that a "heavy chain variable region" or "VH" with regard to an antibody encompasses the fragment of the heavy chain that contains three complementarity determining regions (CDRs) interposed between flanking stretches known as framework regions. The framework regions (FR) are more highly conserved than the CDRs, and form a scaffold to support the CDRs. Similarly, a skilled artisan would also recognize that a "light chain variable region" or "VL" with regard to an antibody encompasses the fragment of the light chain that contains three CDRs interposed between framework regions.

As used herein, the term "complementarity determining region" or "CDR" refers to the hypervariable region(s) of a heavy or light chain variable region. Proceeding from the N-terminus, each of a heavy or light chain polypeptide has three CDRs denoted as "CDR1," "CDR2," and "CDR3". Crystallographic analysis of a number of antigen-antibody complexes has demonstrated that the amino acid residues of CDRs form extensive contact with a bound antigen, wherein the most extensive antigen contact is with the heavy chain CDR3. Thus, the CDR regions are primarily responsible for the specificity of an antigen-binding site. In one embodiment, an antigen-binding site includes six CDRs, comprising the CDRs from each of a heavy and a light chain variable region.

As used herein, the term "framework region" or "FR" refers to the four flanking amino acid sequences which frame the CDRs of a heavy or light chain variable region. Some FR residues may contact bound antigen; however, FR residues are primarily responsible for folding the variable region into the antigen-binding site. In some embodiments, the FR residues responsible for folding the variable regions comprise residues directly adjacent to the CDRs. Within FRs, certain amino residues and certain structural features are very highly conserved. In this regard, all variable region sequences contain an internal disulfide loop of around 90 amino acid residues. When a variable region folds into an antigen binding site, the CDRs are displayed as projecting loop motifs that form an antigen-binding surface. It is generally recognized that there are conserved structural regions of FR that influence the folded shape of the CDR loops into certain "canonical" structures regardless of the precise CDR amino acid sequence. Furthermore, certain FR residues are known to participate in non-covalent interdomain contacts which stabilize the interaction of the antibody heavy and light chains.

Wu and Kabat (Tai Te Wu, Elvin A. Kabat. An analysis of the sequences of the variable regions of bence jones proteins and myeloma light chains and their implications for antibody complementarity. Journal of Experimental Medicine, 132, 2, 8 (1970); Kabat E A, Wu T T, Bilofsky H, Reid-Miller M, Perry H. Sequence of proteins of immunological interest. Bethesda: National Institute of Health; 1983. 323 (1983)) pioneered the alignment of antibody peptide sequences, and their contributions in this regard were several-fold: Firstly, through study of sequence similarities between variable domains, they identified correspondent residues that to a greater or lesser extent were homologous across all antibodies in all vertebrate species, inasmuch as they adopted similar three-dimensional structure, played similar functional roles, interacted similarly with neighboring residues, and existed in similar chemical environments. Secondly, they devised a peptide sequence numbering system in which homologous immunoglobulin residues were assigned the same position number. One skilled in the art can unambiguously assign to any variable domain sequence what is now commonly called Kabat numbering without reliance on any experimental data beyond the sequence itself. Thirdly, Kabat and Wu calculated variability for each Kabat-numbered sequence position, by which is meant the finding of few or many possible amino acids when variable domain sequences are aligned. They identified three contiguous regions of high variability embedded within four less variable contiguous regions. Kabat and Wu formally demarcated residues constituting these variable tracts, and designated these "complementarity determining regions" (CDRs), referring to chemical complementarity between antibody and antigen. A role in three-dimensional folding of the variable domain, but not in antigen recognition, was ascribed to the remaining less-variable regions, which are now termed "framework regions". Fourth, Kabat and Wu established a public database of antibody peptide and nucleic acid sequences, which continues to be maintained and is well known to those skilled in the art.

Antigen binding sequences are conventionally located within the heavy chain and light chain variable regions of an antibody.

An antibody may exist in various forms or having various domains including, without limitation, a complementarity determining region (CDR), a variable region (Fv), a VH domain, a VL domain, a single chain variable region (scFv), and a Fab fragment.

A person of ordinary skill in the art would appreciate that a scFv is a fusion polypeptide comprising the variable heavy chain (VH) and variable light chain (VL) regions of an immunoglobulin, connected by a short linker peptide, the linker may have, for example, 10 to about 25 amino acids.

A skilled artisan would also appreciate that the term "Fab" with regard to an antibody generally encompasses that portion of the antibody consisting of a single light chain (both variable and constant regions) bound to the variable region and first constant region of a single heavy chain by a disulfide bond, whereas F(ab')$_2$ comprises a fragment of a heavy chain comprising a VH domain and a light chain comprising a VL domain.

In some embodiments, an antibody encompasses whole antibody molecules, including monoclonal and polyclonal antibodies. In some embodiments, an antibody encompasses an antibody fragment or fragments that retain binding specificity including, but not limited to, variable heavy chain (VH) fragments, variable light chain (VL) fragments, Fab fragments, F(ab')$_2$ fragments, scFv fragments, Fv fragments, minibodies, diabodies, triabodies, and tetrabodies.

A skilled artisan would appreciate that the term "isolated antibody" may encompass an antibody that is substantially free of other antibodies having different antigenic specificities (e.g., an isolated antibody that specifically binds human Grp94 (hGrp94) is substantially free of antibodies that specifically bind antigens other than hGrp94. An isolated antibody that specifically binds hGrp94 may, however, have cross-reactivity to other antigens, such as Grp94 molecules from other species. Moreover, an isolated antibody may be substantially free of other cellular material and/or chemicals.

Anti-Grp94 Antibodies

In certain embodiments, the present disclosure provides an isolated anti-Grp94 antibody, wherein the antibody comprises a heavy chain variable region having complementarity determining regions (CDR) H-CDR1, H-CDR2, and H-CDR3. In some embodiments, the FR region around the heavy chain H-CDRs comprises the amino acid FR sequences of the mouse monoclonal from which the heavy chain CDR regions were derived. In some embodiments, the FR region around the heavy chain CDRs comprises a humanized amino acid FR sequence. In one embodiment, the present disclosure also encompasses a composition comprising the above-mentioned antibody and a pharmaceutically acceptable carrier.

In certain embodiments, the present disclosure provides an isolated anti-Grp94 antibody, wherein the antibody comprises a light chain variable region having complementarity determining regions (CDR) L-CDR1, L-CDR2, and L-CDR3. In some embodiments, the FR region around the light chain CDRs comprises the amino acid FR sequences of the mouse monoclonal from which the light chain CDR regions were derived. In some embodiments, the FR region around the light chain CDRs comprises a humanized amino acid FR sequence. In one embodiment, the present disclosure also encompasses a composition comprising the above-mentioned antibody and a pharmaceutically acceptable carrier.

In certain embodiments, the present disclosure provides an isolated anti-Grp94 antibody, wherein the antibody comprises a heavy chain variable region having complementarity determining regions (CDR) H-CDR1, H-CDR2, and H-CDR3, and a light chain variable region having complementarity determining regions (CDR) L-CDR1, L-CDR2, and L-CDR3. In some embodiments, the FR region around the heavy chain and the FR region around the light chain CDRs comprises the amino acid FR sequences of the mouse monoclonal from which the heavy and light chain CDR regions were derived. In some embodiments, the FR region around the heavy chain CDRs and the FR region around the light chain CDRs comprises humanized amino acid FR sequences. In one embodiment, the present disclosure also encompasses a composition comprising the above-mentioned antibody and a pharmaceutically acceptable carrier.

In certain embodiments of an isolated anti-Grp94 antibody as disclosed herein, the antibody comprises heavy and light chain variable CDR regions sequences from one species but FR sequences of another species. Non-limiting examples of such antibodies are isolated anti-Grp94 antibodies comprising mouse H-CDR and L-CDR regions and human FR heavy and light chain variable regions, for example, wherein the H-CDR and L-CDR regions are obtained from a murine monoclonal antibody to human Grp94.

In some embodiments, an isolated anti-Grp94 antibody disclosed herein comprises a heavy chain variable region having complementarity determining region 1 (H-CDR1), H-CDR2 and H-CDR3, wherein the H-CDR1, H-CDR2 and H-CDR3 comprise amino acid sequences of SEQ ID NOs: 6-8, respectively. In some embodiments, an isolated anti-Grp94 antibody disclosed herein comprises a heavy chain variable region having complementarity determining region 1 (H-CDR1), H-CDR2 and H-CDR3, wherein the H-CDR1, H-CDR2 and H-CDR3 comprise amino acid sequences of SEQ ID NOs: 6, 7, 20, respectively. In some embodiments, an isolated anti-Grp94 antibody disclosed herein comprises a heavy chain variable region having complementarity determining region 1 (H-CDR1), H-CDR2 and H-CDR3, wherein the H-CDR1, H-CDR2 and H-CDR3 comprise amino acid sequences of SEQ ID NOs: 29-31, respectively. In some embodiments, an isolated anti-Grp94 antibody disclosed herein comprises a heavy chain variable region having complementarity determining region 1 (H-CDR1), H-CDR2 and H-CDR3, wherein the H-CDR1, H-CDR2 and H-CDR3 comprise amino acid sequences of SEQ ID NOs: 6-8, respectively; or SEQ ID NOs: 6, 7, 20, respectively; or SEQ ID NOs: 29-31, respectively.

In some embodiments, disclosed herein is an isolated anti-Grp94 comprising a heavy chain variable region (VH) and a light chain variable region (VL), wherein said VH comprises heavy chain complementarity determining regions (HCDRs) HCDR1, HCDR2 and HCDR3, said VL comprises light chain complementarity determining regions (LCDRs) LCDR1, LCDR2 and LCDR3, wherein said CDRs have the amino acid sequences of
  (a) the HCDR1 comprises the amino acid sequence of SEQ ID NO:6, the HCDR2 comprises the amino acid sequence of SEQ ID NO:7, the HCDR3 comprises the amino acid sequence of SEQ ID NO:8, the LCDR1 comprises the amino acid sequence of SEQ ID NO:14, the LCDR2 comprises the amino acid sequence of SEQ ID NO:15, the LCDR3 comprises the amino acid sequence of SEQ ID NO:16;
  (b) the HCDR1 comprises the amino acid sequence of SEQ ID NO:6, the HCDR2 comprises the amino acid sequence of SEQ ID NO:7, the HCDR3 comprises the amino acid sequence of SEQ ID NO:20, the LCDR1 comprises the amino acid sequence of SEQ ID NO:14, the LCDR2 comprises the amino acid sequence of SEQ ID NO:15, the LCDR3 comprises the amino acid sequence of SEQ ID NO:16; or (c) the HCDR1 comprises the amino acid sequence of SEQ ID NO:29, the HCDR2 comprises the amino acid sequence of SEQ ID NO:30, the HCDR3 comprises the amino acid sequence of SEQ ID NO:31, the LCDR1 comprises the amino acid sequence of SEQ ID NO:37, the LCDR2 comprises the amino acid sequence of SEQ ID NO:38, the LCDR3 comprises the amino acid sequence of SEQ ID NO:39; or said VH and VL have the amino acid sequences set forth in SEQ ID NOs: 41 and 43, respectively.

In certain embodiments, disclosed here is an antibody comprising a VH and a VL having the amino acid sequences set forth in SEQ ID NOs: 2 and 10, respective, or comprising a VH and a VL having the amino acid sequences set forth in SEQ ID NOs: 18 and 22, respectively, or comprising a VH and a VL having the amino acid sequences set forth in SEQ ID NOs: 25 and 33.

In certain embodiments, disclosed here is an antibody comprising a VH and a VL having the amino acid sequences set forth in SEQ ID NOs: 2 and 10, respective. In certain embodiments, disclosed here is an antibody comprising a VH and a VL having the amino acid sequences set forth in SEQ ID NOs: 18 and 22, respective. In certain embodiments, disclosed here is an antibody comprising a VH and a VL having the amino acid sequences set forth in SEQ ID NOs: 25 and 33, respective. In certain embodiments, disclosed here is an antibody comprising a VH and a VL having the amino acid sequences set forth in SEQ ID NOs: 41 and 43, respective.

In certain embodiments of an isolated anti-Grp94 antibody, the amino acid sequence of said heavy chain variable region comprises a humanized framework (FR) sequence. In some embodiments of an isolated anti-Grp94 antibody, wherein the antibody heavy chain sequence comprises H-CDR1, H-CDR2 and H-CDR3 comprising amino acid sequences of SEQ ID NOs: 6-8, respectfully, the FR amino acid sequence comprises humanized sequence. In some embodiments of an isolated anti-Grp95 antibody, wherein the antibody heavy chain sequence comprises H-CDR1, H-CDR2 and H-CDR3 comprising amino acid sequences of SEQ ID NOs: 6, 7, 20, respectfully, the FR amino acid sequence comprises humanized sequence. In some embodiments of an isolated anti-Grp94 antibody, wherein the antibody heavy chain sequence comprises H-CDR1, H-CDR2 and H-CDR3 comprising amino acid sequences of SEQ ID NOs: 29-31, respectfully, the FR amino acid sequence comprises humanized sequence. In one embodiment, the present disclosure also encompasses a composition comprising the above-mentioned antibody and a pharmaceutically acceptable carrier.

In some embodiments, an anti-Grp94 IgG antibody comprises a heavy chain comprising a mutation that that increases binding to a Fcγ receptor (FcγRs). In some embodiments, an anti-Grp94 IgG antibody comprises an Fc region comprising a mutation.

In certain embodiments of an isolated anti-Grp94 antibody comprising a heavy chain variable region having complementarity determining region 1 (H-CDR1), H-CDR2 and H-CDR3, the antibody is an IgG, a Fv, a scFv, a Fab, or a F(ab')$_2$. The IgG can be of the subclass of IgG1, IgG2, IgG3, or IgG4. In certain embodiments of an isolated anti-Grp94 antibody comprising a heavy chain variable region having complementarity determining region 1 (H-CDR1), H-CDR2 and H-CDR3, the antibody is an IgG. In certain embodiments of an isolated anti-Grp94 antibody comprising a heavy chain variable region having complementarity determining region 1 (H-CDR1), H-CDR2 and H-CDR3, the antibody is an IgG1. In certain embodiments of an isolated anti-Grp94 antibody comprising a heavy chain variable region having complementarity determining region 1 (H-CDR1), H-CDR2 and H-CDR3, the antibody is an IgG2. In certain embodiments of an isolated anti-Grp94 antibody comprising a heavy chain variable region having complementarity determining region 1 (H-CDR1), H-CDR2 and H-CDR3, the antibody is an IgG3. In certain embodiments of an isolated anti-Grp94 antibody comprising a heavy chain variable region having complementarity determining region 1 (H-CDR1), H-CDR2 and H-CDR3, the antibody is an IgG4. In certain embodiments of an isolated anti-Grp94 antibody comprising a heavy chain variable region having complementarity determining region 1 (H-CDR1), H-CDR2 and H-CDR3, the antibody is a Fv. In certain embodiments of an isolated anti-Grp94 antibody comprising a heavy chain variable region having complementarity determining region 1 (H-CDR1), H-CDR2 and H-CDR3, the antibody is an scFv. In certain embodiments of an isolated anti-Grp94 antibody comprising a heavy chain variable region having complementarity determining region 1 (H-CDR1), H-CDR2 and H-CDR3, the antibody is a Fab. In certain embodiments of an isolated anti-Grp94 antibody comprising a heavy chain variable region having complementarity determining region 1 (H-CDR1), H-CDR2 and H-CDR3, the antibody is a F(ab')2. In one embodiment, the present disclosure also encompasses a composition comprising the above-mentioned antibody and a pharmaceutically acceptable carrier.

In some embodiments, an isolated anti-Grp94 antibody disclosed herein comprises a light chain variable region having complementarity determining region 1 (L-CDR1), L-CDR2 and L-CDR3, wherein the L-CDR1, L-CDR2 and L-CDR3 comprise amino acid sequences of SEQ ID NOs: 14-16, respectively. In some embodiments, an isolated anti-Grp94 antibody disclosed herein comprises a light chain variable region having complementarity determining region 1 (L-CDR1), L-CDR2 and L-CDR3, wherein the L-CDR1, L-CDR2 and L-CDR3 comprise amino acid sequences of SEQ ID NOs: 14, 15, 23, respectively. In some embodiments, an isolated anti-Grp94 antibody disclosed herein comprises a light chain variable region having complementarity determining region 1 (L-CDR1), L-CDR2 and L-CDR3, wherein the L-CDR1, L-CDR2 and L-CDR3 comprise amino acid sequences of SEQ ID NOs: 37-39, respectively. In some embodiments, an isolated anti-Grp94 antibody disclosed herein comprises a light chain variable region having complementarity determining region 1 (L-CDR1), L-CDR2 and L-CDR3, wherein the L-CDR1, L-CDR2 and L-CDR3 comprise amino acid sequences of SEQ ID NOs: 14-16, respectively; or SEQ ID NOs: 14, 15, 23, respectively; or SEQ ID NOs: 37-39, respectively.

In certain embodiments of an isolated anti-Grp94 antibody, the amino acid sequence of said light chain variable region comprises a humanized framework (FR) sequence. In some embodiments of an isolated anti-Grp94 antibody, wherein the antibody light chain sequence comprises L-CDR1, L-CDR2 and L-CDR3 comprising amino acid sequences of SEQ ID NOs: 14-16, respectfully, the FR amino acid sequence comprises humanized sequence. In some embodiments of an isolated anti-Grp95 antibody, wherein the antibody light chain sequence comprises L-CDR1, L-CDR2 and L-CDR3 comprising amino acid sequences of SEQ ID NOs: 6, 7, 20, respectfully, the FR amino acid sequence comprises humanized sequence. In some embodiments of an isolated anti-Grp94 antibody, wherein the antibody light chain sequence comprises L-CDR1, L-CDR2 and L-CDR3 comprising amino acid sequences of SEQ ID NOs: 29-31, respectfully, the FR amino acid sequence comprises humanized sequence.

In certain embodiments of an isolated anti-Grp94 antibody comprising a light chain variable region having complementarity determining region 1 (L-CDR1), L-CDR2 and L-CDR3, the antibody is an IgG, a Fv, a scFv, a Fab, or a F(ab')$_2$. The IgG can be of the subclass of IgG1, IgG2, IgG3, or IgG4. In certain embodiments of an isolated anti-Grp94 antibody comprising a light chain variable region having complementarity determining region 1 (L-CDR1), L-CDR2 and L-CDR3, the antibody is an IgG. In certain embodiments of an isolated anti-Grp94 antibody comprising a light chain variable region having complementarity determining region 1 (L-CDR1), L-CDR2 and L-CDR3, the antibody is a Fv. In certain embodiments of an isolated anti-Grp94 antibody comprising a light chain variable region having complementarity determining region 1 (L-CDR1), L-CDR2 and L-CDR3, the antibody is an scFv. In certain embodiments of an isolated anti-Grp94 antibody comprising a light chain variable region having complementarity determining region 1 (L-CDR1), L-CDR2 and L-CDR3, the antibody is a Fab. In certain embodiments of an isolated anti-Grp94 antibody comprising a light chain variable region having complementarity determining region 1 (L-CDR1), L-CDR2 and L-CDR3, the antibody is a F(ab')2. In one embodiment, the present disclosure also encompasses a composition comprising the above-mentioned antibody and a pharmaceutically acceptable carrier.

In some embodiments, an isolated anti-Grp94 antibody disclosed herein comprises a heavy chain variable region having complementarity determining region 1 (H-CDR1), H-CDR2 and H-CDR3, wherein the H-CDR1, H-CDR2 and H-CDR3 comprise amino acid sequences of SEQ ID NOs: 6-8, respectively, and a light chain variable region having complementarity determining region 1 (L-CDR1), L-CDR2 and L-CDR3, wherein the L-CDR1, L-CDR2 and L-CDR3 comprise amino acid sequences of SEQ ID NOs: 14-16, respectively. In some embodiments, an isolated anti-Grp94 antibody disclosed herein comprises a heavy chain variable region having complementarity determining region 1 (H-CDR1), H-CDR2 and H-CDR3, wherein the H-CDR1, H-CDR2 and H-CDR3 comprise amino acid sequences of SEQ ID NOs: 6, 7, 20, respectively; and a light chain variable region having complementarity determining region 1 (L-CDR1), L-CDR2 and L-CDR3, wherein the L-CDR1, L-CDR2 and L-CDR3 comprise amino acid sequences of SEQ ID NOs: 14, 15, 23, respectively. In some embodiments, an isolated anti-Grp94 antibody disclosed herein comprises a heavy chain variable region having complementarity determining region 1 (H-CDR1), H-CDR2 and H-CDR3, wherein the H-CDR1, H-CDR2 and H-CDR3 comprise amino acid sequences of SEQ ID NOs: 29-31, respectively; and a light chain variable region having complementarity determining region 1 (L-CDR1), L-CDR2 and L-CDR3, wherein the L-CDR1, L-CDR2 and L-CDR3 comprise amino acid sequences of SEQ ID NOs: 37-39, respectively. In some embodiments, an isolated anti-Grp94 antibody disclosed herein comprises a heavy chain variable region having complementarity determining region 1 (H-CDR1), H-CDR2 and H-CDR3, wherein the H-CDR1, H-CDR2 and H-CDR3 comprise amino acid sequences of SEQ ID NOs: 6-8, respectively, and a light chain variable region having complementarity determining region 1 (L-CDR1), L-CDR2 and L-CDR3, wherein the L-CDR1, L-CDR2 and L-CDR3 comprise amino acid sequences of SEQ ID NOs: 14-16, respectively; or wherein the H-CDR1, H-CDR2 and H-CDR3 comprise amino acid sequences of SEQ ID NOs: 6, 7, 20, respectively, and the L-CDR1, L-CDR2 and L-CDR3 comprise amino acid sequences of SEQ ID NOs: 14, 15, 23, respectively; or wherein the H-CDR1, H-CDR2 and H-CDR3 comprise amino acid sequences of SEQ ID NOs: 29-31, respectively, and the L-CDR1, L-CDR2 and L-CDR3 comprise amino acid sequences of SEQ ID NOs: 37-39, respectively. In one embodiment, the present disclosure also encompasses a composition comprising the above-mentioned antibody and a pharmaceutically acceptable carrier.

In certain embodiments of an isolated anti-Grp94 antibody, the amino acid sequence of said heavy chain variable region comprises a humanized framework (FR) sequence and the amino acid sequence of the light chain variable region comprises a humanized framework (FR) sequence. In some embodiments of an isolated anti-Grp94 antibody, wherein the antibody heavy chain variable sequence comprises H-CDR1, H-CDR2 and H-CDR3 comprising amino acid sequences of SEQ ID NOs: 6-8, respectively and the variable light chain sequence comprises L-CDR1, L-CDR2 and L-CDR3 comprising amino acid sequences of SEQ ID NOs: 14-16, respectfully, the FR amino acid sequence of the variable heavy and light chain regions comprises humanized sequence. In some embodiments of an isolated anti-Grp94 antibody, wherein the antibody heavy chain variable sequence comprises H-CDR1, H-CDR2 and H-CDR3 comprising amino acid sequences of SEQ ID NOs: 6, 7, 20, respectively and the variable light chain sequence comprises L-CDR1, L-CDR2 and L-CDR3 comprising amino acid sequences of SEQ ID NOs: 14-16, respectfully, the FR amino acid sequence of the variable heavy and light chain regions comprises humanized sequence. In some embodiments of an isolated anti-Grp94 antibody, wherein the antibody heavy chain variable sequence comprises H-CDR1, H-CDR2 and H-CDR3 comprising amino acid sequences of SEQ ID NOs: 29-31, respectively and the variable light chain sequence comprises L-CDR1, L-CDR2 and L-CDR3 comprising amino acid sequences of SEQ ID NOs: 37-39, respectfully, the FR amino acid sequence of the variable heavy and light chain regions comprises humanized sequence.

In certain embodiments of an isolated anti-Grp94 antibody comprising a heavy chain variable region having complementarity determining region 1 (H-CDR1), H-CDR2 and H-CDR3, and a light chain variable region having complementarity determining region 1 (L-CDR1), L-CDR2 and L-CDR3, the antibody is an IgG, a Fv, a scFv, a Fab, or a F(ab')$_2$. The IgG can be of the subclass of IgG1, IgG2, IgG3, or IgG4. In certain embodiments of an isolated anti-Grp94 antibody comprising a heavy chain variable region having complementarity determining region 1 (H-CDR1), H-CDR2 and H-CDR3, and a light chain variable region having complementarity determining region 1 (L-CDR1), L-CDR2 and L-CDR3, the antibody is an IgG1. In certain embodiments of an isolated anti-Grp94 antibody comprising a heavy chain variable region having complementarity determining region 1 (H-CDR1), H-CDR2 and H-CDR3, and a light chain variable region having complementarity determining region 1 (L-CDR1), L-CDR2 and L-CDR3, the antibody is an IgG2. In certain embodiments of an isolated anti-Grp94 antibody comprising a heavy chain variable region having complementarity determining region 1 (H-CDR1), H-CDR2 and H-CDR3, and a light chain variable region having complementarity determining region 1 (L-CDR1), L-CDR2 and L-CDR3, the antibody is an IgG3. In certain embodiments of an isolated anti-Grp94 antibody comprising a heavy chain variable region having complementarity determining region 1 (H-CDR1), H-CDR2 and H-CDR3, and a light chain variable region having complementarity determining region 1 (L-CDR1), L-CDR2 and L-CDR3, the antibody is an IgG4. In one embodiment, the present disclosure also encompasses a composition comprising the above-mentioned antibody and a pharmaceutically acceptable carrier.

In certain embodiments of an isolated anti-Grp94 antibody comprising a heavy chain variable region having complementarity determining region 1 (H-CDR1), H-CDR2 and H-CDR3, and a light chain variable region having complementarity determining region 1 (L-CDR1), L-CDR2 and L-CDR3, the antibody is an IgG. In certain embodiments of an isolated anti-Grp94 antibody comprising a heavy chain variable region having complementarity determining region 1 (H-CDR1), H-CDR2 and H-CDR3, and a light chain variable region having complementarity determining region 1 (L-CDR1), L-CDR2 and L-CDR3, the antibody is a Fv. In certain embodiments of an isolated anti-Grp94 antibody comprising a heavy chain variable region having complementarity determining region 1 (H-CDR1), H-CDR2 and H-CDR3, and a light chain variable region having complementarity determining region 1 (L-CDR1), L-CDR2 and L-CDR3, the antibody is an scFv. In certain embodiments of an isolated anti-Grp94 antibody comprising a heavy chain variable region having complementarity determining region 1 (H-CDR1), H-CDR2 and H-CDR3, and a light chain variable region having complementarity determining region 1 (L-CDR1), L-CDR2 and L-CDR3, the antibody is a Fab. In certain embodiments of an isolated anti-Grp94 antibody comprising a heavy chain variable region having complementarity determining region 1 (H-CDR1), H-CDR2 and H-CDR3, and a light chain variable region having complementarity determining region 1 (L-CDR1), L-CDR2 and L-CDR3, the antibody is a F(ab')2. In one embodiment, the present disclosure also encompasses a composition comprising the above-mentioned antibody and a pharmaceutically acceptable carrier.

In certain embodiments, the present disclosure provides polypeptides comprising the VH and VL domains which could be dimerized under suitable conditions. For example, the VH and VL domains may be combined in a suitable buffer and dimerized through appropriate interactions such as hydrophobic interactions. In another embodiment, the VH and VL domains may be combined in a suitable buffer containing an enzyme and/or a cofactor which can promote dimerization of the VH and VL domains. In another embodiment, the VH and VL domains may be combined in a suitable vehicle that allows them to react with each other in the presence of a suitable reagent and/or catalyst.

In certain embodiments, the VH and VL domains may be contained within longer polypeptide sequences, that may include for example but not limited to, constant regions, hinge regions, linker regions, Fc regions, or disulfide binding regions, or any combination thereof. A constant domain is an immunoglobulin fold unit of the constant part of an immunoglobulin molecule, also referred to as a domain of the constant region (e.g., CH1, CH2, CH3, CH4, Ck, Cl).

A skilled artisan would also appreciate that the term "fragment crystallizable region" ("Fc region" or "Fc domain") encompasses the constant region of an immunoglobulin molecule, the tail region of an antibody that interacts with cell surface receptors called Fc receptors and some proteins of the complement system. This property allows antibodies to activate the immune system. In IgG, IgA and IgD antibody isotypes, the Fc region is composed of two identical protein fragments, derived from the second and third constant domains of the antibody's two heavy chains; IgM and IgE Fc regions contain three heavy chain constant domains (CH domains 2-4) in each polypeptide chain. The Fc regions of IgGs bear a highly conserved N-glycosylation site. Glycosylation of the Fc fragment is essential for Fc receptor-mediated activity.

The Fc region of an antibody interacts with a number of Fc receptors and ligands, imparting an array of important functional capabilities referred to as effector functions. For IgG, the Fc region comprises Ig domains CH2 and CH3. An important family of Fc receptors for the IgG isotype are the Fc gamma receptors (FcγR, FcγR, FCGR). These receptors mediate communication between antibodies and the cellular arm of the immune system. There is a relationship between the structure and composition of human IgG1 Fc chain and the antibody's effector capabilities. For example, fucose removal has been shown to enhance ADCC significantly via improved binding to Fc gamma receptors, and this property applies to antigens at various expression levels (Niwa et al. (2005) Clin. Cancer Res. 11:2327-2336). In addition, several mutations in the Fc chain have been shown to increase binding to Fc gamma receptors and complement and enhance antibody-dependent cellular cytotoxicity (ADCC) and/or complement dependent cytotoxicity (CDC) activities (Moore et al. (2010) mAbs 2:2, 181-189), such as H268F/S324T (FT); S267E/H268F/S324T (EFT); G236A/I332E (AE); S239D/I332E (DE); and combinations thereof (e.g., FT+DE; FT+AE; EFT+AE). Other possible combinations include, but are not limited to, A330L/S239D/I332E (CDE).

In some embodiments, the Fc region of an anti-Grp94 antibody disclosed herein comprises at least one mutation that increases Fc-gamma binding, i.e., binding to a Fcγ receptor (FcγRs). In some embodiments, increased binding increases the binding affinity to a Fcγ receptor. In some embodiments, increased binding increases the on rate for binding to a Fcγ receptor. In some embodiments, increased binding increases the off rate of binding to a Fcγ receptor. In some embodiments, a mutation that increases the Fc-gamma binding comprises at least one substitution mutation in the Fc-gamma binding region. In some embodiments, an anti-Grp94 antibody disclosed herein comprises at least 1, 2, 3, or more substitution mutations in the Fc-gamma binding region. In some embodiments, a mutation that increases the Fc-gamma binding comprises at least one of S239D, I332E, H268F, S324T, S267E, or G236A. In some embodiments, a mutation that increases the Fc-gamma binding of an anti-Grp94 antibody disclosed herein comprises at least 2 or at least 3 of S239D, I332E, H268F, S324T, S267E, or G236A. In certain embodiments, the mutations reducing Fc-gamma binding comprise any of the combinations set forth as S239D/I332E or H268F/S324T or S267E/H268F/S324T or G236A/I332E. In certain embodiments, the mutations reducing Fc-gamma binding comprises S239D/I332E. In certain embodiments, the mutations reducing Fc-gamma binding comprises H268F/S324T. In certain embodiments, the mutations reducing Fc-gamma binding comprises S267E/H268F/S324T. In certain embodiments, the mutations reducing Fc-gamma binding comprises G236A/I332E. In some embodiments, an antibody described herein comprises a heavy chain comprising a mutation that increases binding to Fcγ receptor.

In some embodiments, the present disclosure provides an anti-Grp94 antibody, wherein the antibody comprises a heavy chain variable region having the sequence of one of SEQ ID NOs: 2, 18, 25, or 41. In certain embodiments, the antibody can be an IgG, a Fv, a scFv, a Fab, or a F(ab')2. The IgG can be of the subclass of IgG1, IgG2, IgG3, or IgG4. In one embodiment, the present disclosure also encompasses a composition comprising the above-mentioned antibody and a pharmaceutically acceptable carrier.

In some embodiments, the present disclosure provides an anti-Grp94 antibody, wherein the antibody comprises a light chain variable region having the sequence of one of SEQ ID NOs: 10, 22, 33, or 43. In certain embodiments, the antibody can be an IgG, a Fv, a scFv, a Fab, or a F(ab')$_2$. The IgG can be of the subclass of IgG1, IgG2, IgG3, or IgG4. In certain embodiments, the antibody is an IgG1. In certain embodiments, the antibody is an IgG2. In certain embodiments, the antibody is an IgG3. In certain embodiments, the antibody is an IgG4.

In certain embodiments, the present disclosure provides an anti-Grp94 antibody, wherein the antibody comprises a heavy chain variable region and a light chain variable region having the sequences of one of SEQ ID NOs: 2 and 10; SEQ ID NOs: 18 and 22; SEQ ID NOs: 25 and 33; or SEQ ID NOs: 41 and 43. In certain embodiments, the anti-Grp94 antibody comprises the sequences of SEQ ID NOs: 2 and 10. In certain embodiments, the anti-Grp94 antibody comprises the sequences of SEQ ID NOs: 18 and 22. In certain embodiments, the anti-Grp94 antibody comprises the sequences of SEQ ID NOs: 25 and 33. In certain embodiments, the anti-Grp94 antibody comprises the sequences of SEQ ID NOs: 41 and 43. In certain embodiments, the antibody can be an IgG, a Fv, a scFv, a Fab, or a F(ab')$_2$. The IgG can be of the subclass of IgG1, IgG2, IgG3, or IgG4. In certain embodiments, the antibody is an IgG1. In certain embodiments, the antibody is an IgG2. In certain embodiments, the antibody is an IgG3. In certain embodiments, the antibody is an IgG4.

In one embodiment, the present disclosure also encompasses a composition comprising the above-mentioned antibody and a pharmaceutically acceptable carrier.

In some embodiments, an anti-Grp94 antibody disclosed herein binds a human Grp94. In some embodiments, an anti-Grp94 antibody disclosed herein binds a non-human mammalian Grp94.

In some embodiments, an anti-Grp94 antibody disclosed herein binds a Grp94 antigen on the cell surface. In some embodiments, a non-senescent, growing cell does not express Grp94 on the cells surface. In some embodiments, an anti-Grp94 antibody disclosed herein does not bind the cell surface of a growing (proliferative) cell. In some embodiments, an anti-Grp94 antibody disclosed herein binds a Grp94 antigen on the cell surface of a senescent cell. In some embodiments, an anti-Grp94 antibody disclosed herein binds a Grp94 antigen on the cell surface of a senescent cell present within diseased tissue. In some embodiments, the tissue is fibrotic tissue. In some embodiments, the tissue is lung (pulmonary) tissue. In some embodiments, an anti-Grp94 antibody disclosed herein binds a Grp94 antigen on the cell surface of a senescent cell comprised in idiopathic pulmonary fibrotic (IPF) tissue.

In some embodiments, an anti-Grp94 antibody disclosed does not bind to the cell surface of a non-senescent cell.

Polynucleotides Encoding Anti-Grp94 Antibodies

In certain embodiments, the present disclosure provides isolated polynucleotides encoding a polypeptide comprising a variable Heavy chain region (VH) of an anti-Grp94 antibody. In certain embodiments, the present disclosure provides isolated polynucleotides encoding a polypeptide comprising a variable Light chain region (VH) of an anti-Grp94 antibody. In certain embodiments, the present disclosure provides isolated polynucleotides encoding a single polypeptide comprising the VH and VL domains of an anti-Grp94 antibody, which could be dimerized under suitable conditions. In certain embodiments, the present disclosure provides isolated polynucleotides encoding a polypeptide comprising the VH and a polypeptide comprising the VL domains of an anti-Grp94 antibody, which could be dimerized under suitable conditions.

In certain embodiments, the polynucleotide sequences of the VH, VL, or VH and VL domains may be contained within longer polynucleotide sequences, that may include for example but not limited to, constant regions, hinge regions, linker regions, Fc regions, or disulfide binding regions, or any combination thereof.

In some embodiments, the present disclosure provides a polynucleotide encoding a polypeptide comprising an anti-Grp94 antibody heavy chain variable region, wherein the polynucleotide sequence comprises the sequence of one of SEQ ID NOs: 1, 17, 24, or 40. In certain embodiments, the encoded heavy chain variable region is part of an antibody comprising an IgG, a Fv, a scFv, a Fab, or a F(ab')2. The IgG can be of the subclass of IgG1, IgG2, IgG3, or IgG4. In certain embodiments, the antibody is an IgG1. In certain embodiments, the antibody is an IgG2. In certain embodiments, the antibody is an IgG3. In certain embodiments, the antibody is an IgG4.

In some embodiments, the present disclosure provides a polynucleotide encoding a polypeptide comprising an anti-Grp94 antibody light chain variable region, wherein the polynucleotide sequence comprises the sequence of one of SEQ ID NOs: 9, 21, 32, or 42. In certain embodiments, the encoded light chain variable region is part of an antibody comprising an IgG, a Fv, a scFv, a Fab, or a F(ab')2. The IgG can be of the subclass of IgG1, IgG2, IgG3, or IgG4. In certain embodiments, the antibody is an IgG1. In certain embodiments, the antibody is an IgG2. In certain embodiments, the antibody is an IgG3. In certain embodiments, the antibody is an IgG4.

In some embodiments, the present disclosure provides a polynucleotide encoding a polypeptide comprising an anti-Grp94 antibody heavy chain variable region and a light chain variable region, wherein the polynucleotide sequence comprises sequence SEQ ID NO: 1 and SEQ ID NO: 9, SEQ ID NO: 17 and SEQ ID NO: 21, SEQ ID NO: 24 and SEQ ID NO: 32, or SEQ ID NO: 40 and 42. In certain embodiments, the polypeptide comprises two polypeptides. In certain embodiments, the antibody comprises an IgG, a Fv, a scFv, a Fab, or a F(ab')2. The IgG can be of the subclass of IgG1, IgG2, IgG3, or IgG4. In certain embodiments, the antibody is an IgG1. In certain embodiments, the antibody is an IgG2. In certain embodiments, the antibody is an IgG3. In certain embodiments, the antibody is an IgG4.

In certain embodiments, an isolated polynucleotide described herein is inserted into a vector. The term "vector" as used herein encompasses a vehicle into which a polynucleotide encoding a protein may be covalently inserted so as to bring about the expression of that protein and/or the cloning of the polynucleotide. The isolated polynucleotide may be inserted into a vector using any suitable methods known in the art, for example, without limitation, the vector may be digested using appropriate restriction enzymes and then may be ligated with the isolated polynucleotide having matching restriction ends. In some embodiments, a vector disclosed herein comprises a single polynucleotide sequence. In some embodiments, a vector disclosed herein comprises two polynucleotide sequences.

Examples of suitable vectors include, without limitation, plasmids, phagemids, cosmids, artificial chromosomes such as yeast artificial chromosome (YAC), bacterial artificial chromosome (BAC), or P1-derived artificial chromosome (PAC), bacteriophages such as lambda phage or M13 phage, and animal viruses. Examples of categories of animal viruses useful as vectors include, without limitation, retrovirus (including lentivirus), adenovirus, adeno-associated virus, herpesvirus (e.g., herpes simplex virus), poxvirus, baculovirus, papillomavirus, and papovavirus (e.g., SV40).

For expression of the polypeptide, the vector may be introduced into a host cell to allow expression of the polypeptide within the host cell. In some embodiments, a host cells comprises a CHO or a HEK293 tissue culture cell. The expression vectors may contain a variety of elements for controlling expression, including without limitation, promoter sequences, transcription initiation sequences, enhancer sequences, selectable markers, and signal sequences. These elements may be selected as appropriate by a person of ordinary skill in the art. For example, the promoter sequences may be selected to promote the transcription of the polynucleotide in the vector. Suitable promoter sequences include, without limitation, T7 promoter, T3 promoter, SP6 promoter, beta-actin promoter, EF1a promoter, CMV promoter, and SV40 promoter. Enhancer sequences may be selected to enhance the transcription of the polynucleotide. Selectable markers may be selected to allow selection of the host cells inserted with the vector from those not, for example, the selectable markers may be genes that confer antibiotic resistance. Signal sequences may be selected to allow the expressed polypeptide to be transported outside of the host cell.

In some embodiments, a host cell disclosed herein comprises a single vector. In some embodiments, a host cell disclosed herein comprises two vectors.

A vector may also include materials to aid in its entry into the cell, including but not limited to a viral particle, a liposome, or a protein coating.

For cloning of the polynucleotide, the vector may be introduced into a host cell (an isolated host cell) to allow replication of the vector itself and thereby amplify the copies of the polynucleotide contained therein. The cloning vectors may contain sequence components generally include, without limitation, an origin of replication, promoter sequences, transcription initiation sequences, enhancer sequences, and selectable markers. These elements may be selected as appropriate by a person of ordinary skill in the art. For example, the origin of replication may be selected to promote autonomous replication of the vector in the host cell.

Suitable host cells can include, without limitation, prokaryotic cells, fungal cells, yeast cells, or higher eukaryotic cells such as mammalian cells.

Compositions and Uses Thereof

In some embodiments, described herein are pharmaceutical compositions comprising a Grp94 binding antibody, as described above in detail, that provides a therapeutic agent. In some embodiments, described herein are pharmaceutical compositions comprising a Grp94 binding antibody having therapeutic properties targeting senescent cells. In some embodiments, described herein are pharmaceutical compositions comprising a Grp94 binding antibody having therapeutic properties targeting senescent cells comprised in age-related diseases. A skilled artisan would appreciate that age-related disease include diseases associated with cellular senescence. In some embodiments, age-related diseases comprise inflammatory diseases, fibrotic diseases, chronic fibrotic diseases, chronic fibrotic lung diseases, idiopathic pulmonary fibrosis (IPF), chronic obstructive pulmonary disease (COPD), and Nonalcoholic steatohepatitis (NASH).

In some embodiments, described herein are pharmaceutical compositions comprising a Grp94 binding antibody having therapeutic properties targeting senescent cells in pulmonary (lung) diseases.

In some embodiments, described herein are pharmaceutical compositions comprising a Grp94 binding antibody having therapeutic properties targeting senescent cells in fibrotic diseases. In some embodiments, fibrotic diseases comprise chronic fibrotic diseases, fibrotic lung diseases, chronic fibrotic lung diseases, idiopathic pulmonary fibrosis (IPF), and chronic obstructive pulmonary disease (COPD).

In some embodiments, described herein are pharmaceutical compositions comprising a Grp94 binding antibody having therapeutic properties targeting senescent cells in inflammatory diseases. In some embodiments, inflammatory diseases comprise Nonalcoholic steatohepatitis (NASH) and chronic NASH.

In some embodiments, described herein are pharmaceutical compositions comprising a Grp94 binding antibody having therapeutic properties targeting senescent cells in chronic fibrotic diseases. In some embodiments, described herein are pharmaceutical compositions comprising a Grp94 binding antibody having therapeutic properties targeting senescent cells in fibrotic lung diseases. In some embodiments, described herein are pharmaceutical compositions comprising a Grp94 binding antibody having therapeutic properties targeting senescent cells in chronic fibrotic lung diseases. In some embodiments, described herein are pharmaceutical compositions comprising a Grp94 binding antibody having therapeutic properties targeting senescent cells in idiopathic pulmonary fibrosis (IPF). In some embodiments, described herein are pharmaceutical compositions comprising a Grp94 binding antibody having therapeutic properties targeting senescent cells in chronic obstructive pulmonary disease (COPD).

In some embodiments, described herein are pharmaceutical compositions comprising a Grp94 binding antibody having therapeutic properties targeting senescent cells in Nonalcoholic steatohepatitis (NASH). In some embodiments, described herein are pharmaceutical compositions comprising a Grp94 binding antibody having therapeutic properties targeting senescent cells in chronic NASH.

In some embodiments, pharmaceutical compositions comprising a Grp94 antibody target senescent cells comprised in pulmonary tissue. In some embodiments, pharmaceutical compositions comprising a Grp94 antibody target senescent cells comprised in lung tissue. In some embodiments, pharmaceutical compositions comprising a Grp94 antibody target senescent cells comprised in diseased tissue. In some embodiments, pharmaceutical compositions comprising a Grp94 antibody target senescent cells comprised in diseased lung tissue. In some embodiments, pharmaceutical compositions comprising a Grp94 antibody target senescent cells comprised in diseased pulmonary tissue. In some embodiments, pharmaceutical compositions comprising a Grp94 antibody target senescent cells comprised in diseased tissue, wherein the disease comprises an age-related disease. In some embodiments, pharmaceutical compositions comprising a Grp94 antibody target senescent cells comprised in diseased tissue, wherein the disease comprises an inflammatory disease. In some embodiments, pharmaceutical compositions comprising a Grp94 antibody target senescent cells comprised in diseased tissue, wherein the disease comprises a fibrotic disease.

In some embodiments, pharmaceutical compositions comprising a Grp94 antibody target senescent cells relevant in age-related inflammatory diseases. In some embodiments, pharmaceutical compositions comprising a Grp94 antibody target senescent cells relevant in age-related fibrotic diseases.

In some embodiments, pharmaceutical compositions comprising a Grp94 antibody target senescent fibroblast cells relevant in an age-related disease. In some embodiments, pharmaceutical compositions comprising a Grp94 antibody target senescent epithelial cells relevant in an age-related disease.

In some embodiments, pharmaceutical compositions comprising a Grp94 antibody target senescent fibroblast cells relevant in a chronic fibrotic disease. In some embodiments, pharmaceutical compositions comprising a Grp94 antibody target senescent fibroblast cells relevant in a fibrotic lung disease. In some embodiments, pharmaceutical compositions comprising a Grp94 antibody target senescent fibroblast cells relevant in a chronic fibrotic lung disease. In some embodiments, pharmaceutical compositions comprising a Grp94 antibody target senescent fibroblast cells relevant in idiopathic pulmonary fibrosis (IPF). In some embodiments, pharmaceutical compositions comprising a Grp94 antibody target senescent fibroblast cells relevant in chronic obstructive pulmonary disease (COPD).

In some embodiments, pharmaceutical compositions comprising a Grp94 antibody target senescent epithelial cells relevant in a chronic fibrotic disease. In some embodiments, pharmaceutical compositions comprising a Grp94 antibody target senescent epithelial cells relevant in a fibrotic lung disease. In some embodiments, pharmaceutical compositions comprising a Grp94 antibody target senescent epithelial cells relevant in a chronic fibrotic lung disease. In some embodiments, pharmaceutical compositions comprising a Grp94 antibody target senescent epithelial cells relevant in idiopathic pulmonary fibrosis (IPF). In some embodiments, pharmaceutical compositions comprising a Grp94 antibody target senescent epithelial cells relevant in chronic obstructive pulmonary disease (COPD).

In some embodiments, pharmaceutical compositions comprising a Grp94 antibody target senescent epithelial cells relevant in an inflammatory disease. In some embodiments, pharmaceutical compositions comprising a Grp94 antibody target senescent epithelial cells relevant in NASH. In some embodiments, pharmaceutical compositions comprising a Grp94 antibody target senescent epithelial cells relevant in chronic NASH.

In some embodiments, pharmaceutical compositions comprising a Grp94 antibody target senescent fibroblast cells relevant in an inflammatory disease. In some embodiments, pharmaceutical compositions comprising a Grp94 antibody target senescent fibroblast cells relevant in NASH. In some embodiments, pharmaceutical compositions comprising a Grp94 antibody target senescent fibroblast cells relevant in chronic NASH.

In some embodiments, use of a Grp94 antibody or a composition comprising a Grp94 antibody induces antibody-dependent cell-mediated cytotoxicity (ADCC) in senescent cells. A skilled artisan would appreciate that ADCC may also be referred to as antibody-dependent cellular cytotoxicity. In some embodiments, use of a Grp94 antibody or a composition comprising a Grp94 antibody, induces ADCC wherein a target cell is lysed.

A skilled artisan would appreciate that ADCC may encompass a mechanism of cell-mediated immune defense whereby an effector cell of the immune system actively lyses a target cell, whose membrane-surface antigens have been bound by specific antibodies. Typically, a Fc gamma (Fcγ) receptor (FcγR, FcγR or FCGR) on the surface of an immune effector cell binds to the Fc region of an antibody, which specifically binds to a target cell. When the Fc gamma receptor binds to the antibody, the Fc gamma receptor's immunoreceptor tyrosine-based activation motif (ITAM) is phosphorylated, which triggers the activation of effector cells and the secretion of various substances (lyase, perforin, granzyme, tumor necrosis factor [TNF]) that mediate target cell destruction. ADCC comprises one of the mechanisms through which antibodies, as part of the humoral immune response, can act to limit and contain infection. ADCC requires an effector cell, such as a natural killer (NK) cell that typically interacts with immunoglobulin G (IgG) antibodies. However, macrophages, monocytes, neutrophils, and eosinophils can also mediate ADCC.

A skilled artisan would appreciate that the term "complement dependent cytotoxicity" (CDC) may encompass an effector function of IgG and IgM antibodies. When they are bound to a surface antigen on target cell (e.g., a bacterial or viral infected cell or a tumor cell), the complement pathway is triggered by binding protein C1q binding to these antibodies, resulting in formation of a membrane attack complex (MAC) on the surface of target cells, leading to a classical pathway of complement activation and lysis of target cells. This system is efficiently activated by human IgG1, IgG3 and IgM antibodies.

In some embodiments, use of a Grp94 antibody or a composition comprising a Grp94 antibody induces antibody-dependent cell-mediated cytotoxicity (ADCC) in an epithelial senescent cell. In some embodiments, use of a Grp94 antibody or a composition comprising a Grp94 antibody, induces ADCC wherein a target senescent epithelial cell is lysed.

In some embodiments, use of a Grp94 antibody or a composition comprising a Grp94 antibody induces antibody-dependent cell-mediated cytotoxicity (ADCC) in a fibroblast senescent cell. In some embodiments, use of a Grp94 antibody or a composition comprising a Grp94 antibody, induces ADCC wherein a target senescent fibroblast cell is lysed.

In some embodiments, use of a Grp94 antibody or a composition comprising a Grp94 antibody induces antibody-dependent cell-mediated cytotoxicity (ADCC) in a senescent lung cell, wherein the disease is a lung disease. In some embodiments, use of a Grp94 antibody or a composition comprising a Grp94 antibody induces antibody-dependent cell-mediated cytotoxicity (ADCC) in a senescent epithelial lung cell, wherein the disease is lung disease. In some embodiments, use of a Grp94 antibody or a composition comprising a Grp94 antibody induces antibody-dependent cell-mediated cytotoxicity (ADCC) towards senescent lung cells in diseased lung tissue. In some embodiments, use of a Grp94 antibody or a composition comprising a Grp94 antibody induces antibody-dependent cell-mediated cytotoxicity (ADCC) towards senescent lung cells during treatment of a lung disease.

In some embodiments, use of a Grp94 antibody or a composition comprising a Grp94 antibody induces antibody-dependent cell-mediated cytotoxicity (ADCC) in a senescent cell, wherein the disease is an age-related disease. In some embodiments, the senescent cell identified is comprised in diseased tissue. In some embodiments, use of a Grp94 antibody or a composition comprising a Grp94 antibody induces antibody-dependent cell-mediated cytotoxicity (ADCC) in a senescent cell, wherein the disease is inflammatory disease. In some embodiments, use of a Grp94 antibody or a composition comprising a Grp94 antibody induces antibody-dependent cell-mediated cytotoxicity (ADCC) in a senescent cell, wherein the disease is a fibrotic disease.

In some embodiments, use of a Grp94 antibody or a composition comprising a Grp94 antibody induces antibody-dependent cell-mediated cytotoxicity (ADCC) in a senescent cell, wherein the disease is an inflammatory disease including but not limited to NASH or chronic NASH. In some embodiments, use of a Grp94 antibody or a composition comprising a Grp94 antibody induces antibody-dependent cell-mediated cytotoxicity (ADCC) in a senescent cell, wherein the disease is a fibrotic disease including but not limited to chronic fibrotic diseases, fibrotic lung diseases, chronic fibrotic lung diseases, idiopathic pulmonary fibrosis (IPF), and chronic obstructive pulmonary disease (COPD).

In some embodiments, use of a Grp94 antibody comprises use of Grp94 antibody-drug conjugate (ADC). In some embodiments, use of a Grp94 antibody composition comprises use of a Grp94 ADC composition.

In some embodiments, use of a Grp94 antibody conjugate comprises a Grp94 antibody conjugated to a pharmaceutical agent, a nucleic acid, a protein, a peptide, a polypeptide or polynucleotide vector, an imaging agent, a biomarker, a medicament, a drug, a chemotherapeutic agent, a cytotoxic agent, a toxin, or a radioactive isotope. In some embodiments, the drug comprises a chemotherapeutic or cytotoxic agent.

In some embodiments, described herein are pharmaceutical compositions comprising polynucleotides that encode a Grp94 binding antibody or portions thereof, as described above in detail, that provides a therapeutic agent. In some embodiments, described herein are pharmaceutical compositions comprising a polynucleotide that encodes a Grp94 binding antibody having therapeutic properties targeting senescent cells. In some embodiments, described herein are pharmaceutical compositions comprising multiple polynucleotides that together encode a Grp94 binding antibody having therapeutic properties targeting senescent cells. In some embodiments, described herein are pharmaceutical compositions comprising two polynucleotides that together encode a Grp94 binding antibody having therapeutic properties targeting senescent cells. Polynucleotides encoding VH, VL, or VH and VL have been described in detail above.

In some embodiments, a pharmaceutical composition comprises a Grp94 binding antibody comprising a variant VH, a variant VL, or a variant VH and a variant VL, and a pharmaceutically acceptable carrier. The amino acid sequences of variant VH and variant VL domains, and pairs thereof, have been described in detail above.

In some embodiments, a pharmaceutical composition comprising n Grp94 binding antibody comprises any Grp94 antibody described herein comprising a variant VH, a variant VL, or a variant VH and a variant VL.

A skilled artisan would recognize that in some embodiments, the terms "Grp94 binding antibody" or "isolated anti-Grp94 antibody" or "anti-Grp94 antibody" may be used interchangeably with the term "drug" or "agent" having all the same meanings and qualities. In some embodiments, a drug comprising a Grp94 binding antibody comprises a pharmaceutical composition.

In some embodiments, a pharmaceutical composition comprising a Grp94 binding antibody comprises a heavy chain variable region comprising H-CDR1, H-CDR2 and H-CDR3, wherein the amino acid sequences of H-CDR1, H-CDR2 and H-CDR3 comprise SEQ ID NOs: 6-8, respectively. In some embodiments, a pharmaceutical composition comprising a Grp94 binding antibody comprises a heavy chain variable region comprising H-CDR1, H-CDR2 and H-CDR3, wherein the amino acid sequences of H-CDR1, H-CDR2 and H-CDR3 comprise SEQ ID NOs: 6, 7, 20, respectively. In some embodiments, a pharmaceutical composition comprising a Grp94 binding antibody comprises a heavy chain variable region comprising H-CDR1, H-CDR2 and H-CDR3, wherein the amino acid sequences of H-CDR1, H-CDR2 and H-CDR3 comprise SEQ ID NOs: 29-31, respectively. In certain embodiments, the antibody can be an IgG, a Fv, a scFv, a Fab, or a F(ab')$_2$. The IgG can be of the subclass of IgG1, IgG2, IgG3, or IgG4. In certain embodiments, the antibody is an IgG1. In certain embodiments, the antibody is an IgG2. In certain embodiments, the antibody is an IgG3. In certain embodiments, the antibody is an IgG4.

In some embodiments, a pharmaceutical composition comprising a Grp94 binding antibody comprises a light chain variable region comprising L-CDR1, L-CDR2 and L-CDR3, wherein the amino acid sequences of L-CDR1, L-CDR2 and L-CDR3 comprise SEQ ID NOs: 14-16, respectively. In some embodiments, a pharmaceutical composition comprising a Grp94 binding antibody comprises a light chain variable region comprising L-CDR1, L-CDR2 and L-CDR3, wherein the amino acid sequences of L-CDR1, L-CDR2 and L-CDR3 comprise SEQ ID NOs: 37-39, respectively. In certain embodiments, the antibody can be an IgG, a Fv, a scFv, a Fab, or a F(ab')$_2$. The IgG can be of the subclass of IgG1, IgG2, IgG3, or IgG4. In certain embodiments, the antibody is an IgG1. In certain embodiments, the antibody is an IgG2. In certain embodiments, the antibody is an IgG3. In certain embodiments, the antibody is an IgG4.

In some embodiments, a pharmaceutical composition comprising a Grp94 binding antibody comprises a heavy chain variable region comprising H-CDR1, H-CDR2 and H-CDR3, wherein the amino acid sequences of H-CDR1, H-CDR2 and H-CDR3 comprise SEQ ID NOs: 6-8, respectively, and a light chain variable region comprising L-CDR1, L-CDR2 and L-CDR3, wherein the amino acid sequences of L-CDR1, L-CDR2 and L-CDR3 comprise SEQ ID NOs: 14-16, respectively. In some embodiments, a pharmaceutical composition comprising a Grp94 binding antibody comprises a heavy chain variable region comprising H-CDR1, H-CDR2 and H-CDR3, wherein the amino acid sequences of H-CDR1, H-CDR2 and H-CDR3 comprise SEQ ID NOs: 6, 7, 20, respectively, and a light chain variable region comprising L-CDR1, L-CDR2 and L-CDR3, wherein the amino acid sequences of L-CDR1, L-CDR2 and L-CDR3 comprise SEQ ID NOs: 14-16, respectively. In some embodiments, a pharmaceutical composition comprising a Grp94 binding antibody comprises a heavy chain variable region comprising H-CDR1, H-CDR2 and H-CDR3, wherein the amino acid sequences of H-CDR1, H-CDR2 and H-CDR3 comprise SEQ ID NOs: 28-31, respectively, and a light chain variable region comprising L-CDR1, L-CDR2 and L-CDR3, wherein the amino acid sequences of L-CDR1, L-CDR2 and L-CDR3 comprise SEQ ID NOs: 37-39, respectively. In certain embodiments, the antibody can be an IgG, a Fv, a scFv, a Fab, or a F(ab')$_2$. The IgG can be of the subclass of IgG1, IgG2, IgG3, or IgG4. In certain embodiments, the antibody is an IgG1. In certain embodiments, the antibody is an IgG2. In certain embodiments, the antibody is an IgG3. In certain embodiments, the antibody is an IgG4.

In some embodiments, a pharmaceutical composition comprising a Grp94 binding antibody comprises a heavy chain variable region comprising the amino acid sequences of any one of SEQ ID NOs: 2, 18, 25, or 41. In some embodiments, a pharmaceutical composition comprising a Grp94 binding antibody comprises a light chain variable region comprising the amino acid sequences of any one of SEQ ID NOs: 10, 22, 33, or 43. In some embodiments, a pharmaceutical composition comprising a Grp94 binding antibody comprises a heavy chain and a light chain variable region pair comprising the amino acid sequences of SEQ ID NOs: 2 and 10, or 18 and 22, or 25 and 33, or 41 and 43. In certain embodiments, the antibody can be an IgG, a Fv, a scFv, a Fab, or a F(ab')$_2$. The IgG can be of the subclass of IgG1, IgG2, IgG3, or IgG4. In certain embodiments, the antibody is an IgG1. In certain embodiments, the antibody is an IgG2. In certain embodiments, the antibody is an IgG3. In certain embodiments, the antibody is an IgG4.

The anti-Grp94 antibodies disclosed herein can in certain embodiments, be administered to a subject (e.g., a human or an animal) alone, or in combination with a carrier, i.e., a pharmaceutically acceptable carrier. By pharmaceutically acceptable is meant a material that is not biologically or otherwise undesirable, i.e., the material can be administered to a subject without causing any undesirable biological effects or interacting in a deleterious manner with any of the other components of the pharmaceutical composition in which it is contained. As would be well-known to one of ordinary skill in the art, the carrier is selected to minimize any degradation of the polypeptides disclosed herein and to minimize any adverse side effects in the subject. The pharmaceutical compositions may be prepared by methodology well known in the pharmaceutical art.

The above pharmaceutical compositions comprising anti-Grp94 antibody disclosed herein can be administered (e.g., to a mammal, a cell, or a tissue) in any suitable manner depending on whether local or systemic treatment is desired. For example, the composition can be administered by local or intravenous injection. In some embodiments, administration comprises intravenous (iv) injection.

If the composition is to be administered parenterally, the administration is generally by injection. Injectables can be prepared in conventional forms, either as liquid solutions or suspensions, solid forms suitable for suspension in liquid prior to injection, or as emulsions. Additionally, parental administration can involve preparation of a slow-release or sustained-release system so as to maintain a constant dosage.

Methods of Use

In one embodiment, the present disclosure provides a method of producing a heavy chain variable region of an anti-Grp94 antibody, the method comprises the step of culturing host cells under conditions conducive to expressing a vector comprising a polynucleotide encoding the heavy chain variable region, thereby producing the heavy chain variable region of the anti-Grp94 antibody.

In one embodiment, the present disclosure provides a method of producing a light chain variable region of an anti-Grp94 antibody, the method comprises the step of culturing host cells under conditions conducive to expressing a vector encoding a polynucleotide encoding the light chain variable region, thereby producing the light chain variable region of the anti-Grp94 antibody.

In one embodiment, the present disclosure provides a method of producing a heavy chain variable region and a light chain variable region of an anti-Grp94 antibody, the method comprises the step of culturing at least one host cell under conditions conducive to expressing a vector encoding a polynucleotide encoding the heavy chain variable region and a vector encoding the light chain variable region, wherein the vector may be the same or a different vector, thereby producing a polypeptide comprising the heavy chain variable region and a polypeptide comprising the light chain variable region of the anti-Grp94 antibody. In one embodiment, the present disclosure provides a method of producing a heavy chain variable region and a light chain variable region of an anti-Grp94 antibody in a single polypeptide, the method comprises the step of culturing host cells under conditions conducive to expressing a vector encoding a polynucleotide encoding the heavy chain variable region and the light chain variable region, thereby producing a polypeptide comprising the heavy chain variable region and the light chain variable region of the anti-Grp94 antibody. In some embodiments, the polypeptide comprises for example but not limited to, an scFv.

The anti-Grp94 antibody disclosed herein may be used in therapeutic methods.

In some embodiments, the anti-Grp94 antibody of the present disclosure can be used to target senescent cells. A skilled artisan would appreciate that "senescent cells" encompasses cells that exhibit cell cycle arrest, generally during the G1 transition of the cell cycle or in few cases in G2, elicited by replicative exhaustion due to telomere attrition or in response to stresses such as DNA damage, chemotherapeutic drugs, or aberrant expression of oncogenes. According to some embodiments, senescent cells are characterized by at least one or more of the following characteristics: (1) activation of the p53/p21CIP1 and/or pRb/p16INK4A tumor suppressor pathways; (2) cells whose proliferation is irreversibly arrested; (3) shortening of telomere size; (4) expression of senescent-associated beta-galactosidase activity; (5). Specific chromatin modification; (6) Specific secretome; (7) Increase in reactive oxygen species and altered overall mitochondrial activity.

Senescent cells may be identified using technology known in the art, for example but not limited to the following assays: irreversible cell cycle arrest of may be assessed by FACS or BrdU incorporation assay, and shortening of telomere size may be characterized by evaluating the mean terminal restriction fragment (TRF) length for example by Southern blot analysis. Other methods of ascertaining whether a cell is senescent are described in U.S. Pat. No. 9,476,031 and Biran et al, 2017 Aging Cell 16:661-7. Doi: 10.1111/acel.12592) the contents of which are incorporated herein by reference.

In some embodiments, a method of use of an anti-Grp94 antibody disclosed herein comprises treating a disease or condition related to cellular senescence. In some embodiments, a disease or condition related to cellular senescence comprises age-related diseases. In certain embodiments, age-related diseases that could be treating using a method of use disclosed herein comprise idiopathic pulmonary fibrosis (IPF), fibrotic diseases, chronic fibrotic diseases, inflammatory diseases, chronic inflammatory diseases, lung fibrosis, chronic obstructive pulmonary disease (COPD), and nonalcoholic steatohepatitis (NASH).

In some embodiments, the present disclosure provides a method of targeting a senescent cell in a subject, comprising the step of preparing a composition comprising an anti-Grp94 antibody disclosed herein; and administering the composition to the subject, thereby targeting the senescent cell in the subject. In some embodiments, the subject can be an animal or a human. In some embodiments, the present disclosure provides a method of targeting a senescent cell in a subject in need wherein said subject suffers from an age-related disease, comprising the step of preparing a composition comprising the anti-Grp94 antibody disclosed herein; and administering the composition to the subject suffering from an age-related disease, thereby targeting the senescent cell in the subject in need.

In some embodiments, the present disclosure provides a method of treating a disease associated with cellular senescence in a subject, comprising the step of preparing a composition comprising an anti-Grp94 antibody disclosed herein; and administering the composition to the subject, thereby treating the disease or condition associated with cellular senescence in the subject.

In some embodiments of methods of use to treat a subject in need disclosed herein, the anti-Grp94 antibodies of the present disclosure can be used to target senescent cells in a subject suffering from an age-related disease. In some embodiments of methods of use to treat a subject in need disclosed herein, the anti-Grp94 antibodies of the present disclosure can be used to target senescent cancer cells in a subject suffering from a cancer or a tumor.

In some embodiments, method of use of the compositions comprising an anti-Grp94 antibody described herein in comprise treating a subject suffering from an age-related disease including fibrotic or inflammatory diseases of skin, liver, lung, pancreas, prostate, articular cartilage, and atherosclerotic plaques. In some embodiments, method of use of the compositions comprising an anti-Grp94 antibody described herein in comprise treating a subject suffering from accumulation of senescent cells in normal tissues, especially skin that occurs with tissue aging. In some embodiments, method of use of the compositions comprising an anti-Grp94 antibody described herein in comprise treating a subject suffering from accumulation of senescent cells in normal tissues, especially lung tissue that occurs with tissue aging. In some embodiments, method of use of the compositions comprising an anti-Grp94 antibody described herein in comprise treating a subject suffering from accumulation of senescent cells in normal tissues, especially liver tissue that occurs with tissue aging.

In some embodiments, described herein are methods of treating a disease in a subject, comprising the step of administering to the subject a composition comprising an effective amount of the anti-Grp94 antibody, wherein the anti-Grp94 antibody further comprises a heavy chain Fc region comprising at least one amino acid residue substitution comprising S239D, I332E, A330L, G236A, H268F, S324T, S267E, or H268E or any combination thereof, wherein fucosylation of the Fc region is reduced in comparison to a Fc region of an anti-Grp94 antibody produced in the presence of fucose. In some embodiments, described herein are methods of treating a disease in a subject, comprising the step of administering to the subject a composition comprising an effective amount of the anti-Grp94 antibody, wherein the anti-Grp94 antibody comprises a Grp94 antibody-drug conjugate.

The exact amount of the present anti-Grp94 antibodies or compositions thereof required to elicit the desired effects will vary from subject to subject, depending on the species, age, gender, weight, and general condition of the subject, the particular polypeptides, the route of administration, and whether other drugs are included in the regimen. Thus, it is not possible to specify an exact amount for every composition. However, an appropriate amount can be determined by one of ordinary skill in the art using routine experimentation. Dosages can vary, and the anti-Grp94 antibodies can be administered in one or more (e.g., two or more, three or more, four or more, or five or more) doses daily, for one or more days. Guidance in selecting appropriate doses for antibodies can be readily found in the literature.

In some embodiments, a method of treating an age-related disease reduces the severity and or extent of the age-related disease, compared with a subject not administered an anti-Grp94 antibody or a pharmaceutical composition thereof. In some embodiments, a method of treating an age-related disease reduces the duration of the disease in a subject compared with a subject not administered an anti-Grp94 antibody or a pharmaceutical composition thereof.

In some embodiments, a method of treating a cancer or tumor comprises reducing the incidence of recurrence of a cancer or tumor or preventing the incidence of recurrence of a cancer or tumor in a subject, or a combination thereof. In some embodiments, a method of treating a cancer or tumor comprises reducing the incidence of metastasis of a cancer or tumor in a subject. In some embodiments, a method of treating a cancer or tumor reduces the minimal residual disease, increases remission, increases remission duration, reduces tumor relapse rate, prevents metastasis of said tumor or said cancer, or reduces the rate of metastasis of said cancer or tumor, or any combination thereof, compared with a subject not administered said pharmaceutical composition.

A skilled artisan would appreciate that the term "treating" and grammatical forms thereof, may in some embodiments encompass both therapeutic treatment and prophylactic or preventative measures with respect to diseases and conditions associated with cellular senescence or a tumor or cancer as described herein. With respect to treating a tumor or cancer, the object may be to prevent or lessen the targeted tumor or cancer as described herein. Thus, in some embodiments of methods disclosed herein, treating may include directly affecting or curing, suppressing, inhibiting, preventing, reducing the severity of, delaying the onset of, reducing symptoms associated with the disease, disorder or condition, or a combination thereof, for example, when said disease or disorder comprises a senescence related disease or condition. Thus, in some embodiments, "treating" encompasses preventing, delaying progression, inhibiting the growth of, delaying disease progression, reducing tumor load, reducing the incidence of, expediting remission, inducing remission, augmenting remission, speeding recovery, increasing efficacy of or decreasing resistance to alternative therapeutics, or a combination thereof. In some embodiments, "preventing" encompasses delaying the onset of symptoms, preventing relapse to a disease, decreasing the number or frequency of relapse episodes, increasing latency between symptomatic episodes, or a combination thereof. In some embodiments, "suppressing" or "inhibiting", encompass reducing the severity of symptoms, reducing the severity of an acute episode, reducing the number of symptoms, reducing the incidence of disease-related symptoms, reducing the latency of symptoms, ameliorating symptoms, reducing secondary symptoms, reducing secondary infections, prolonging patient survival, or a combination thereof.

Thus, the anti-Grp94 antibodies disclosed herein would be useful in treating a disease associated with cellular senescence in a subject in need. As well, the anti-Grp94 antibodies disclosed herein would be useful as a follow-up treatment in a subject suffering from a cancer or tumor to prevent or reduce the incidence of recurrence or metastasis, or a combination thereof.

In some embodiments an anti-Grp94 antibody used in a method of treating a subject with a disease or condition associated with cellular senescence comprises an anti-Grp94 antibody, wherein the antibody comprises a heavy chain variable region having complementarity determining region 1 (H-CDR1), H-CDR2, and H-CDR3, said H-CDR1, H-CDR2, and H-CDR3 comprise amino acid sequences of (a) SEQ ID NO: 6-8, respectively, SEQ ID NO: 6, 7, 20, respectively, or SEQ ID NO: 29-31, respectively. In some embodiments an anti-Grp94 antibody used in a method of treating a subject with a disease or condition associated with cellular senescence comprises an anti-Grp94 antibody wherein the antibody comprises a heavy chain variable region having the sequence of one of SEQ ID NOs:2, 18, 25, or 41.

In some embodiments an anti-Grp94 antibody used in a method of treating a subject with a disease or condition associated with cellular senescence comprises an anti-Grp94 antibody, wherein the antibody comprises a light chain variable region having complementarity determining region 1 (L-CDR1), L-CDR2, and L-CDR3, said L-CDR1, L-CDR2, and L-CDR3 comprise amino acid sequences of (a) SEQ ID NO: 14-16, respectively, or SEQ ID NO: 37-39, respectively. In some embodiments an anti-Grp94 antibody used in a method of treating a subject with a disease or condition associated with cellular senescence comprises an anti-Grp94 antibody wherein the antibody comprises a light chain variable region having the sequence of one of SEQ ID NOs: 10, 22, 33, or 43.

In some embodiments an anti-Grp94 antibody used in a method of treating a subject with a disease or condition associated with cellular senescence comprises an anti-Grp94 antibody, wherein the antibody comprises a heavy chain variable region having complementarity determining region 1 (H-CDR1), H-CDR2, and H-CDR3, and a light chain variable region having L-CDR1, CDR2, and L-CDR3, said H-CDR1, H-CDR2, and H-CDR3 and L-CDR1, L-CDR2, and L-CDR3 comprising amino acid sequences of (a) SEQ ID NO: 6-8, respectively, and SEQ ID NO: 14-16, respectively; SEQ ID NO: 6, 7, 20, respectively, and SEQ ID NO: 14-16, respectively; or SEQ ID NO: 29-31, respectively, and SEQ ID NO: 37-39, respectively. In some embodiments an anti-Grp94 antibody used in a method of treating a subject with a disease or condition associated with cellular senescence comprises an anti-Grp94 antibody, wherein the antibody comprises a heavy chain variable region and a light chain variable region having the sequences of one of: SEQ ID NOs: 2 and 10; SEQ ID NOs: 18 and 22; SEQ ID NOs: 25 and 33; or SEQ ID NOs: 41 and 43.

In some embodiments of method of treating a disease or condition associated with cellular senescence, the disease or condition associated with cellular senescence comprises a cancer or a tumor.

In some embodiments of a method of use for treating a disease or condition associated with cellular senescence, the antibody can be an IgG, a Fv, a scFv, a Fab, or a F(ab')2. The IgG can be of the subclass of IgG1, IgG2, IgG3, or IgG4. In some embodiments of a method of use for treating a cancer or tumor, the antibody can be an IgG, a Fv, a scFv, a Fab, or a F(ab')2. The IgG can be of the subclass of IgG1, IgG2, IgG3, or IgG4. In certain embodiments, the antibody is an IgG1. In certain embodiments, the antibody is an IgG2. In certain embodiments, the antibody is an IgG3. In certain embodiments, the antibody is an IgG4.

In some embodiments, a polynucleotide sequence encoding an anti-Grp94 antibody is used in a method of treating a subject with a disease or condition associated with cellular senescence, wherein the polynucleotide encodes an anti-Grp94 antibody, wherein the antibody comprises a heavy chain variable region having complementarity determining region 1 (H-CDR1), H-CDR2, and H-CDR3, said H-CDR1, H-CDR2, and H-CDR3 comprise amino acid sequences of (a) SEQ ID NO: 6-8, respectively, SEQ ID NO: 6, 7, 20, respectively, or SEQ ID NO: 29-31, respectively. In some embodiments, a polynucleotide sequence encoding an anti-Grp94 antibody is used in a method of treating a subject with a disease or condition associated with cellular senescence, wherein the polynucleotide encodes an anti-Grp94 antibody, wherein the antibody comprises a heavy chain variable region having the sequence of one of SEQ ID NOs:2, 18, 25, or 41.

In some embodiments, a polynucleotide sequence encoding an anti-Grp94 antibody is used in a method of treating a subject with a disease or condition associated with cellular senescence, wherein the polynucleotide encodes an anti-Grp94 antibody, wherein the antibody comprises a light chain variable region having complementarity determining region 1 (L-CDR1), L-CDR2, and L-CDR3, said L-CDR1, L-CDR2, and L-CDR3 comprise amino acid sequences of (a) SEQ ID NO: 14-16, respectively, or SEQ ID NO: 37-39, respectively. In some embodiments, a polynucleotide sequence encoding an anti-Grp94 antibody is used in a method of treating a subject with a disease or condition associated with cellular senescence, wherein the polynucleotide encodes an anti-Grp94 antibody, wherein the polynucleotide encodes an antibody comprising a light chain variable region having the sequence of one of SEQ ID NOs:10, 22, 33, or 43.

In some embodiments, a polynucleotide sequence encoding an anti-Grp94 antibody is used in a method of treating a subject with a disease or condition associated with cellular senescence, wherein the polynucleotide encodes an anti-Grp94 antibody, wherein the antibody comprises a heavy chain variable region having complementarity determining region 1 (H-CDR1), H-CDR2, and H-CDR3, and a light chain variable region having L-CDR1, CDR2, and L-CDR3, said H-CDR1, H-CDR2, and H-CDR3 and L-CDR1, L-CDR2, and L-CDR3 comprising amino acid sequences of (a) SEQ ID NO: 6-8, respectively, and SEQ ID NO: 14-16, respectively; SEQ ID NO: 6, 7, 20, respectively, and SEQ ID NO: 14-16, respectively; or SEQ ID NO: 29-31, respectively, and SEQ ID NO: 37-39, respectively. In some embodiments, a polynucleotide sequence encoding an anti-Grp94 antibody is used in a method of treating a subject with a disease or condition associated with cellular senescence, wherein the polynucleotide encodes an anti-Grp94 antibody, wherein the polynucleotide encodes an antibody comprising a heavy chain variable region and a light chain variable region having the sequences of one of: SEQ ID NOs: 2 and 10; SEQ ID NOs: 18 and 22; SEQ ID NOs:25 and 33; or SEQ ID NOs: 41 and 43.

In some embodiments of a method of use for treating a disease or condition associated with cellular senescence, the polynucleotide encoding the antibody encodes for an IgG, a Fv, a scFv, a Fab, or a F(ab')2. The IgG can be of the subclass of IgG1, IgG2, IgG3, or IgG4. In certain embodiments, the antibody is an IgG1. In certain embodiments, the antibody is an IgG2. In certain embodiments, the antibody is an IgG3. In certain embodiments, the antibody is an IgG4.

In some embodiments a polynucleotide sequence encoding an anti-Grp94 antibody is used in a method of treating a subject with a disease associated with cellular senescence. Polynucleotides encoding H-CDR1, H-CDR2, H-CDR3, L-CDR1, L-CDR2, LCDR3, VH, and VL regions are provided in detail above, and may be used in a method of treating a disease or condition associated with cellular senescence. In some embodiments of method of treating a disease or condition associated with cellular senescence, the disease or condition associated with cellular senescence comprises a cancer or a tumor.

EXAMPLES

Example 1: Materials and Methods

Antibody Discovery and Characterization
Immunization and Clone Selection

BALB/C mice were immunized with recombinant human Grp94 (rHGrp94) (Creative Biomart, USA). The two BALB/C mice with the highest serum antibody titers against rHGrp94 received a final boost of 75 microgram rHGrp94. Three days later, lymph node and spleen tissue were excised and mechanically disrupted to create a single cell suspension.

Non-B cells were removed by MACS (Magnetic Activated Cell Sorting) and IgM+B cells were removed using 100 microliters MACS and 200 microliters anti-biotin microbeads. The remaining IgG+B cells were immortalized by electrofusion with SP2/0 myeloma cells.

Fused hybridomas were cultured on semisolid media for 8-10 days that contained fluorescently labelled antibody (AF647-conjugated F(ab')2 fragment goat anti-mouse IgG to detect IgG secretion and (for half of the plates) FITC conjugated rHGrp94 antigen, in order to detect anti-Grp94 specific antibodies.

Growth plates were imaged by bright light, FITC, and AF647 fluorescent detection channels in the ClonePix2 colony picker (Molecular Devices, UK) and hybridoma colonies were picked into 200 microliters of ClonaCell-HY recovery medium (Stem Cell Technologies, UK).

Grp94 ELISA 50 microliter/well of 2 microgram/ml Grp94 protein in PBS buffer pH=7.4 was used to coat a MICROLON medium binding ELISA plate (Greiner Bio One Ltd) and incubated at 4° C. overnight. The coating solution was aspirated, washed twice with PBS and blocked for 1 h in blocking buffer (PBS/0.8% BSA) at room temperature.

Culture samples (hybridoma supernatants) were applied neat at 50 microliter/well and incubated for 60 minutes at 37° C. The reagent blank consisted of 50 microliter culture media only. Samples were aspirated and wells washed four times in PBST (PBS/0.05% Tween-20) and blotted dry. Polyclonal goat-anti mouse IgG-HRP secondary antibody (Southern biotech, Cambridge Bioscience) was diluted 1:10,000 in blocking solution, applied at 50 microliter/well and incubated for 60 minutes at 37° C. Antibody solution was subsequently removed, and wells washed three times with PBST and three times with water. A volume of 100 microlite/well of HRP substrate was added and color development stopped after 4 minutes at room temperature with the addition of 100 microliter/well 1M hydrochloric acid. Absorbance was determined at 450 nm on a Dynex Technologies MRX TC II plate reader.

All sample values were corrected by subtracting against the reagent blank value that was the average of 2 readings on every plate (OD450 nm reading±SD:0.040±0.012).

Binding of Monoclonal Antibodies to Grp94 Expressed on the Surface of Meth A Cells by Flow Cytometry Mouse Meth A sarcoma cells (Cat. 400284 CLS, Germany) were cultured using standard tissue culture conditions in RPMI-1640. Cells were seeded at $1\times10^5$ in 100 microliter FACS buffer in 96 well U bottom FACS plates, pelleted and resuspended in 100 microliters neat or 1 in 2 diluted supernatant sample for 30 minutes at 4° C. Cells were washed twice with PBS and resuspended in 100 microliter secondary antibody, AF647 conjugated goat anti-mouse IgG A21236 (Thermo Fisher Scientific) at 2 micrograms/ml in FACS buffer for 30 minutes at 4° C. Cells were washed twice with PBS and resuspended in 100 microliters water containing 10% CellFix (Becton Dickinson, UK). Median fluorescence intensity was measured using an Attune NxT Acoustic Focusing Cytometer (Thermo Fisher Scientific) with autosampler using acquisition parameters optimized with unstained cells and secondary labeled cells: FSC:100, SSC: 340, FL1:370. The acquisition rate was 100 microliter/minute stopping at 10,000 R1 events. Positive controls consisted of commercially sourced mouse anti-Grp94 antibodies MA1-10892 (Thermo Fisher Scientific) and MAB7606 (R&D System) at 2 micrograms/ml while negative control consisted of Meth A cells incubated with secondary antibody alone.

Biacore Single Cycle Kinetic Analysis of Antibodies Binding to Grp94

Biacore single cycle analysis was performed on supernatants where the monoclonal antibody was captured with Fc on the surface as the ligand and Grp94 flowed over as the analyte. Kinetic experiments were performed on a Biacore T200 running Biacore T200 Control software V2.0.1 and Evaluation software V3.0 (GE Healthcare, Sweden). All single cycle kinetic experiments were run at 25° C. with HBS-P+ running buffer (pH 7.4) (GE Healthcare, UK) containing 1 mg/ml BSA.

Antibodies were diluted in running buffer and at the start of each cycle were loaded onto Fc2, Fc3, and Fc4 of the CM5 chip coupled with an anti-mouse capture antibody using standard amine chemistry (GE Healthcare, UK). IgGs were captured at a flow rate of 10 microliter/minute to give an immobilization level (RL) of approximately 160RU. The surface was then allowed to stabilize. Single cycle kinetic data was obtained with Grp94 (Creative BioMart, USA) as the analyte at a flow rate of 30 microliter/min to minimize any potential mass transport limitations. The signal from the reference channel Fc1 (no antibody) was subtracted from that of Fc2, Fc3, and Fc4 to correct the differences in non-specific binding to a reference surface. A three point, three-fold dilution range from 11.1 nM to 100 nM Grp94 without regeneration between each concentration was used. The association phase for the three injections of increasing concentrations of Grp94 was monitored for 150 seconds each time and a single dissociation phase was measured for 900 seconds following the last injection of Grp94. Regeneration of the anti-mouse capture surface was conducted with 10 mM glycine-HCl pH 1.7.

Expression of Grp94 in Senescent Cells
Flow Cytometry

Senescence was induced in IMR-90 cells (ATCC (catalog number CCL186)) by incubating the cells with 100 uM etoposide (Sigma E-1383) for 48 h hours as described in Krizhanovsky et al. Cell 134.4 (2008): 657-667.

Senescent IMR-90 cells were gently dissociated from plates using Tripled express reagent (12604-013, Thermo Fisher Scientific), and maintained in cold FACS buffer (PBS containing 1% FCS and 0.1% Sodium Azide) throughout the procedure.

Cells were incubated with anti-Grp94 4C2 antibody (1:62.5 (from 1.56 mg/ml) for 1.5 hours). This was followed by incubation with goat anti-rabbit Alexa647 conjugated antibody, 1:300 for 40 minutes. DAPI was shortly introduced in order to exclude dead cells during the washing step (with FACS buffer), prior to centrifugation. Cells were analyzed in a SORP-LSRII instrument (BD Biosciences). Data was collected from at least 20,000 single-cell events.

Cells were gated by their size (FSC/SSC), DAPI negative (live cells), and then analyzed for their fluorescence intensity at the wavelength of 647 (intensity of cell surface cell-surface Grp94 level) using Flow Jo vIO software.

Immunofluorescence Staining with 4C2

Cells (IMR-90 senescent cells) were incubated with anti-Grp94 antibody 4C2 diluted in DMEM 1:62.5 (from 1.56 mg/ml stock) for 3 h in 37° C. Cells were then washed 3 times with warm PBS and incubated with goat anti-rabbit Alexa647 conjugated antibody (111-605-003, Jackson immune-research, 1:300) for 30 minutes. Cells were then washed with warm PBS and visualized in Olympus 1X81 microscope and XM10 camera and processed using ImageJ v1.47 software.

Cloning and Transient Expression in CHO-S Cells

4C2, 5B2, and 9A3 were cloned as follows: individual VH and Vκ DNA sequences were cloned in-frame into a pANT109 megavector containing mouse IgG2a and Vκ constant regions.

CHO-S cells (Gibco Cat. No. A1155701) were transfected (transient transfection) with plasmid (pANT109 megavectors Abzena) expressing anti-Grp94 clones using Maxcyte electroporation. Transient suspension cultures (300 ml) were grown for 14 days before harvesting.

Antibody Purification

Clarified supernatants collected from recombinant CHO-S cells cultured for 14 days, were extracted by Protein A chromatography followed by preparative SEC (26/600 Superdex 200 pg). Final preparations of each of the purified antibodies were concentrated to greater than 1.5 mg/ml by centrifugal concentration and 0.2 um filter sterilized Antibody Sequencing

4C2

For the 4C2 hybridoma, heavy chain V-region, RT-PCR amplification products were observed following RT_PCR amplification with primer pool IgG-A in combination with the IgG constant region primer.

For the light chain V-region, RT-PCR amplification products were obtained from primer pools Igκ-A, Ig-E and Igκ-G.

A total of 8 VH clones (all from primer pool IgG-A) were sequenced together with 24 Vκ clones (8 from primer pool Igκ-E and 8 from primer pool Igκ-G).

5B2

For the 5B2 hybridoma heavy chain V-region, RT-PCR amplification products were observed with primer pools IgG-A and IgG-E in combination with the IgG constant region primer.

For the light chain V-region, RT-PCR amplification products were obtained from primer pools Igκ-A, Igκ-C, Igκ-E and Igκ-G.

A total of 16 VH clones (8 from primer pool IgG-A and 8 from primer pool IgG-E) were sequenced together with 42 Vκ clones (8 from primer pool Igκ-A, 18 from primer pool Igκ-C, 8 from primer pool Igκ-E and 8 from primer pool Igκ-G).

9A3

For the 9A3 hybridoma heavy chain V-region, RT-PCR amplification products were observed with primer pools IgG-A and IgG-F in combination with the IgG constant region primer.

For the light chain V-region, RT-PCR amplification products were obtained from primer pools Igκ-B, Igκ-E and Igκ-G.

A total of 16 VH clones (8 from primer pool IgG-A and 8 from primer pool IgG-F) were sequenced together with 23 Vκ clones (8 from primer pool Igκ-B, 8 from Igκ-E and 7 from primer pool Igκ-G).

Epitope Binning

Epitope binning was performed on the supernatants of selected lead antibodies using a Biacore T200 instrument running Biacore T200 Evaluation Software V3.0.1 (Sweden). All single binning experiments were run at 25° C. with HBS-P+ running buffer (pH 7.4) (GE Healthcare, UK). rhGrp94 diluted to 2 micrograms/ml in acetate buffer pH 5.5 was directly coupled to a CM5 chip using standard amine chemistry to a level of 100RU on Fc2. A blank immobilization was performed on the Fc1 reference cell. For epitope binning, a first antibody diluted in running buffer was injected to saturation prior to immediate injection of a second antibody. Regeneration of the Grp94 surface was performed using a 120 s injection of 3.85 M $MgCl_2$.

For each antibody tested the same antibody was injected twice to demonstrate epitope saturation. The signal from the reference channel Fc1 (no Grp94) was subtracted from that of Fc2 to correct for differences in non-specific binding to a reference surface. If binding increases following the injection of the second antibody, antibody two is binding to a different epitope. If binding remains similar, antibody two binds to an overlapping epitope.

Example 2: Production and Analysis of Anti-hGrp94 Antibodies

Objective:

To produce and identified anti-hGrp94 antibodies that recognize hGrp94 on the surface of senescent cells.

Methods:

See Example 1 above.

Results:

Antibody Discovery Overview

FIG. 1 presents a flow-chart indicating the steps used to make and identify monoclonal hybridoma clones that bind hGrp94 on the surface of senescent cells. Briefly, mice were immunized with human Grp94 (hGrp94) and hybridoma clones generated. 1737 hybridoma clones were selected for further testing using an ELISA assay. Of the ELISA positive clones, 52 were selected for further testing, using FACS for analyzing binding to Meth A sarcoma cells, which constitutively express Grp94 on their cell surface, which naturally express Grp94 on their cell surface. Of the 52 clones that were positive for Meth A binding, 35 of them were tested by Biacore; and of those 35, 25 of them bound Meth A stronger than the other 10.

The twenty-five clones showing the best binding to the Meth A sarcoma cells were given scores with 1 being the best binder. Thirty-five clones which tested positive for Meth A sarcoma cell surface binding, were further analyzed using Biocore™ technology. Seven of the Biocore™ positive clones were then tested for binding to human senescent cells (IR-90 cells—senescence was induced in these cells by etoposide. Twelve additional clones were also tested for binding to human senescent cells.

The binding properties of representative clones (25) within the 35 clones that tested positive for cell surface Meth A sarcoma cell binding are presented in Table 1, including the initial Biacore™ binding results that followed Meth A sarcoma binding selection.

TABLE 1

Binding Properties of Selected Meth
A Sarcoma Cell-Surface Binding Clones

| Clone | Meth A Binding* | Meth A Dilution 1:2* | ELISA OD$_{450}$ | Biacore KD (M) | Top 24 by Meth A** |
|---|---|---|---|---|---|
| 4C2 | 2691 | 1992 | 1.755 | 3.47E−09 | 1 |
| 5B2 | 819 | 746 | 1.745 | 2.50E−09 | 12 |
| 9A3 | 732 | 688 | 1.365 | No Binding | 18 |

*Results represent mean fluorescence intensity.
RFU—relative fluorescence units
**The best 25 clones were given scores with 1 being the best binder.

Figure 2:
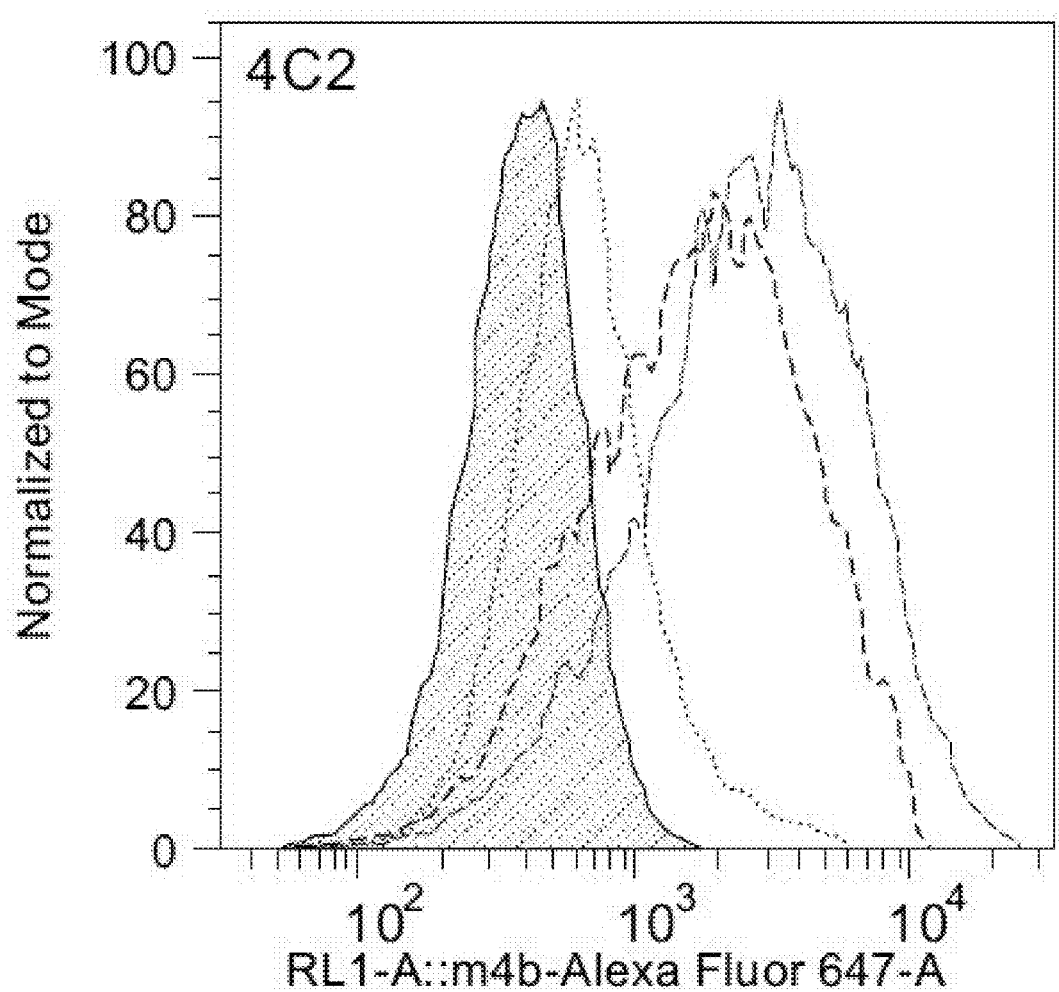
FIG. 2 presents a representative flow cytometry histogram for binding of the 4C2 clone hybridoma supernatant to human Grp94 protein expressed on the cell surface of Meth A fibrosarcoma cells. The histogram shows binding of the different samples as follows: secondary antibody only (filled space); commercial monoclonal anti-grp94 antibody (dotted line; R & D Systems cat. MAB 7606); neat (undiluted) 4C2 supernatant (thin dashed lines) and 4C2 supernatant diluted 1 in 2 (thick dashed lines).
Figure 3A:
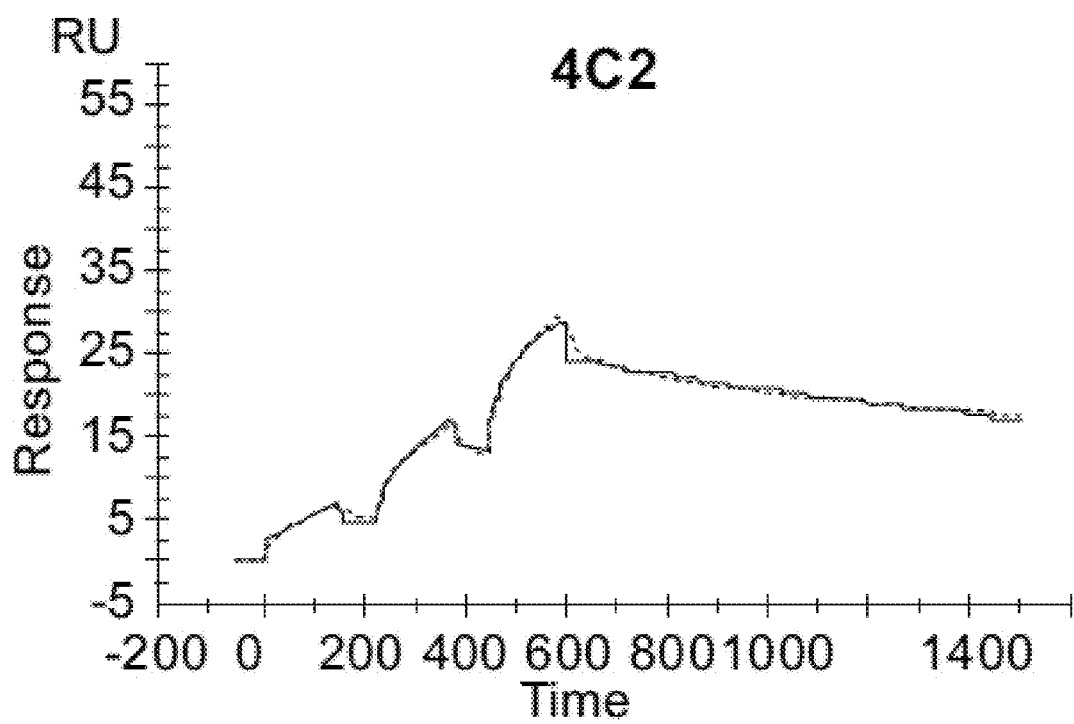
FIGS. 3A and 3B present Biacore™ binding data for clone 4C2 (FIG. 3A) and clone 5B2 (FIG. 3B).
Figure 3B:
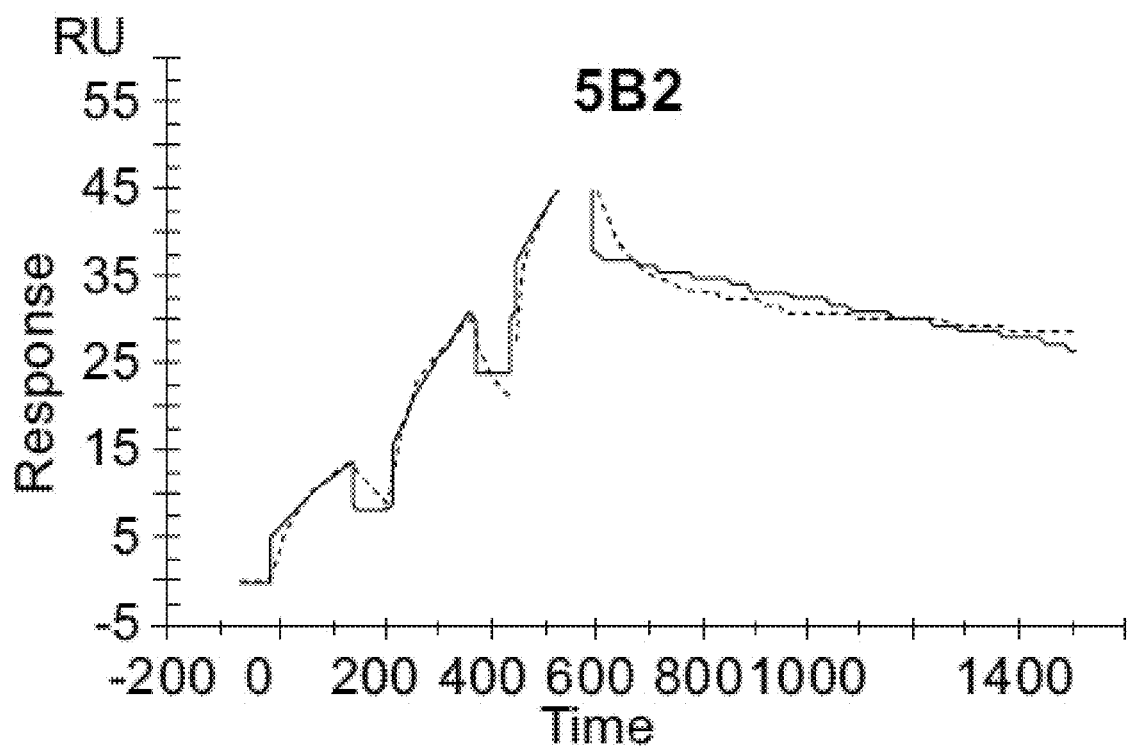

Binding to human Grp94 by monoclonal antibodies produced by the identified clones was analyzed using FACS (Fluorescence-activated cell sorting) and Biacore single cycle kinetic analysis. A representative flow cytometry histogram for clone 4C2 is presented in FIG. 2. FIG. 2 exemplifies that monoclonal 4C2 antibodies have increased binding to mouse Grp94 compared with a commercial anti-human Grp94 monoclonal antibody (source: R & D ibid). FIGS. 3A and 3B present representative Biacore™ binding data to recombinant human Grp94 of monoclonal antibodies produced by clone 4C2 and clone 5B2.

Figure 4A:
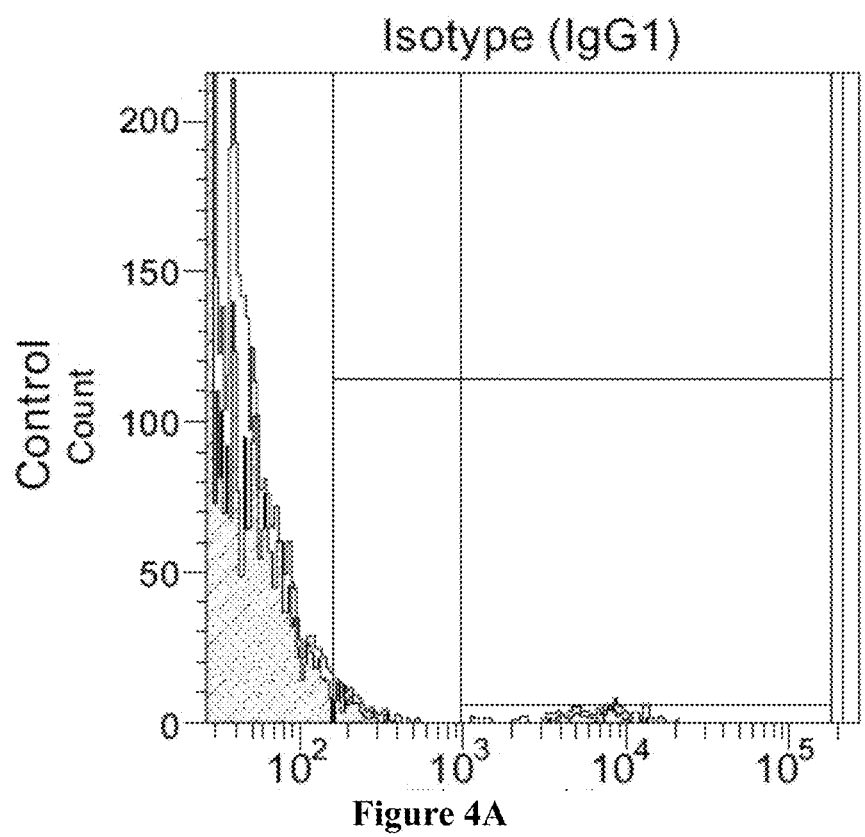
FIGS. 4A-4D present representative flow cytometry histogram for the 4C2 clone hybridoma supernatant binding to growing primary mouse fibroblasts (control cells) (Grp94 Gr—growing cells; Grp94Et—senescent cells) (FIG. 4C) and senescent primary mouse fibroblasts (FIG. 4D), wherein increased binding by the 4C2 clone to senescent cells is observed in FIG. 4D.
Figure 4B:
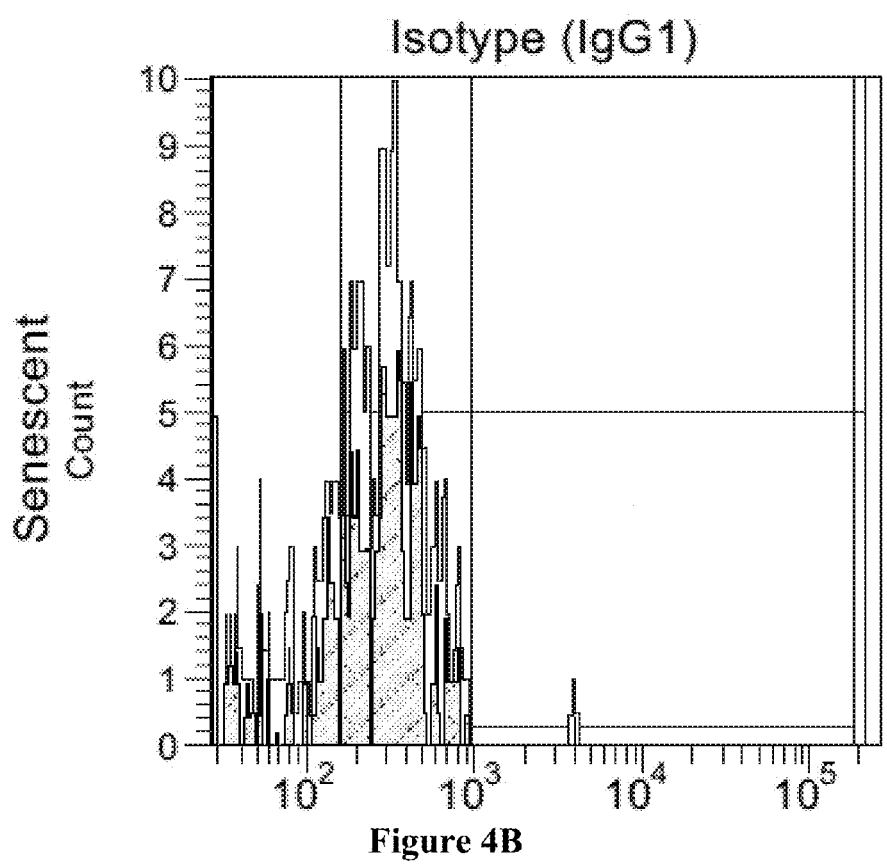
Figure 4C:
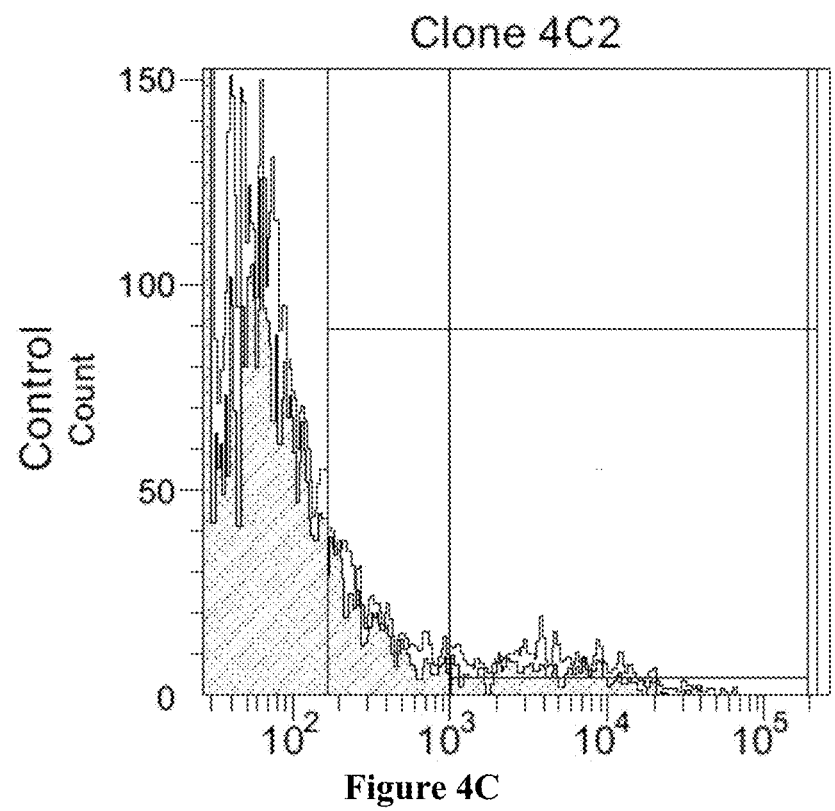
Figure 4D:
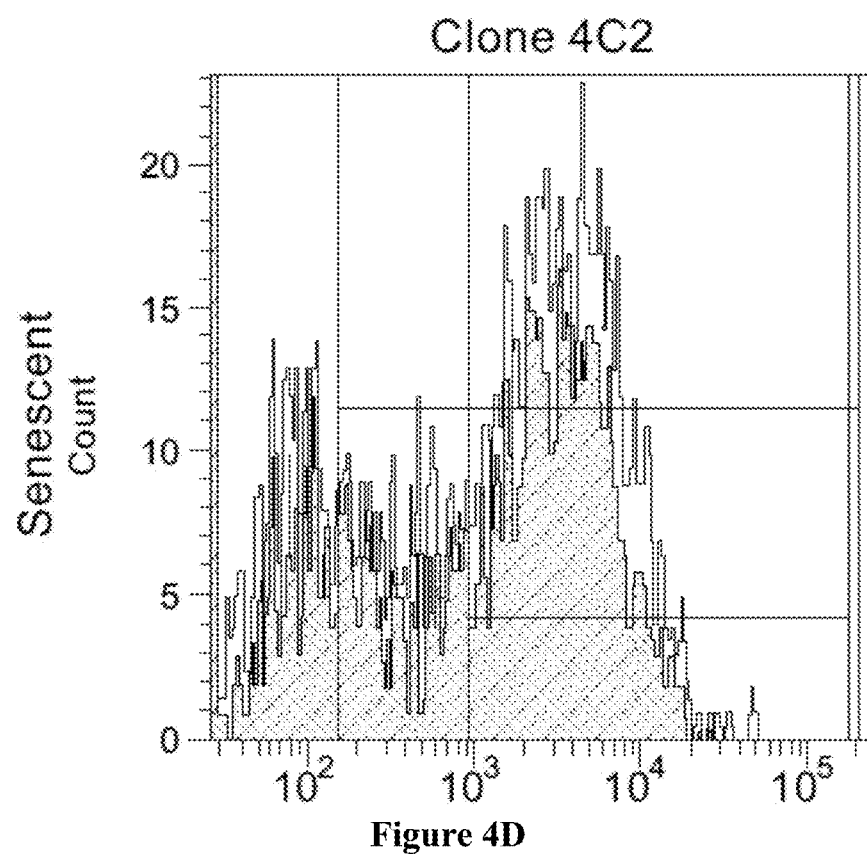

Monoclonal antibody clones were further analyzed for binding to senescent cells. Senescent cells used were primary mouse lung fibroblasts or human lung fibroblasts (IMR-90) that had been induced to be senescent. Table 2 presents data from 3 representative clones: 4C2, 5B2, and 9A3, and FIGS. 4A-4D provide a representative FACS flow cytometry histogram for the 4C2 clone. Monoclonal antibodies of clone 4C2 show significantly increased binding to senescent cells (FIG. 4D) compared with control, non-senescent cells (FIG. 4C), wherein the binding to non-senescent cells is comparable to a non-specific antibody binding to these cells (FIG. 4A). A non-relevant, isotype control antibody was included in the analysis to ensure that fluorescence obtained in the study was specific. The non-specific control antibody did not show significant binding to the senescent cells (FIG. 4B).

TABLE 2

Clones Binding to Senescent Cells

| Clone | Human IF* | Human FACS plot* | Human FACS ratio** | Mouse FACS* | Mouse FACS ratio** |
|---|---|---|---|---|---|
| 4C2 | 1 | 4 | 1 | 2, 3 | 5 |
| 5B2 | 3 | 3 | 3 | 2, 3 | 6 |
| 9A3 | 4 | 1 | 6 | 4 | 7 |

*9 clones were tested and given scores 1-9 with 1 being the best.
**Number represents ratio between the expression in senescent cells and proliferating cells.

Figure 5A:
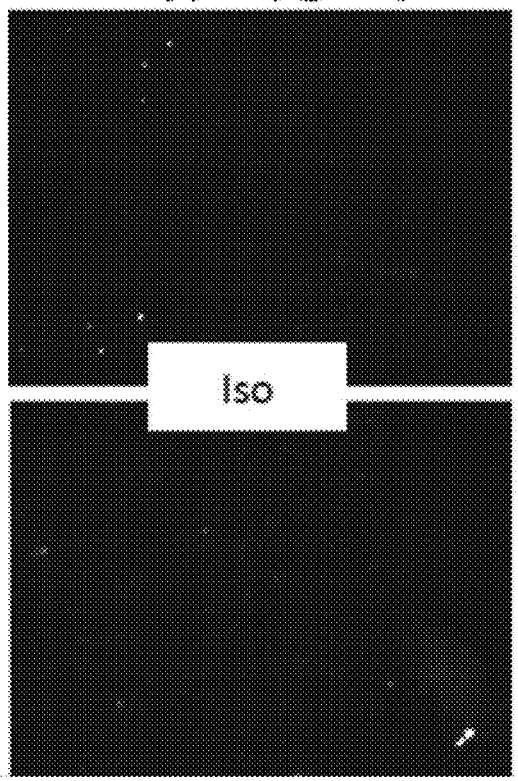
FIGS. 5A and 5B present representative immunofluorescence staining of non-permeabilized senescent IMR-90 human lung fibroblasts with the 4C2 hybridoma supernatant or an IgG1 isotype control.
Figure 5B:
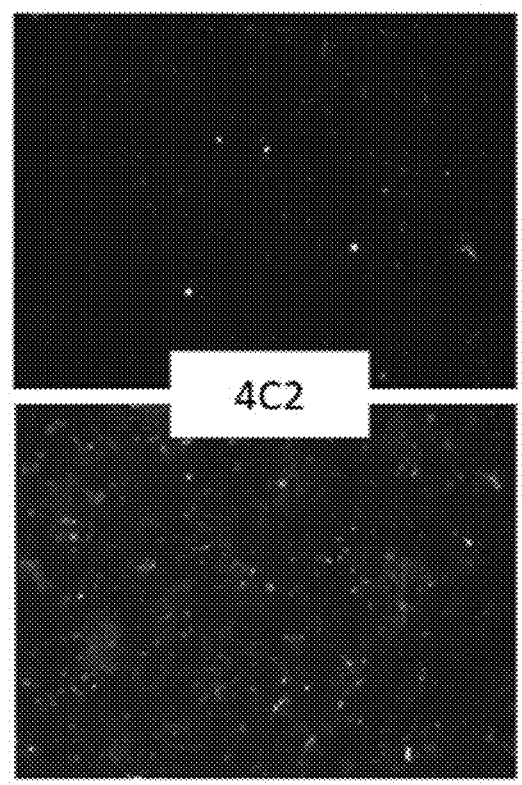

The increased binding of monoclonal antibody 4C2 to IMR-90 senescent cells compared with non-senescent cells was confirmed using immunofluorescence (FIGS. 5A and 5B).

Variable Heavy (VH) Chain and Variable Light (VL) Chain Sequences of Representative Clones Clone 4C2

Figure 6:
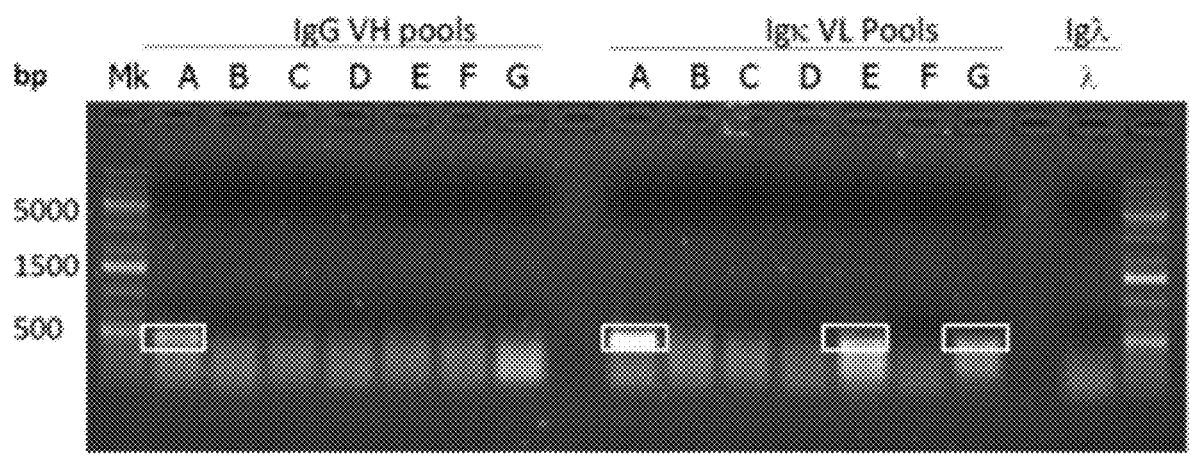
FIG. 6 presents Agarose gel separation of hybridoma 4C2 RT-PCR products. Gels were stained with SYBR* Green dye (Thermo Fisher) and photographed over UV light. Mk size marker (bp) is GeneRuler™ 1 Kb Plus (Thermo Fisher). Boxes indicate bands that were isolated for cloning and sequencing.

FIG. 6 presents a micrograph showing agarose gel separation of hybridoma 4C2 RT-PCT products. The boxes indicate the bands that were isolated for cloning and sequencing. For the 4C2 hybridoma heavy chain V-region, RT-PCR amplification products were observed with primer pool IgG-A in combination with the IgG constant region primer. For the light chain V-region, RT-PCR amplification products were obtained from primer pools Igκ-A, Igκ-E and Igκ-G.

Figure 8A:
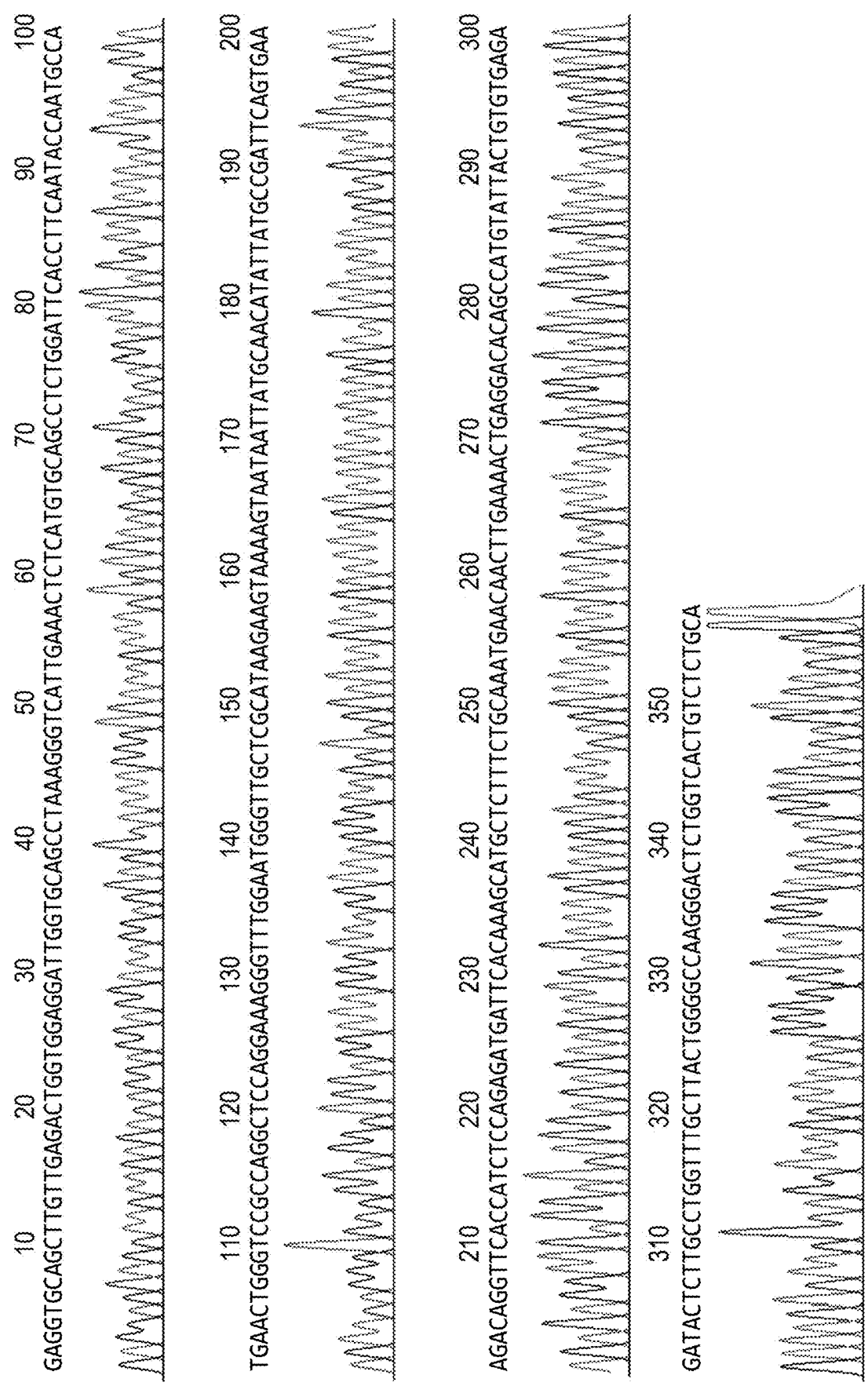
FIGS. 8A and 8B present the hybridoma chromatograms of the heavy and light chains of clone 4C2.

A single functional VH gene sequence was identified in 7 out of 8 clones from pool IgG-A (see FIG. 7A for the nucleotide sequence (SEQ ID NO: 1) and amino acid sequence (SEQ ID NO: 2) of the 4C2 VH chain). and FIG. 8A for chromatograms), with the remaining clone containing a single point mutation (F27 changed to S27). The CDR sequences are identified in red in FIG. 7A. The nucleic acid sequences of the VH chain CDR regions are set forth as follows: 4C2 VH-CDR1—SEQ ID NO: 3; 4C2 VH-CDR2—SEQ ID NO: 4; 4C2 VH-CDR3—SEQ ID NO: 5). The amino acid sequences encoding by 4C2-VH CDR1-CDR3 are set forth as follows: 4C2 VH-CDR1—SEQ ID NO: 6; 4C2 VH-CDR2—SEQ ID NO: 7; 4C2 VH-CDR3—SEQ ID NO: 8). CDR definitions and protein sequence numbering is according to Kabat E A, Te Wu T, Bilofsky H, (U.S.) NI of H. Sequences of Immunoglobulin Chains: Tabulation and Analysis of Amino Acid Sequences of Precursors, V-regions, C-regions, J-Chain and BP-Microglobulins, 1979. Department of Health, Education, and Welfare, Public Health Service, National Institutes of Health (1979). Available online at: https://books.google.com/books?id=OpW8-ibqyvcCexcept VH CDR1, which was defined using Chothia C, Lesk A M. Canonical structures for the hypervariable regions of immunoglobulins. J Mol Biol. (1987) 196:901-17. doi: 10.1016/0022-2836(87)90412-8 and Kabat et al., (ibid).

Figure 8B:
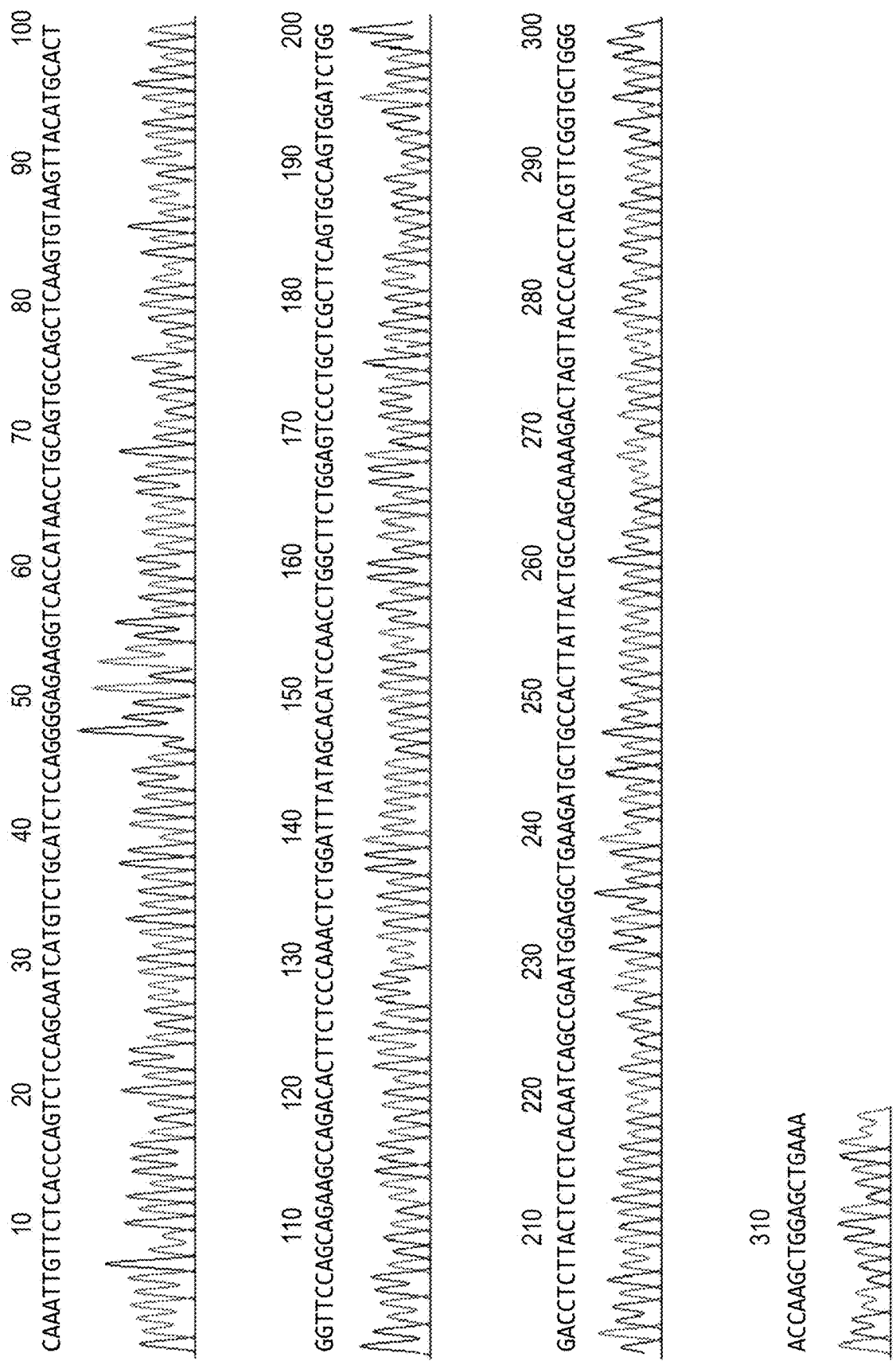

A single functional Vκ (Kappa light chain) gene sequence was identified in 7 out of 8 clones from primer pool Igκ-A (see FIG. 7B for the nucleotide sequence (SEQ ID NO: 9) and amino acid sequence (SEQ ID NO: 10) of the 4C2 Vκ (Light) chain) and FIG. 8B for chromatograms), with the remaining clone giving poor data. 15 out of 16 clones from primer pools Igκ-E and Igκ-G were identified as an aberrant transcript or variants thereof commonly associated with the hybridoma cell line SP2/). The remaining clone was identified as a truncated and frameshifted non-functional antibody.

The nucleic acid sequences of the Vκ (Light) chain CDR regions are set forth as follows: 4C2 VL-CDR1—SEQ ID NO: 11; 4C2 VL-CDR2—SEQ ID NO: 12; 4C2 VL-CDR3—SEQ ID NO: 13). The amino acid sequences encoding by 4C2-VH CDR1-CDR3 are set forth as follows: 4C2 VL-CDR1—SEQ ID NO: 14; 4C2 VL-CDR2—SEQ ID NO: 15; 4C2 VL-CDR3—SEQ ID NO: 16). CDR definitions and protein sequence numbering is according to Kabat, except VH CDR1, which was defined using Kabat et al., (ibid) and Chothia et al., (ibid).

Three additional monoclonal antibodies from the positive human Grp94 binding hybridoma clones were sequenced: 5B2, 9A3, and 20H2.

Clone 5B2

Figure 9:
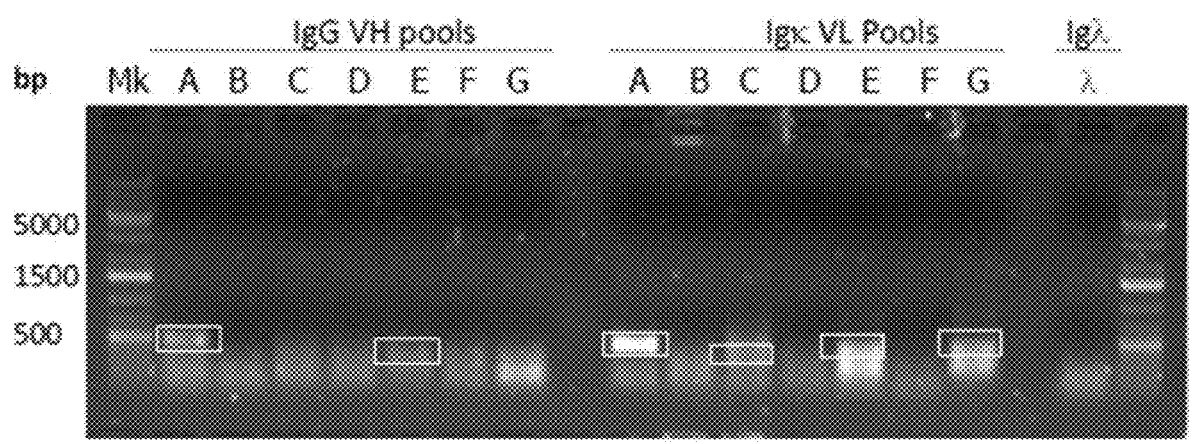
FIG. 9 presents Agarose gel separation of hybridoma 5B2 RT-PCR products. Gels were stained with SYBR* Green dye (Thermo Fisher) and photographed over UV light. Mk size marker (bp) is GeneRuler™ 1 Kb Plus (Thermo Fisher). Boxes indicate bands that were isolated for cloning and sequencing.

FIG. 9 presents a micrograph showing agarose gel separation of hybridoma 5B2 RT-PCT products. The boxes indicate the bands that were isolated for cloning and sequencing.

Figure 11A:
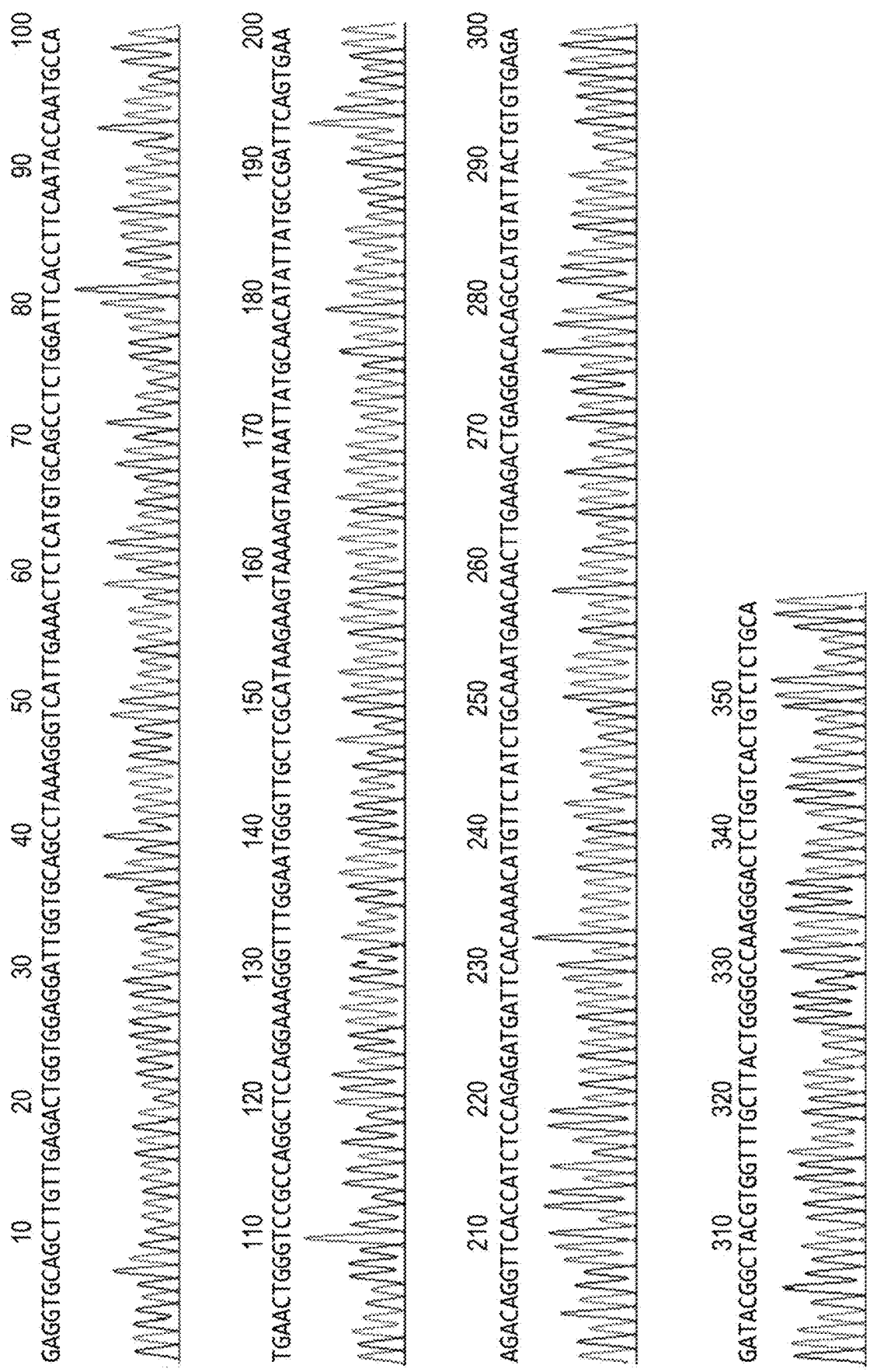
FIGS. 11A and 11B present the hybridoma chromatograms of the heavy and light chains of clone 5B2.

A single functional VH gene sequence was identified in 7 out of 8 clones from pool IgG-A (see FIG. 10A for the nucleotide sequence (SEQ ID NO: 17) and amino acid sequence (SEQ ID NO: 18) of the 5B2 VH chain). and FIG. 11A for chromatograms), with the remaining clone giving poor data. The CDR sequences are identified in red in FIG. 10A. The nucleic acid sequences of the VH chain CDR regions are set forth as follows: 5B2 VH-CDR1—SEQ ID NO: 3; 5B 2 VH-CDR2—SEQ ID NO: 4; 5B 2 VH-CDR3—SEQ ID NO: 19). The amino acid sequences encoding by 5B 2-VH CDR1-CDR3 are set forth as follows: 5B2 VH-CDR1—SEQ ID NO: 6; 5B2 VH-CDR2—SEQ ID NO: 7; 5B2 VH-CDR3—SEQ ID NO: 20). CDR definitions and protein sequence numbering is according to Kabat (ibid), except VH CDR1, which was defined using Kabat et al., (ibid) and Chothia et al., (ibid).

Figure 11B:
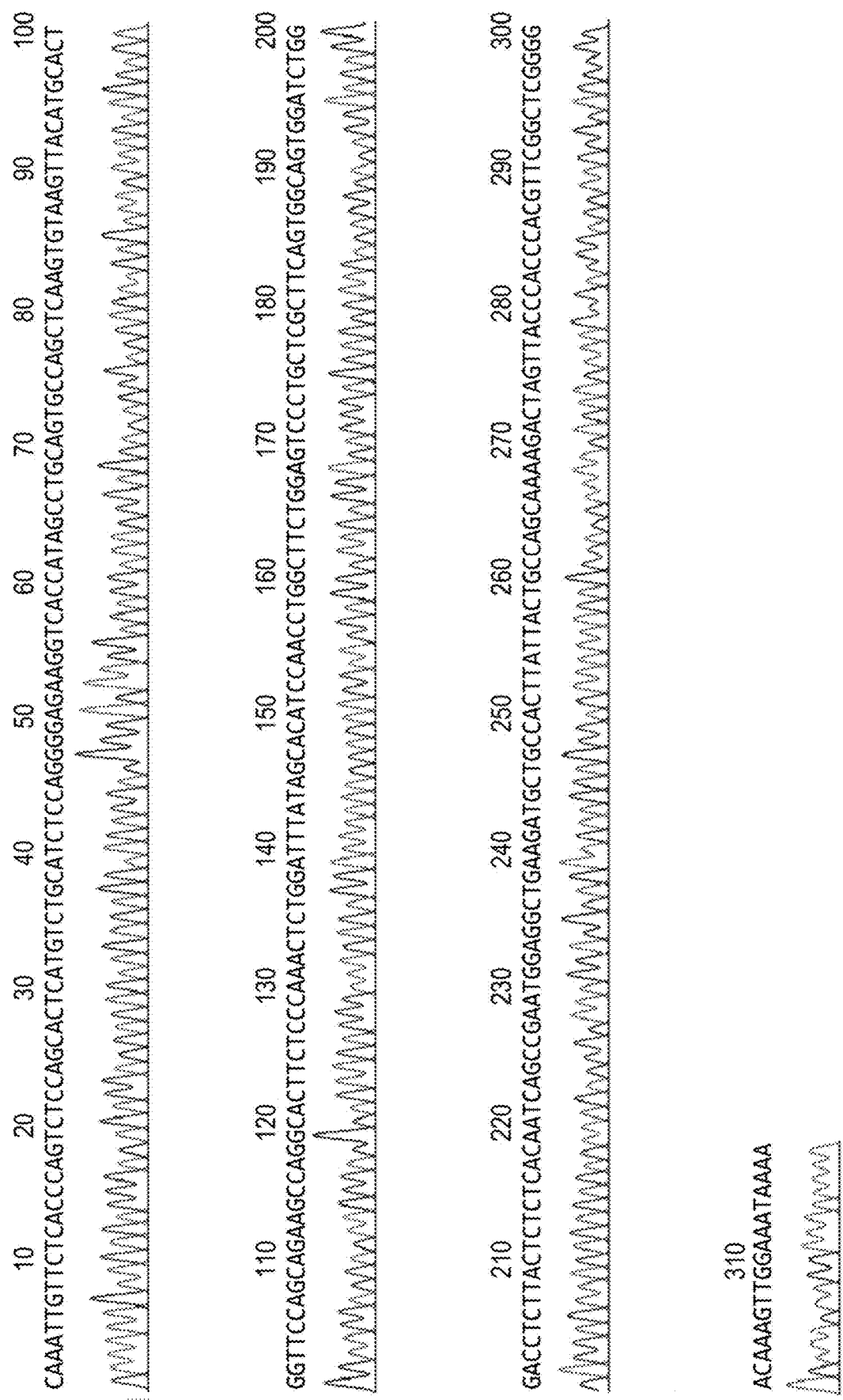

A single functional Vκ (Kappa light chain) gene sequence was identified in 8 out of 8 clones from primer pool Igκ-A (see FIG. 10B for the nucleotide sequence (SEQ ID NO: 21) and amino acid sequence (SEQ ID NO: 22) of the 5B2 Vκ (Light) chain) and FIG. 11B for chromatograms). 13 out of 18 clones from primer pools Igκ-C and Igκ-G were identified as truncated and frameshifted non-functional antibody. The remaining clone 5 clones were identified as mouse kappa constant region. 16 clones from primer pool Igκ-E and Igκ-G were identified as aberrant transcript or variant thereof commonly associated with the hybridoma cell line SP2/0.

The nucleic acid sequences of the Vκ (Light) chain CDR regions are set forth as follows: 5B2 VL-CDR1—SEQ ID NO: 11; 5B2 VL-CDR2—SEQ ID NO: 12; 5B2 VL-CDR3—SEQ ID NO: 23). The amino acid sequences encoding by 5B2-VL CDR1-CDR3 are set forth as follows: 5B2 VL-CDR1—SEQ ID NO: 14; 5B2 VL-CDR2—SEQ ID NO: 15; 5B2 VL-CDR3—SEQ ID NO: 16). CDR definitions and protein sequence numbering is according to Kabat (ibid), except VH CDR1, which was defined using Kabat et al., (ibid) and Chothia et al., (ibid).

Clone 9A3

Figure 12:
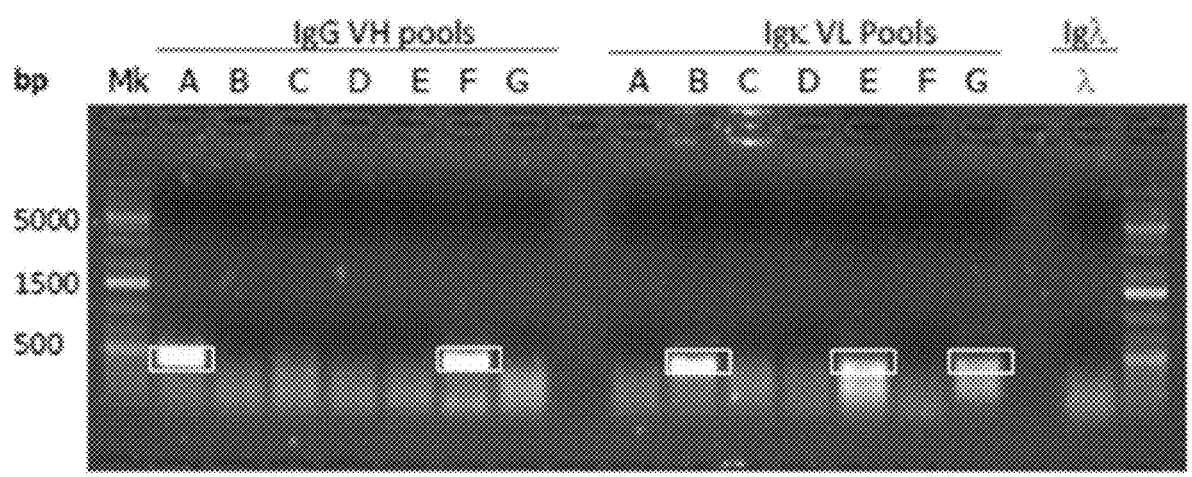
FIG. 12 presents Agarose gel separation of hybridoma 9A3 RT-PCR products. Gels were stained with SYBR* Green dye (Thermo Fisher) and photographed over UV light. Mk size marker (bp) is GeneRuler™ 1 Kb Plus (Thermo Fisher). Boxes indicate bands that were isolated for cloning and sequencing.

FIG. 12 presents a micrograph showing agarose gel separation of hybridoma 9A3 RT-PCT products. The boxes indicate the bands that were isolated for cloning and sequencing.

Figure 14A:
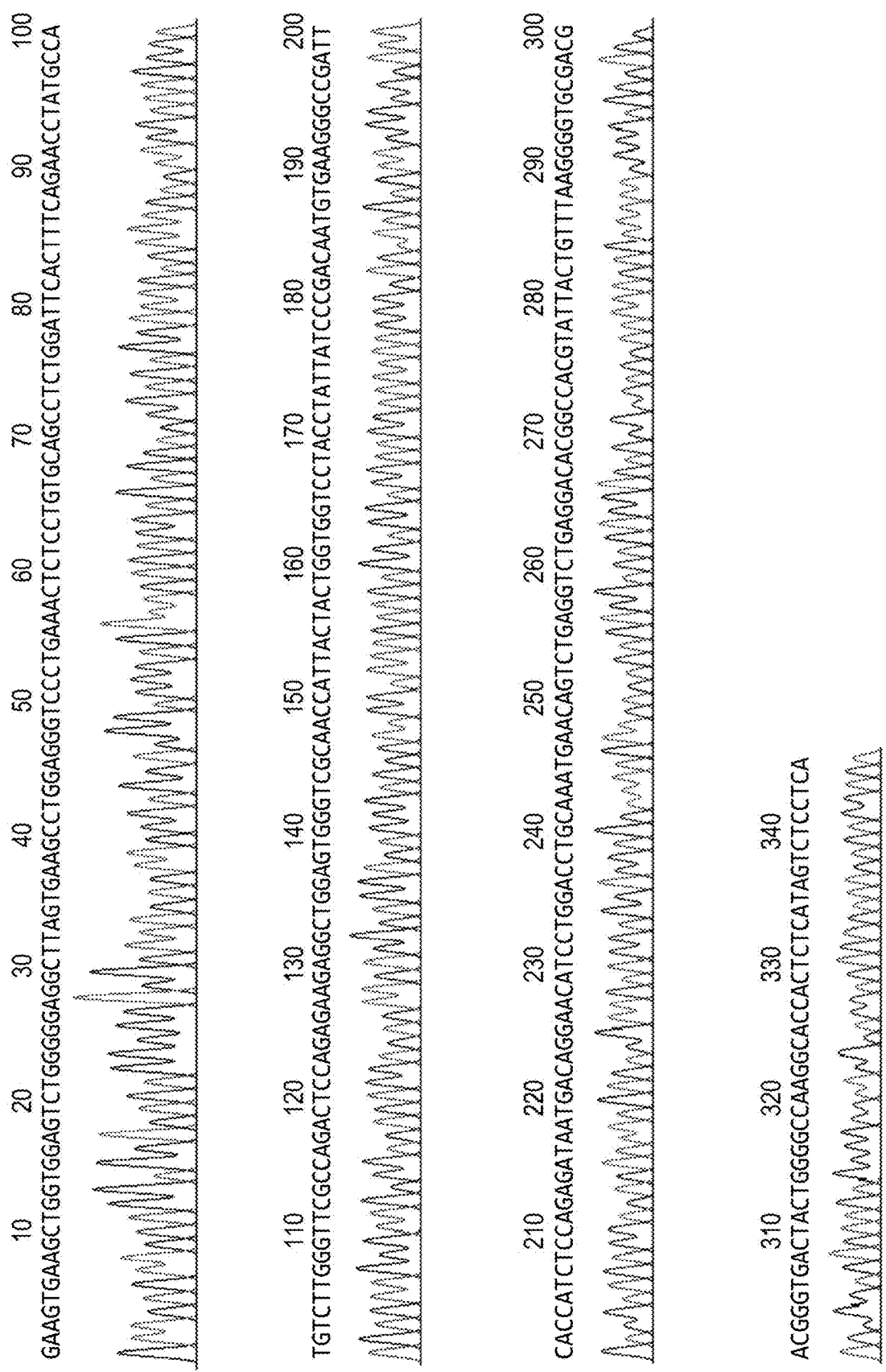
FIGS. 14A and 14B present the hybridoma chromatograms of the heavy and light chains of clone 9A3.

A single functional VH gene sequence was identified in 15 out of 16 clones from pool IgG-A and Ig-F (see FIG. 13A for the nucleotide sequence (SEQ ID NO: 24) and amino acid sequence (SEQ ID NO: 25) of the 9A3 VH chain). and FIG. 14A for chromatograms), with the remaining clone containing a single point mutation (K64 changed to R64). The CDR sequences are identified in red in FIG. 13A.

The nucleic acid sequences of the VH chain CDR regions are set forth as follows: 9A3 VH-CDR1—SEQ ID NO: 26; 9A3 VH-CDR2—SEQ ID NO: 27; 9A3 VH-CDR3—SEQ ID NO: 28). The amino acid sequences encoding by 9A3-VH CDR1-CDR3 are set forth as follows: 9A3 VH-CDR1—SEQ ID NO: 29; 9A3 VH-CDR2—SEQ ID NO: 30; 9A3 VH-CDR3—SEQ ID NO: 31). CDR definitions and protein sequence numbering is according to Kabat, except VH CDR1, which was defined using Kabat and Chothia.

Figure 14B:
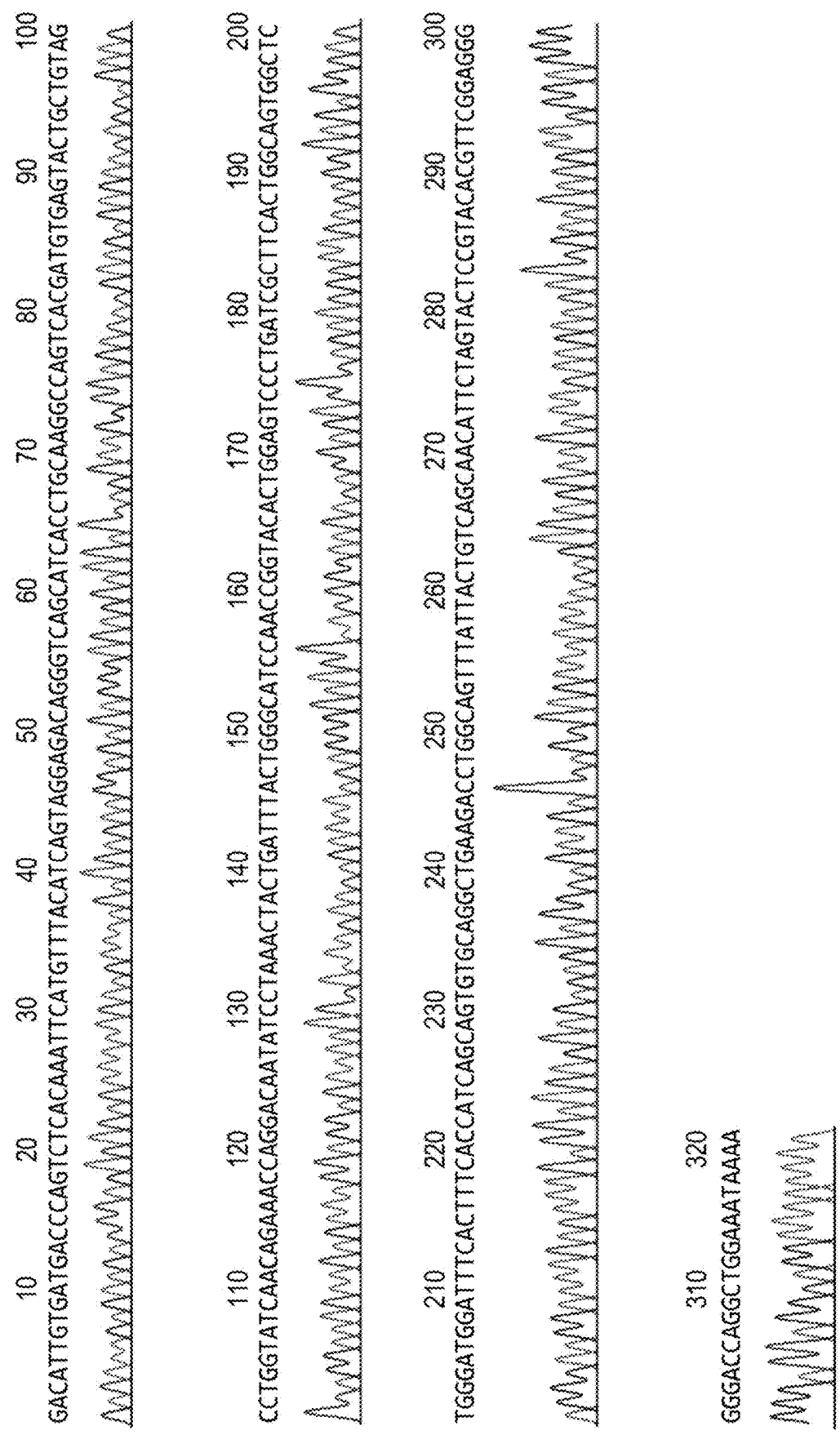

A single functional Vκ (Kappa light chain) gene sequence was identified in 7 out of 8 clones from primer pool Igκ-B (see FIG. 13B for the nucleotide sequence (SEQ ID NO: 32) and amino acid sequence (SEQ ID NO: 33) of the 9A3 Vκ (Light) chain) and FIG. 14B for chromatograms) with the remaining clone containing a single point mutation (V78 changed to M78). 15 clones from primer pools Igκ-E and Igκ-G were identified as aberrant transcripts or variants thereof commonly associated with the hybridoma cell line SP2/0.

The nucleic acid sequences of the Vκ (Light) chain CDR regions are set forth as follows: 9A3 VL-CDR1—SEQ ID NO: 34; 9A3 VL-CDR2—SEQ ID NO: 35; 9A3 VL-CDR3—SEQ ID NO: 36). The amino acid sequences encoding by 9A3-VL CDR1-CDR3 are set forth as follows: 9A3 VL-CDR1—SEQ ID NO: 37; 9A3 VL-CDR2—SEQ ID NO: 38; 9A3 VL-CDR3—SEQ ID NO: 39). CDR definitions and protein sequence numbering is according to Kabat, except VH CDR1, which was defined using Kabat and Chothia (ibid).

Clone 20H2

A single functional VH gene sequence was identified (SEQ ID NO: 40) and amino acid sequence (SEQ ID NO: 41) of the 20H2 VH chain). A single functional VL gene sequence was identified (SEQ ID NO: 42) and amino acid sequence (SEQ ID NO: 43) of the 20H2 VL chain).

Epitope Binning

Figures 15, 16:
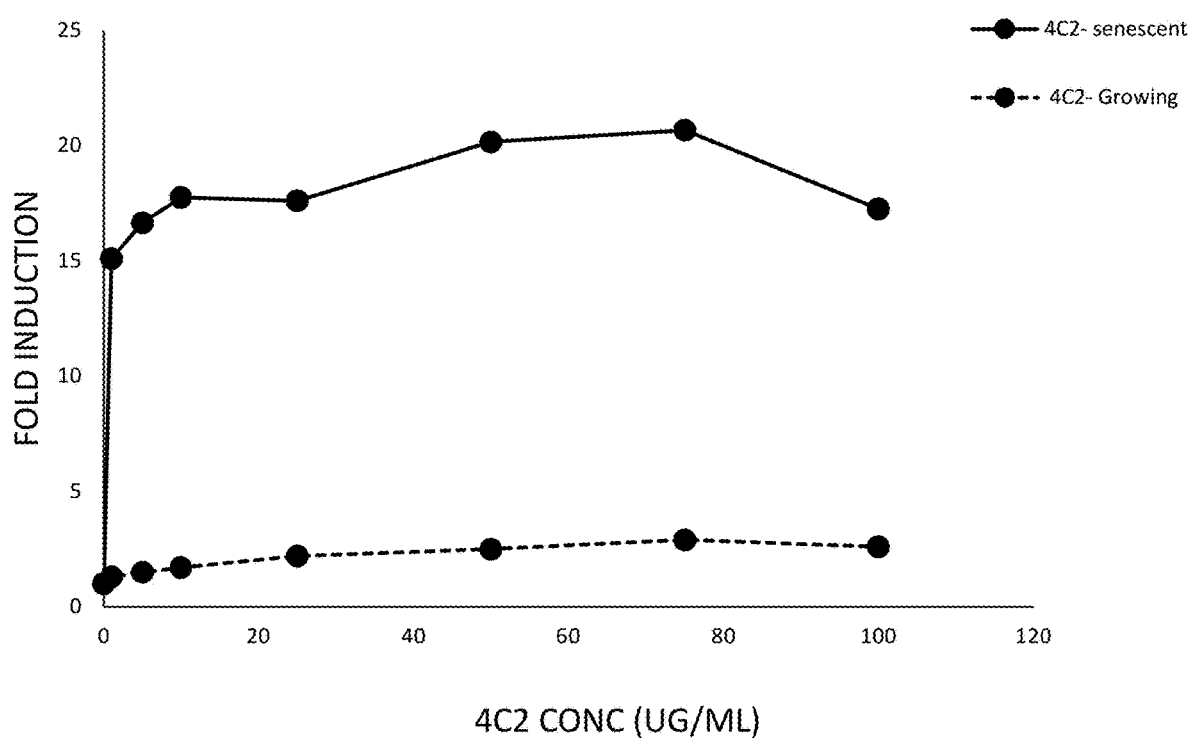
FIG. 15 presents Epitope binning data showing overlapping (green) and different (red) epitopes bound by the hybridoma clones 4C2, 5B2, 7H12, 9A3, and 20H2.
FIG. 16 presents the ADCC activity of 4C2 with an optimized Fc region (mutated Fc region) as measured by the Fc gamma receptor ADCC reporter bioassay (Promega M1211; Wisconsin, United States), demonstrating that 4C2 with an optimized Fc region can mediate senescent cell specific ADCC (Antibody Dependent Cell Mediated Cytotoxicity) Activity.

Epitope binning was used to examine overlapping epitopes of the antibodies expressed from the isolated hybridoma clones 4C2, 5B2, 7H12, 9A3, and 20H2. Epitope binning was determined using a Biacore™ T200 (GE Life Sciences). The results show that clone 9A3 appears to bind to a unique epitope, while the binding of the other clones tested is to overlapping or possibly identical epitopes. Antibodies showing overlapping epitopes are shown in green, antibodies showing different epitopes are shown in red (FIG. 15).

Example 3: Analysis for Senescent Cell Specific Antibody Dependent Cell Mediated Cytotoxicity (ADCC)

Objective:

To examine the antibody dependent cell mediated cytotoxicity (ADCC) activity mediated by anti-Grp94 antibodies.

Methods:

The—ADCC—activity of 4C2 was measured using the mFcγRIV ADCC Reporter Bioassay (M1211, Promega Wisconsin, USA) according to manufacturer instructions. Briefly, senescent IMR-90 fibroblasts were used as target cells and normal, growing IMR-90 cells were used as controls.

Cells were incubated with the Anti-Grp94 clone 4C2 at 0.5-100 ug/ml for 30 minutes followed by a 6 h incubation with effector cells provided by the Promega kit, at an Effector:Target ratio of 10:1. Luminescence was read by a plate reader.

Results:

FIG. 16 shows 4C2 with an optimized Fc region mediated ADCC activity upon binding to Grp94 on the cell surface of senescent IMR-90 cells (solid line) as evident by a 20-fold activation of the reporter gene. This activation was not observed when control cells, that do not express Grp94 on the cell surface, were used as target cells (dotted line).

These results demonstrate specific ADCC activity towards senescent cells mediated by 4C2 antibody.

Example 4: Comparison Binding of Anti-Grp94 to Lung Cells from Idiopathic Pulmonary Fibrosis (IPF) Patient vs. a Healthy Subject Objective:

To examine the binding of anti-Grp94 antibodies to patient-derived human cells.

Methods:

IPF and normal fibroblasts were obtained from Lonza (Basel, Switzerland; Diseased Human Lung Fibroblasts (iPF) catalog number CC-7231 and Normal Lung Fibroblasts catalog number CC-2512). Senescence was evaluated in these cells by SA beta galactosidase (SA-beta-gal) staining. 4C2 binding to Grp94 expressed on the cell surface was analyzed by FACS in non-permeabilized cells. Results from 2 independent experiments are shown.

Figure 17A:
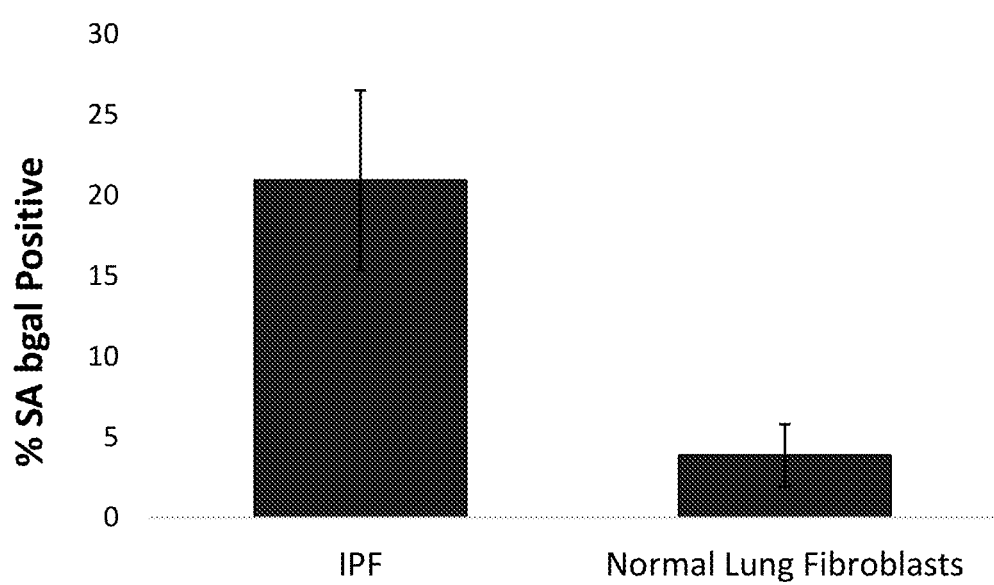
FIGS. 17A-17B show percentage of cells positive for the senescence marker SA-beta-gal in human lung fibroblasts obtained from an IPF patient and from a normal donor (Lonza) (FIG. 17A)
Figure 17B:
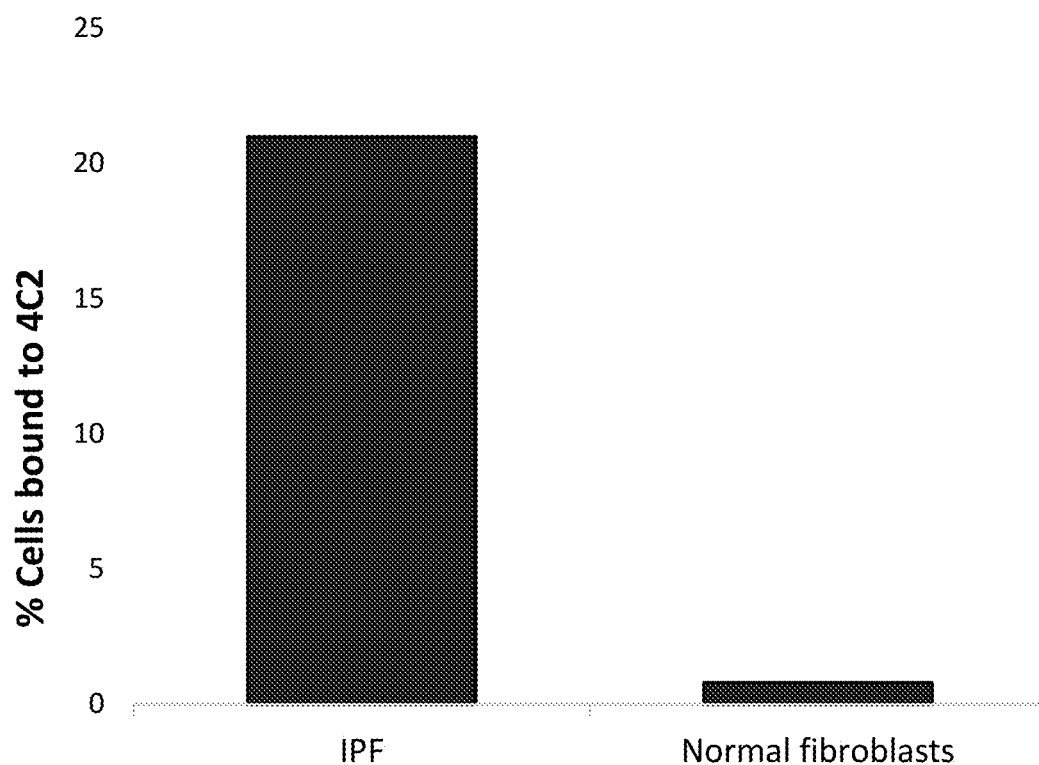

Results:

Senescence-associated beta-galactosidase activity was detected in a higher percentage in IPF human lung fibroblasts as compared to normal lung fibroblasts (FIG. 17A). In correlation with the IPF fibroblasts demonstrating a higher percentage of senescent cells, FIG. 17B shows that 4C2 preferentially binds to the surface of human lung fibroblasts from IPF patients as compared to normal lung fibroblasts.

Example 5: Optimization of Anti-Grp94 Activity

Objective:

To enhance the ADCC and CDC activities of anti-Grp94 antibodies, for example by optimizing the Fc chain region of the antibody.

Methods:

The anti-Grp94 clone 4C2 DNA was synthesized and cloned into a vector containing mouse IgG2a harboring two mutations in the Fc chain region. The mutations were substitution mutations S239D and I332E.

The vector was then used to transiently transfect 293T or CHO cells. Cells were propagated and cell suspensions were collected and extracted using affinity chromatography.

To obtain an afucosylated antibody, two methods were used. In one, a decoy substrate which limits the incorporation of fucose during glycosylation was used (performed in transfected 293T cells). In the other, redirecting fucose synthesis using a heterologous enzyme that depletes the fucose pool inside the cell was used (performed in transfected CHO cells).

Binding of 4C2 and an Optimized Version of the Antibody to Cell Surface Grp94 was Tested by FACS in Senescent IMR-90 Cells Senescence was induced in human IMR-90 (ATCC, CCL-186) cells by a 48 h incubation with 100 uM etoposide followed by incubation in culture medium (14 days). On the study day, culture plates of senescent cells were washed with 10 ml warm PBS, and the cells were gently detached using warm TrypLE Express (1 ml per plate; 5-10 minutes incubation). Cold FACS buffer (PBS/5% FBS) was then added, and the cells were collected into 15 ml tubes and centrifuged at 250×g and 4° C. for 10 minutes.

Cell pellets were resuspended in FACS buffer and distributed into 1.5 ml tubes at equal volumes and centrifuged again. Anti-Grp94 clone 4C2 (mIgG2a; at 50 ug/ml) or the optimized anti-Grp94 4C2 clone (mIgG2a; 50 ug/ml) were added to each tube for a 60-70-minutes and incubated at 4° C. 600 ul FACS buffer was then added, and the tubes were centrifuged. 250 ul of secondary antibody (anti mouse Alexa 647, Jackson 115-605-146 diluted in FACS buffer 1:300) were added to each tube for a 40-minute incubation at 4° C. 600 ul FACS buffer supplemented with DAPI (diluted 1:10,000) were then added and the tubes were centrifuged. Pellets were resuspended with 200 ul FACS buffer.

Samples were analyzed using GUAVA Flow Cytometry analyzer.

Data was analyzed using the FCSalyzer 0.9.18-alpha software. Duplicates and dead cells (DAPI positive cells) were excluded.

The Optimized Anti-Grp94 Antibody was Tested for ADCC Activity

The optimized anti-Grp94 4C2 clone was tested for ADCC activity using the reporter-gene Promega kit Promega M1215). This assay is based on engineered T cells that have the intracellular signaling pathway elements for ADCC mechanism of action, T cells expressing mouse FcgRIV—the predominant receptor involved in mouse ADCC; closely related to human FcgRIII (predominant human ADCC receptor) wherein Fc receptor activation was quantified through a reporter gene.

The target cells were senescent IMR-90 cells wherein anti-Grp94 clone 4C2 antibody with a wild-type Fc region and the optimized anti-Grp94 antibody were compared.

Figure 18A:
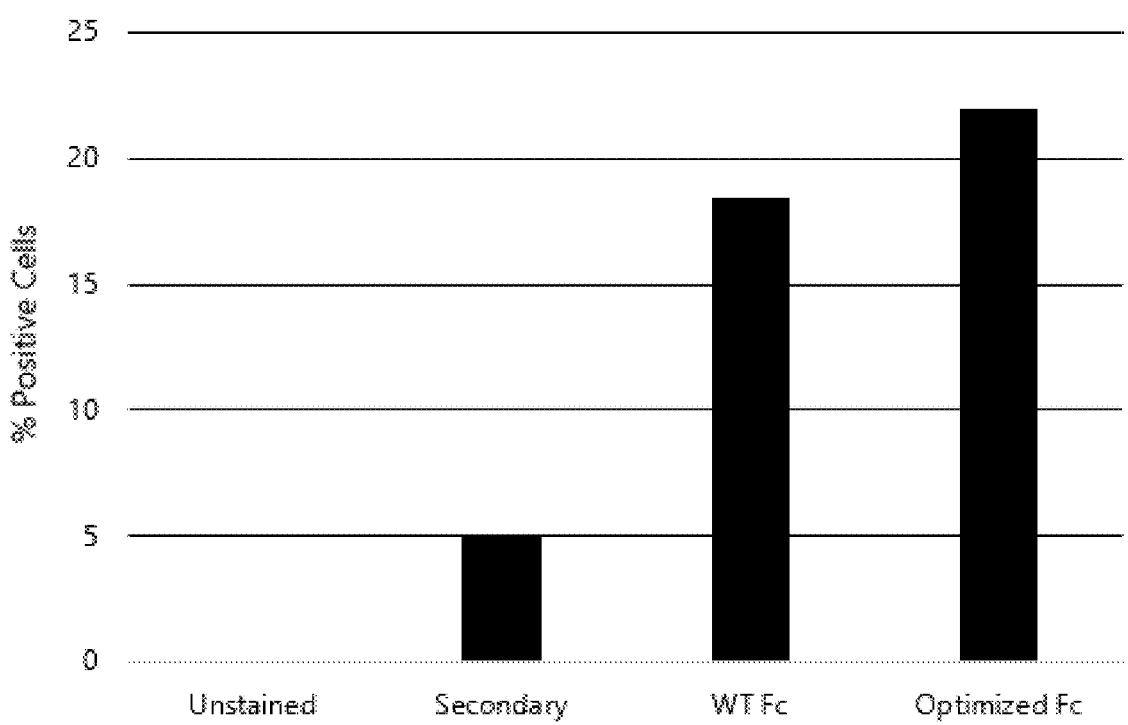
FIGS. 18A-18C show characteristics of an optimized 4C2 anti-Grp94 antibody.
Figure 18B:
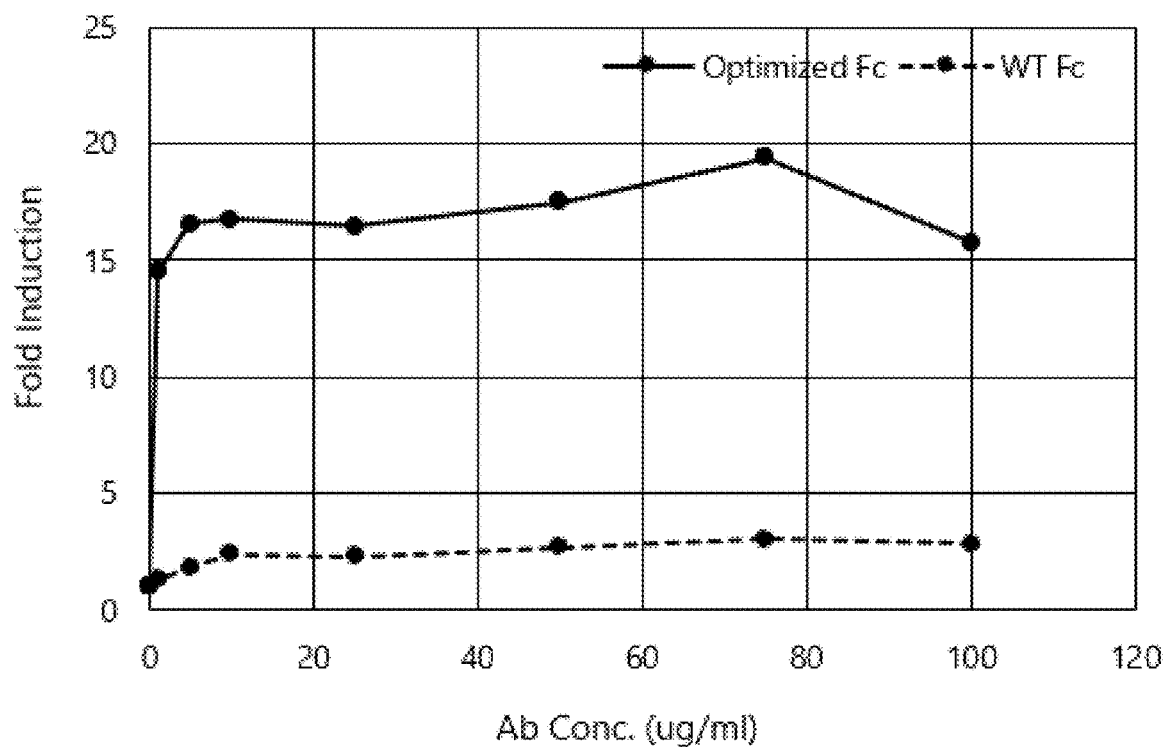
Figure 18C:
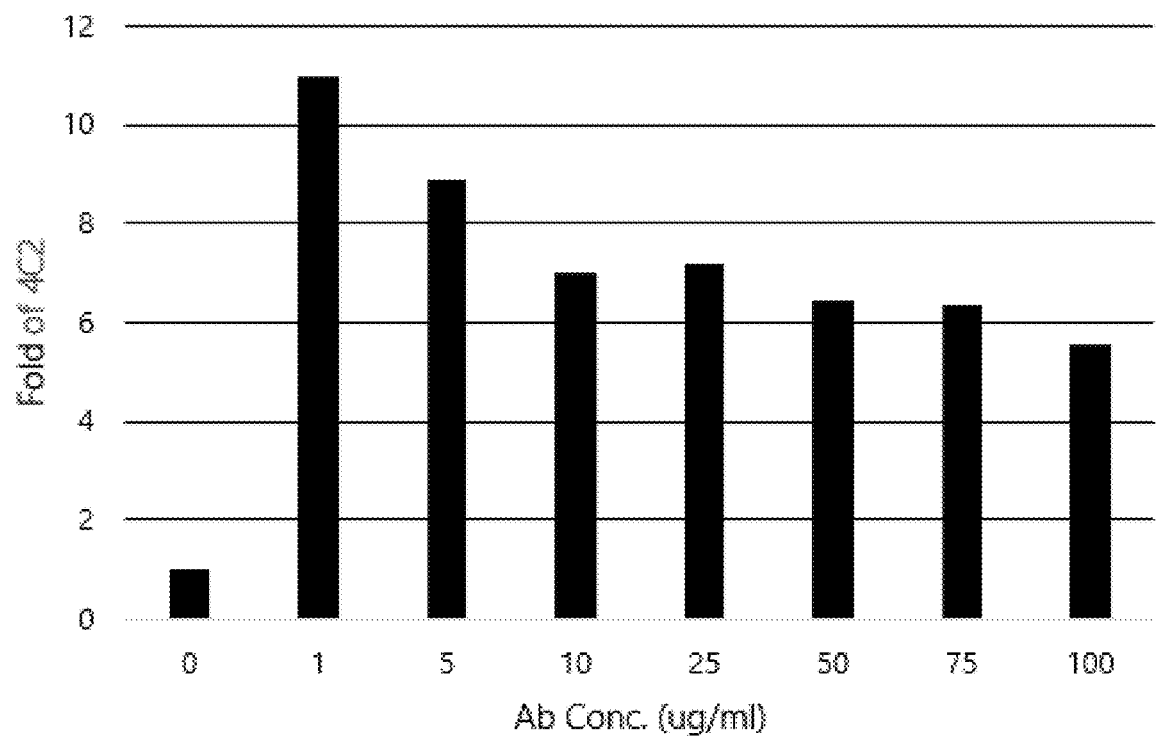

Results:

The optimized anti-Grp94 4C2 antibody-maintained binding to cell surface Grp94 in senescent cells (FIG. 18A). Moreover, the optimized 4C2 anti-Grp94 antibody showed ADCC Activity (FIGS. 18B and 18C). The data presented in FIGS. 18B and 18C show that there was a 20-fold activation of the reporter observed following binding of the optimized 4C2 antibody to Grp94 on the cell surface of IMR-90 cells compared with the wild-type 4C2 antibody. Isotype control and the original 4C2 anti-Grp94 antibody did not activate the reporter. No reporter activation was seen when growing IMR-90 were used as target cells.

Next, activity in additional Grp94-cell surface expressing cells will be tested along with assaying ADCC activity in the conventional NK-based ADCC assay, wherein a similar activation is expected compared with a Grp94 antibody lacking mutations in the Fc binding region. CDC activity with the optimized anti-Grp94 antibodies will also be analyzed, wherein increased activity is expected by the optimized antibodies compared with a Grp94 antibody lacking mutations in the Fc binding region.

While certain features of the anti-Grp94 antibodies and there uses have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An isolated anti-Grp94 antibody comprising a heavy chain variable region (VH) and a light chain variable region (VL), wherein said VH comprises heavy chain complementarity determining regions (HCDRs) HCDR1, HCDR2 and HCDR3, said VL comprises light chain complementarity determining regions (LCDRs) LCDR1, LCDR2 and LCDR3, wherein said antibody comprises:

(a) an HCDR1 comprising the amino acid sequence of SEQ ID NO: 6, the an HCDR2 comprising the amino acid sequence of SEQ ID NO:7, an HCDR3 comprising the amino acid sequence of SEQ ID NO:8, an LCDR1 comprising the amino acid sequence of SEQ ID NO: 14, an LCDR2 comprising the amino acid sequence of SEQ ID NO:15, and an LCDR3 comprising-comprises the amino acid sequence of SEQ ID NO: 16;

(b) an HCDR1 comprising the amino acid sequence of SEQ ID NO:6, an HCDR2 comprising the amino acid sequence of SEQ ID NO:7, an HCDR3 comprising the amino acid sequence of SEQ ID NO:20, an LCDR1 comprising the amino acid sequence of SEQ ID NO: 14, an LCDR2 comprising the amino acid sequence of SEQ ID NO:15, and an LCDR3 comprising the amino acid sequence of SEQ ID NO: 16;

(c) an HCDR1 comprising-comprises the amino acid sequence of SEQ ID NO:29, an HCDR2 comprising the amino acid sequence of SEQ ID NO:30, the an HCDR3 comprising the amino acid sequence of SEQ ID NO:31, the an LCDR1 comprising the amino acid sequence of SEQ ID NO: 37, an LCDR2 comprising the amino acid sequence of SEQ ID NO:38, and an LCDR3 comprising the amino acid sequence of SEQ ID NO:39; or (d) a VH comprising the amino acid sequence of SEQ ID NO:41 and a VL comprising the amino acid sequence of SEQ ID NO:43.

2. The isolated antibody of claim 1, wherein the antibody comprises:
  (i) a VH and a VL having the amino acid sequences set forth in SEQ ID NOs: 2 and 10, respectively;
  (ii) a VH and a VL having the amino acid sequences set forth in SEQ ID NOs:18 and 22, respectively; or
  (iii) a VH and a VL having the amino acid sequences set forth in SEQ ID NOs:25 and 33, respectively.

3. The antibody of claim 1, wherein the antibody comprises an IgG, a Fv, a scFv, a Fab, or a F(ab')2 antibody.

4. The antibody of claim 1, wherein the amino acid sequence of said VH comprises a humanized framework (FR) sequence and the amino acid sequence of said VL comprises a humanized FR sequence.

5. The antibody of claim 1, wherein said antibody comprises a heavy chain comprising a mutation that increases binding to Fcγ receptor.

6. A composition comprising the isolated antibody of claim 1 and a pharmaceutically acceptable carrier.

7. An isolated polynucleotide sequence encoding a heavy chain variable region of an anti-Grp94 antibody and a light chain variable region of the anti-Grp94 antibody, wherein said polynucleotide sequence comprises SEQ ID NO: 1 and SEQ ID NO: 9, SEQ ID NO: 17 and SEQ ID NO: 21, SEQ ID NO: 24 and SEQ ID NO: 32, or SEQ ID NO: 40 and SEQ ID NO: 42.

8. The isolated polynucleotide sequence of claim 7, wherein the antibody comprises an IgG, a Fv, a scFv, a Fab, or a F(ab')2 antibody.

9. A vector comprising the polynucleotide sequence of claim 7.

10. A host cell comprising the vector of claim 9.

11. A method of targeting senescent cells in a subject in need thereof comprising administering an anti-Grp94 antibody of claim 1 to the subject, wherein the subject has a disease or condition associated with cellular senescence.

12. The method of claim 11, wherein said disease or condition associated with cellular senescence is an age-related disease or condition.

13. The method of claim 12, wherein said age-related disease comprises a fibrotic disease or condition, or an inflammatory disease or condition.

* * * * *

SEQUENCE LISTING

```
Sequence total quantity: 43
SEQ ID NO: 1              moltype = DNA  length = 357
FEATURE                   Location/Qualifiers
misc_feature              1..357
                          note = 4C2 VH
source                    1..357
                          mol_type = genomic DNA
                          organism = Mus sp.
SEQUENCE: 1
gaggtgcagc ttgttgagac tggtggagga ttggtgcagc ctaaagggtc attgaaactc   60
tcatgtgcag cctctggatt caccttcaat accaatgcca tgaactgggt ccgccaggct  120
ccaggaaagg gtttggaatg ggttgctcgc ataagaagta aagtaataa ttatgcaaca  180
```

```
tattatgccg attcagtgaa agacaggttc accatctcca gagatgattc acaaagcatg    240
ctctttctgc aaatgaacaa cttgaaaact gaggacacag ccatgtatta ctgtgtgaga    300
gatactcttg cctggtttgc ttactggggc caagggactc tggtcactgt ctctgca      357
```

```
SEQ ID NO: 2              moltype = AA   length = 119
FEATURE                   Location/Qualifiers
REGION                    1..119
                          note = 4C2 VH
source                    1..119
                          mol_type = protein
                          organism = Mus sp.
SEQUENCE: 2
EVQLVETGGG LVQPKGSLKL SCAASGFTFN TNAMNWVRQA PGKGLEWVAR IRSKSNNYAT     60
YYADSVKDRF TISRDDSQSM LFLQMNNLKT EDTAMYYCVR DTLAWFAYWG QGTLVTVSA    119

SEQ ID NO: 3              moltype = DNA   length = 30
FEATURE                   Location/Qualifiers
misc_feature              1..30
                          note = Description of Artificial Sequence: Synthetic
                             oligonucleotide
misc_feature              1..30
                          note = 4C2VH CDR1;5B2 VH CDR1
source                    1..30
                          mol_type = other DNA
                          organism = synthetic construct
SEQUENCE: 3
ggattcacct tcaataccaa tgccatgaac                                      30

SEQ ID NO: 4              moltype = DNA   length = 57
FEATURE                   Location/Qualifiers
misc_feature              1..57
                          note = Description of Artificial Sequence: Synthetic
                             oligonucleotide
misc_feature              1..57
                          note = 4C2VH CDR2;5B2 VH CDR2
source                    1..57
                          mol_type = other DNA
                          organism = synthetic construct
SEQUENCE: 4
cgcataagaa gtaaaagtaa taattatgca acatattatg ccgattcagt gaaagac        57

SEQ ID NO: 5              moltype = DNA   length = 24
FEATURE                   Location/Qualifiers
misc_feature              1..24
                          note = Description of Artificial Sequence: Synthetic
                             oligonucleotide
misc_feature              1..24
                          note = 4C2VH CDR3
source                    1..24
                          mol_type = other DNA
                          organism = synthetic construct
SEQUENCE: 5
gatactcttg cctggtttgc ttac                                            24

SEQ ID NO: 6              moltype = AA   length = 10
FEATURE                   Location/Qualifiers
REGION                    1..10
                          note = Description of Artificial Sequence: Synthetic peptide
REGION                    1..10
                          note = 4C2VH CDR1:5B2 VH CDR1
source                    1..10
                          mol_type = protein
                          organism = synthetic construct
SEQUENCE: 6
GFTFNTNAMN                                                            10

SEQ ID NO: 7              moltype = AA   length = 19
FEATURE                   Location/Qualifiers
REGION                    1..19
                          note = Description of Artificial Sequence: Synthetic peptide
REGION                    1..19
                          note = 4C2VH CDR2;5B2 VH CDR2
source                    1..19
                          mol_type = protein
                          organism = synthetic construct
SEQUENCE: 7
RIRSKSNNYA TYYADSVKD                                                  19

SEQ ID NO: 8              moltype = AA   length = 8
```

```
FEATURE                 Location/Qualifiers
REGION                  1..8
                        note = Description of Artificial Sequence: Synthetic peptide
REGION                  1..8
                        note = 4C2VH CDR3
source                  1..8
                        mol_type = protein
                        organism = synthetic construct
SEQUENCE: 8
DTLAWFAY                                                                   8

SEQ ID NO: 9            moltype = DNA   length = 318
FEATURE                 Location/Qualifiers
misc_feature            1..318
                        note = 4C2 VL
source                  1..318
                        mol_type = genomic DNA
                        organism = Mus sp.
SEQUENCE: 9
caaattgttc tcacccagtc tccagcaatc atgtctgcat ctccagggga gaaggtcacc          60
ataacctgca gtgccagctc aagtgtaagt tacatgcact ggttccagca gaagccagac        120
acttctccca aactctggat ttatagcaca tccaaactgg cttctggagt ccctgctcgc        180
ttcagtgcca gtggatctgg gacctcttac tctctcacaa tcagccgaat ggaggctgaa        240
gatgctgcca cttattactg ccagcaaaag actagttacc cacctacgtt cggtgctggg        300
accaagctgg agctgaaa                                                       318

SEQ ID NO: 10           moltype = AA   length = 106
FEATURE                 Location/Qualifiers
REGION                  1..106
                        note = 4C2 VL
source                  1..106
                        mol_type = protein
                        organism = Mus sp.
SEQUENCE: 10
QIVLTQSPAI MSASPGEKVT ITCSASSSVS YMHWFQQKPD TSPKLWIYST SNLASGVPAR          60
FSASGSGTSY SLTISRMEAE DAATYYCQQK TSYPPTFGAG TKLELK                        106

SEQ ID NO: 11           moltype = DNA   length = 31
FEATURE                 Location/Qualifiers
misc_feature            1..31
                        note = Description of Artificial Sequence: Synthetic
                        oligonucleotide
misc_feature            1..31
                        note = 4C2VL CDR1
source                  1..31
                        mol_type = other DNA
                        organism = synthetic construct
SEQUENCE: 11
agtgccagct caagtgtaag ttacatgcac t                                         31

SEQ ID NO: 12           moltype = DNA   length = 21
FEATURE                 Location/Qualifiers
misc_feature            1..21
                        note = Description of Artificial Sequence: Synthetic
                        oligonucleotide
misc_feature            1..21
                        note = 4C2VL CDR2
source                  1..21
                        mol_type = other DNA
                        organism = synthetic construct
SEQUENCE: 12
agcacatcca acctggcttc t                                                    21

SEQ ID NO: 13           moltype = DNA   length = 27
FEATURE                 Location/Qualifiers
misc_feature            1..27
                        note = Description of Artificial Sequence: Synthetic
                        oligonucleotide
misc_feature            1..27
                        note = 4C2VL CDR3
source                  1..27
                        mol_type = other DNA
                        organism = synthetic construct
SEQUENCE: 13
cagcaaaaga ctagttaccc acctacg                                              27

SEQ ID NO: 14           moltype = AA   length = 10
FEATURE                 Location/Qualifiers
REGION                  1..10
```

```
                        REGION              1..10
                                            note = 4C2VL CDR1
                        source              1..10
                                            mol_type = protein
                                            organism = synthetic construct
SEQUENCE: 14
SASSSVSYMH                                                                     10

SEQ ID NO: 15           moltype = AA  length = 7
FEATURE                 Location/Qualifiers
REGION                  1..7
                        note = Description of Artificial Sequence: Synthetic peptide
REGION                  1..7
                        note = 4C2VL CDR2
source                  1..7
                        mol_type = protein
                        organism = synthetic construct
SEQUENCE: 15
STSNLAS                                                                         7

SEQ ID NO: 16           moltype = AA  length = 9
FEATURE                 Location/Qualifiers
REGION                  1..9
                        note = Description of Artificial Sequence: Synthetic peptide
REGION                  1..9
                        note = 4C2VL CDR3
source                  1..9
                        mol_type = protein
                        organism = synthetic construct
SEQUENCE: 16
QQKTSYPPT                                                                       9

SEQ ID NO: 17           moltype = DNA  length = 357
FEATURE                 Location/Qualifiers
misc_feature            1..357
                        note = 5B2 VH
source                  1..357
                        mol_type = genomic DNA
                        organism = Mus sp.
SEQUENCE: 17
gaggtgcagc ttgttgagac tggtggagga ttggtgcagc ctaaagggtc attgaaactc              60
tcatgtgcag cctctggatt caccttcaat accaatgcca tgaactgggt ccgccaggct             120
ccaggaaagg gtttggaatg ggttgctcgc ataagaagta aagtaataa tttatgcaaca             180
tattatgccg attcagtgaa agacaggttc accatctcca gagatgattc acaaaacatg             240
ttctatctgc aaatgaacaa cttgaagact gaggacacag ccatgtatta ctgtgtgaga             300
gatacggcta cgtggtttgc ttactggggc caagggactc tggtcactgt ctctgca               357

SEQ ID NO: 18           moltype = AA  length = 119
FEATURE                 Location/Qualifiers
REGION                  1..119
                        note = 5B2 VH
source                  1..119
                        mol_type = protein
                        organism = Mus sp.
SEQUENCE: 18
EVQLVETGGG LVQPKGSLKL SCAASGFTFN TNAMNWVRQA PGKGLEWVAR IRSKSNNYAT              60
YYADSVKDRF TISRDDSQNM FYLQMNNLKT EDTAMYYCVR DTATWFAYWG QGTLVTVSA              119

SEQ ID NO: 19           moltype = DNA  length = 24
FEATURE                 Location/Qualifiers
misc_feature            1..24
                        note = Description of Artificial Sequence: Synthetic
                         oligonucleotide
misc_feature            1..24
                        note = 5B2VH CDR3
source                  1..24
                        mol_type = other DNA
                        organism = synthetic construct
SEQUENCE: 19
gatacggcta cgtggtttgc ttac                                                      24

SEQ ID NO: 20           moltype = AA  length = 8
FEATURE                 Location/Qualifiers
REGION                  1..8
                        note = Description of Artificial Sequence: Synthetic peptide
REGION                  1..8
                        note = 5B2VH CDR3
source                  1..8
```

```
                            mol_type = protein
                            organism = synthetic construct
SEQUENCE: 20
DTATWFAY                                                                  8

SEQ ID NO: 21               moltype = DNA  length = 318
FEATURE                     Location/Qualifiers
misc_feature                1..318
                            note = 5B2 VL
source                      1..318
                            mol_type = genomic DNA
                            organism = Mus sp.
SEQUENCE: 21
caaattgttc tcacccagtc tccagcactc atgtctgcat ctccagggga gaaggtcacc          60
atagcctgca gtgccagctc aagtgtaagt tacatgcact ggttccagca gaagccaggc        120
acttctccca aactctggat ttatagcaca tccaacctgg cttctggagt ccctgctcgc        180
ttcagtggca gtggatctgg gacctcttac tctctcacaa tcagccgaat ggaggctgaa        240
gatgctgcca cttattactg ccagcaaaag actagttacc cacccacgtt cggctcgggg        300
acaaagttgg aaataaaa                                                       318

SEQ ID NO: 22               moltype = AA  length = 106
FEATURE                     Location/Qualifiers
REGION                      1..106
                            note = 5B2 VL
source                      1..106
                            mol_type = protein
                            organism = Mus sp.
SEQUENCE: 22
QIVLTQSPAL MSASPGEKVT IACSASSSVS YMHWFQQKPG TSPKLWIYST SNLASGVPAR          60
FSGSGSGTSY SLTISRMEAE DAATYYCQQK TSYPPTFGSG TKLEIK                        106

SEQ ID NO: 23               moltype = DNA  length = 27
FEATURE                     Location/Qualifiers
misc_feature                1..27
                            note = Description of Artificial Sequence: Synthetic
                             oligonucleotide
misc_feature                1..27
                            note = 5B VL CDR3
source                      1..27
                            mol_type = other DNA
                            organism = synthetic construct
SEQUENCE: 23
cagcaaaaga ctagttaccc acccacg                                             27

SEQ ID NO: 24               moltype = DNA  length = 345
FEATURE                     Location/Qualifiers
misc_feature                1..345
                            note = 9A3 VH
source                      1..345
                            mol_type = genomic DNA
                            organism = Mus sp.
SEQUENCE: 24
gaagtgaagc tggtggagtc tgggggaggc ttagtgaagc ctggagggtc cctgaaactc          60
tcctgtgcag cctctggatt cactttcaga acctatgcca tgtcttgggt tcgccagact        120
ccagagaaga ggctggagtg ggtcgcaacc attactacta gtggtcctac ctattatccc        180
gacaatgtga agggccgatt caccatctcc agagataatg acaggaacat cctggacctg        240
caaatgaaca gtctgaggtc tgaggacacg gccacgtatt actgtttaag gggtgcgacg        300
acgggtgact actggggcca aggcaccact ctcatagtct cctca                         345

SEQ ID NO: 25               moltype = AA  length = 115
FEATURE                     Location/Qualifiers
REGION                      1..115
                            note = 9A3 VH
source                      1..115
                            mol_type = protein
                            organism = Mus sp.
SEQUENCE: 25
EVKLVESGGG LVKPGGSLKL SCAASGFTFR TYAMSWVRQT PEKRLEWVAT ITTGGPTYYP          60
DNVKGRFTIS RDNDRNILDL QMNSLRSEDT ATYYCLRGAT TGDYWGQGTT LIVSS              115

SEQ ID NO: 26               moltype = DNA  length = 30
FEATURE                     Location/Qualifiers
misc_feature                1..30
                            note = Description of Artificial Sequence: Synthetic
                             oligonucleotide
misc_feature                1..30
                            note = 9A3 VH CDR1
source                      1..30
                            mol_type = other DNA
```

```
                        organism = synthetic construct
SEQUENCE: 26
ggattcactt tcagaaccta tgccatgtct                                          30

SEQ ID NO: 27           moltype = DNA  length = 48
FEATURE                 Location/Qualifiers
misc_feature            1..48
                        note = Description of Artificial Sequence: Synthetic
                          oligonucleotide
misc_feature            1..48
                        note = 9A3 VH CDR2
source                  1..48
                        mol_type = other DNA
                        organism = synthetic construct
SEQUENCE: 27
accattacta ctggtggtcc tacctattat cccgacaatg tgaagggc                      48

SEQ ID NO: 28           moltype = DNA  length = 21
FEATURE                 Location/Qualifiers
misc_feature            1..21
                        note = Description of Artificial Sequence: Synthetic
                          oligonucleotide
misc_feature            1..21
                        note = 9A3 VH CDR3
source                  1..21
                        mol_type = other DNA
                        organism = synthetic construct
SEQUENCE: 28
ggtgcgacga cgggtgacta c                                                   21

SEQ ID NO: 29           moltype = AA  length = 10
FEATURE                 Location/Qualifiers
REGION                  1..10
                        note = Description of Artificial Sequence: Synthetic peptide
REGION                  1..10
                        note = 9A3 VH CDR1
source                  1..10
                        mol_type = protein
                        organism = synthetic construct
SEQUENCE: 29
GFTFRTYAMS                                                                10

SEQ ID NO: 30           moltype = AA  length = 16
FEATURE                 Location/Qualifiers
REGION                  1..16
                        note = Description of Artificial Sequence: Synthetic peptide
REGION                  1..16
                        note = 9A3 VH CDR2
source                  1..16
                        mol_type = protein
                        organism = synthetic construct
SEQUENCE: 30
TITTGGPTYY PDNVKG                                                         16

SEQ ID NO: 31           moltype = AA  length = 7
FEATURE                 Location/Qualifiers
REGION                  1..7
                        note = Description of Artificial Sequence: Synthetic peptide
REGION                  1..7
                        note = 9A3 VH CDR3
source                  1..7
                        mol_type = protein
                        organism = synthetic construct
SEQUENCE: 31
GATTGDY                                                                   7

SEQ ID NO: 32           moltype = DNA  length = 321
FEATURE                 Location/Qualifiers
misc_feature            1..321
                        note = 9A3 VL
source                  1..321
                        mol_type = genomic DNA
                        organism = Mus sp.
SEQUENCE: 32
gacattgtga tgacccagtc tcacaaattc atgtttacat cagtaggaga cagggtcagc         60
atcacctgca aggccagtca cgatgtgagt actgctgtag cctggtatca acagaaacca        120
ggacaatatc taaaactact gatttactgg gcatccaacc ggtacactgg agtccctgat        180
cgcttcactg gcagtggctc tgggatggat ttcactttca ccatcagcag tgtgcaggct        240
gaagacctgg cagtttatta ctgtcagcaa cattctagta ctccgtacac gttcggaggg        300
```

```
gggaccaggc tggaaataaa a                                              321

SEQ ID NO: 33           moltype = AA  length = 115
FEATURE                 Location/Qualifiers
REGION                  1..115
                        note = 9A3 VL
source                  1..115
                        mol_type = protein
                        organism = Mus sp.
SEQUENCE: 33
EVKLVESGGG LVKPGGSLKL SCAASGFTFR TYAMSWVRQT PEKRLEWVAT ITTGGPTYYP     60
DNVKGRFTIS RDNDRNILDL QMNSLRSEDT ATYYCLRGAT TGDYWGQGTT LIVSS          115

SEQ ID NO: 34           moltype = DNA  length = 33
FEATURE                 Location/Qualifiers
misc_feature            1..33
                        note = Description of Artificial Sequence: Synthetic
                         oligonucleotide
misc_feature            1..33
                        note = 9A3 VL CDR1
source                  1..33
                        mol_type = other DNA
                        organism = synthetic construct
SEQUENCE: 34
aaggccagtc acgatgtgag tactgctgta gcc                                 33

SEQ ID NO: 35           moltype = DNA  length = 21
FEATURE                 Location/Qualifiers
misc_feature            1..21
                        note = Description of Artificial Sequence: Synthetic
                         oligonucleotide
misc_feature            1..21
                        note = 9A3 VL CDR2
source                  1..21
                        mol_type = other DNA
                        organism = synthetic construct
SEQUENCE: 35
tgggcatcca accggtacac t                                              21

SEQ ID NO: 36           moltype = DNA  length = 27
FEATURE                 Location/Qualifiers
misc_feature            1..27
                        note = Description of Artificial Sequence: Synthetic
                         oligonucleotide
misc_feature            1..27
                        note = 9A3 VL CDR3
source                  1..27
                        mol_type = other DNA
                        organism = synthetic construct
SEQUENCE: 36
cagcaacatt ctagtactcc gtacacg                                        27

SEQ ID NO: 37           moltype = AA  length = 11
FEATURE                 Location/Qualifiers
REGION                  1..11
                        note = Description of Artificial Sequence: Synthetic peptide
REGION                  1..11
                        note = 9A3 VL CDR1
source                  1..11
                        mol_type = protein
                        organism = synthetic construct
SEQUENCE: 37
KASHDVSTAV A                                                         11

SEQ ID NO: 38           moltype = AA  length = 7
FEATURE                 Location/Qualifiers
REGION                  1..7
                        note = Description of Artificial Sequence: Synthetic peptide
REGION                  1..7
                        note = 9A3 VL CDR2
source                  1..7
                        mol_type = protein
                        organism = synthetic construct
SEQUENCE: 38
WASNRYT                                                              7

SEQ ID NO: 39           moltype = AA  length = 9
FEATURE                 Location/Qualifiers
REGION                  1..9
```

```
                        note = Description of Artificial Sequence: Synthetic peptide
REGION                  1..9
                        note = 9A3 VL CDR3
source                  1..9
                        mol_type = protein
                        organism = synthetic construct
SEQUENCE: 39
QQHSSTPYT                                                                           9

SEQ ID NO: 40           moltype = DNA  length = 357
FEATURE                 Location/Qualifiers
misc_feature            1..357
                        note = 20H2 VH
source                  1..357
                        mol_type = genomic DNA
                        organism = Mus sp.
SEQUENCE: 40
gaggtgcagc ttgttgagac tggtggagga ttggtgcagc ctcaagggtc attgaaactc   60
tcatgtgcag cctctggatt caccttcaat accaatgcca tgaactgggt ccgccaggct  120
ccaggaaagg gtttggaatg ggttgctcgc ataagaagta aagtaataa ttttgtgaca   180
tattatgccg attcagtgac agacaggttc accatctcca gagatgattc acaaagcatg  240
ctctatctgc aaatgaacag cttgaaaact ggggacacag ccatgtatta ctgtgtgaga  300
gatacggcta cgtggttttc ttactggggc caagggactc tggtcactgt ctctgca     357

SEQ ID NO: 41           moltype = AA  length = 119
FEATURE                 Location/Qualifiers
REGION                  1..119
                        note = 20H2 VH
source                  1..119
                        mol_type = protein
                        organism = Mus sp.
SEQUENCE: 41
EVQLVETGGG LVQPQGSLKL SCAASGFTFN TNAMNWVRQA PGKGLEWVAR IRSKSNNFVT   60
YYADSVTDRF TISRDDSQSM LYLQMNSLKT GDTAMYYCVR DTATWFSYWG QGTLVTVSA   119

SEQ ID NO: 42           moltype = DNA  length = 318
FEATURE                 Location/Qualifiers
misc_feature            1..318
                        note = 20H2 VL
source                  1..318
                        mol_type = genomic DNA
                        organism = Mus sp.
SEQUENCE: 42
caaattgttc tcacccagtc tccagcaatc atgtctgcat ctccagggga gagggtcacc   60
ataacctgca gtgccagctc aagtgtaagt ttcatgcact ggttccagca gaagccaggc  120
acttctccca aactctggat ttatagcaca tccaacctgg cttctggagt ccctgctcgc  180
ttcagtggca gtggatctgg gacctcttac tctctcacaa tcagccgaat ggaggctgaa  240
gatgctgcca cttattactg ccaacaaagg actaattacc cacccacgtt cggctcgggg  300
acaaagttgg aaataaaa                                                318

SEQ ID NO: 43           moltype = AA  length = 106
FEATURE                 Location/Qualifiers
REGION                  1..106
                        note = 20H2 VL
source                  1..106
                        mol_type = protein
                        organism = Mus sp.
SEQUENCE: 43
QIVLTQSPAI MSASPGERVT ITCSASSSVS FMHWFQQKPG TSPKLWIYST SNLASGVPAR   60
FSGSGSGTSY SLTISRMEAE DAATYYCQQR TNYPPTFGSG TKLEIK                 106
```